(12) United States Patent
Govrin et al.

(10) Patent No.: US 9,495,331 B2
(45) Date of Patent: Nov. 15, 2016

(54) ADVANCED SYSTEM AND METHOD FOR AUTOMATED-CONTEXT-AWARE-DIALOG WITH HUMAN USERS

(71) Applicant: Personetics Technologies Ltd., Tel Aviv (IL)

(72) Inventors: David D. Govrin, Herzeliya (IL); David Sosna, Scarsdale, NY (US); Ido Ophir, Tenafly, NJ (US); Dan Vatnik, Tel-Aviv (IL)

(73) Assignee: PERSONETICS TECHNOLOGIES LTD., Tel Aviv (IL)

( * ) Notice: Subject to any disclaimer, the term of this patent is extended or adjusted under 35 U.S.C. 154(b) by 89 days.

(21) Appl. No.: 14/345,771

(22) PCT Filed: Sep. 19, 2012

(86) PCT No.: PCT/IL2012/050371
§ 371 (c)(1),
(2) Date: Mar. 19, 2014

(87) PCT Pub. No.: WO2013/042116
PCT Pub. Date: Mar. 28, 2013

(65) Prior Publication Data
US 2014/0297268 A1    Oct. 2, 2014

Related U.S. Application Data

(60) Provisional application No. 61/536,142, filed on Sep. 19, 2011.

(51) Int. Cl.
| | |
|---|---|
| *G06F 17/20* | (2006.01) |
| *G06N 5/04* | (2006.01) |
| *G10L 13/08* | (2013.01) |
| *G06N 5/02* | (2006.01) |

(Continued)

(52) U.S. Cl.
CPC .............. *G06F 17/20* (2013.01); *G06N 5/02* (2013.01); *G06N 5/04* (2013.01); *G06Q 40/02* (2013.01); *G10L 13/08* (2013.01); *G10L 15/22* (2013.01); *G10L 2013/083* (2013.01)

(58) Field of Classification Search
CPC ............ G10L 15/22; G10L 2015/221; G10L 2015/225; G10L 2015/223; G06F 17/20
See application file for complete search history.

(56) References Cited

U.S. PATENT DOCUMENTS 5,899,972 A * 5/1999 Miyazawa ............... G10L 15/22
704/236
6,021,403 A * 2/2000 Horvitz ................. G06F 9/4446
706/11

(Continued)

OTHER PUBLICATIONS

International Search Report and Written Opinion dated Feb. 28, 2013, from the corresponding PCT/IL12/50371.

(Continued)

Primary Examiner — Douglas Godbold
(74) Attorney, Agent, or Firm — Oliff PLC

(57) ABSTRACT

Apparatus for conducting a dialog with a user of at least one computerized enterprise system, the apparatus comprising an ontological topic definer using at least one ontological entity to define user dialog topics, each topic including an item, a block identifying executable computer code operative to resolve the item; and at least one input parameter passed to the block; and a dialog server operative for conducting a dialog with a user of at least one computerized enterprise system about an individual topic from among said user dialog topics.

34 Claims, 60 Drawing Sheets

(51) Int. Cl.
  *G06Q 40/02*      (2012.01)
  *G10L 15/22*      (2006.01)

(56) References Cited

U.S. PATENT DOCUMENTS

| | | | |
|---|---|---|---|
| 6,505,155 B1* | 1/2003 | Vanbuskirk | G10L 15/22 704/246 |
| 6,711,585 B1* | 3/2004 | Copperman | G06F 17/30616 |
| 6,766,320 B1* | 7/2004 | Wang | G06F 17/3043 |
| 6,947,923 B2* | 9/2005 | Cha | G06F 17/30684 |
| 7,739,215 B2* | 6/2010 | Horvitz | G06F 17/30687 706/46 |
| 8,938,394 B1* | 1/2015 | Faaborg | G06F 3/167 704/270 |
| 2001/0047265 A1* | 11/2001 | Sepe, Jr. | G10L 15/22 704/275 |
| 2001/0049688 A1* | 12/2001 | Fratkina | G06F 17/30654 |
| 2002/0133392 A1* | 9/2002 | Angel | G06F 17/3089 705/7.39 |
| 2003/0019627 A1 | 1/2003 | Qu et al. | |
| 2003/0233230 A1 | 12/2003 | Ammicht | |
| 2005/0228668 A1* | 10/2005 | Wilson | G10L 15/22 704/256 |
| 2006/0074670 A1 | 4/2006 | Weng | |
| 2006/0167856 A1 | 7/2006 | Angele | |
| 2006/0285657 A1* | 12/2006 | Lippke | H04M 3/493 379/67.1 |
| 2007/0033038 A1 | 2/2007 | Strong | |
| 2007/0078886 A1* | 4/2007 | Rivette | G06F 17/30011 |
| 2007/0239637 A1* | 10/2007 | Paek | G06F 17/276 706/20 |
| 2008/0097748 A1* | 4/2008 | Haley | G06F 17/2785 704/9 |
| 2010/0023320 A1* | 1/2010 | Di Cristo | G06F 17/273 704/9 |
| 2010/0220745 A1 | 9/2010 | Lauwers et al. | |
| 2010/0312547 A1* | 12/2010 | Van Os | G06F 3/167 704/9 |
| 2012/0016678 A1 | 1/2012 | Gruber et al. | |
| 2014/0222433 A1 | 8/2014 | Govrin | |

OTHER PUBLICATIONS

"Apple introduces us to Siri the Killer Patent", Patently Apple, https://web.archive.org/web/20120501071547/http://www.patentlyapple.com/patently-apple/2012/01/apple-introduces-us-to-siri-the-killer-patent.html, May 1, 2012.
"Free variables and bound variables", from Wikipedia, the free encyclopedia, https://en.wikipedia.org/w/index.php?title=Free_variables_and_bound_variables&oldid=510576259, Sep. 3, 2012.
"Drools", from Wikipedia, the free encyclopedia, https://en.wikipedia.org/w/index.php? title=Drools&oldid=507822378, Aug. 17, 2012.
"Rete algorithm", from Wikipedia, the free encyclopedia, https://en.wikipedia.org/w/index.php?title=Rete_algorithm&oldid=502977832, Jul. 18, 2012.
"Predictive analytics", from Wikipedia, the free encyclopedia, https://en.wikipedia.org/w/index.php?title=Predictive_analytics&oldid=513163651, Sep. 17, 2012.
"Closure (computer programming)", from Wikipedia, the free encyclopedia, https://en.wikipedia.org/w/index.php?title=Closure_(computer_programming)&oldid=512390948, Sep. 14, 2012.
"Spectral graph theory", from Wikipedia, the free encyclopedia, https://en.wikipedia.org/w/index.php?title=Spectral_graph_theory&oldid=505685173, Aug. 4, 2012.
U.S. Office Action dated Apr. 13, 2016 from corresponding U.S. Appl. No. 14/345,811.
U.S. Office Action dated Nov. 24, 2015 from corresponding U.S. Appl. No. 14/345,811.

* cited by examiner

I lost the 3 digits code on the back of my credit card

Token Annotations

| Type | Set | Start | End | id | Features |
|---|---|---|---|---|---|
| Token | | 0 | 1 | 42 | (category=PRP, chunk=B-NP, kind=word, length=1, orth=upperinitial, root=1, string=1) |
| Token | | 2 | 6 | 44 | (affix=ed,category=VBD,chunk=B-VP,kind=word,length=4,orth=lowercase, root=lose, string=lost) |
| Token | | 7 | 10 | 46 | (category=DT, chunk=E-NP, kind=word, length=3, orth=lowercase, root=the, string=the) |
| Token | | 12 | 13 | 49 | (category=CD, chunk=I-NP, kind=number, length=1, root=3, string=3) |
| Token | | 14 | 20 | 51 | (affix=S,category=NNS,chunk=I-NP,kind=word,length=6,orth=lowercase, root=digit, string=digits) |
| Token | | 21 | 25 | 53 | (category=NN, chunk=I-NP, kind=word, length=4, orth=lowercase, root=code, string=code) |
| Token | | 26 | 28 | 55 | (category=IN, chunk=B-PP, kind=word, length=2, orth=lowercase, root=on, string=on) |
| Token | | 29 | 32 | 57 | (category=DT, chunk=I-NP, kind=word, length=3, orth=lowercase, root=the, string=the) |
| Token | | 33 | 37 | 59 | (category=NN, chunk=I-NP, kind=word, length=4, orth=lowercase, root=back, string=back) |
| Token | | 38 | 40 | 61 | (category=IN, chunk=I-PP, kind=word, length=2, orth=lowercase, root=of, string=of) |
| Token | | 41 | 43 | 63 | (category=PRP$, chunk=I-NP, kind=word, length=2, orth=lowercase, root=my, string=my) |
| Token | | 44 | 50 | 65 | (category=NN, chunk=I-NP, kind=word, length=5, orth=lowercase, root=credit, string=credit) |
| Token | | 51 | 55 | 67 | (category=NN, chunk=I-NP, kind=word, length=4, orth=lowercase, root=card, string=card) |
| Token | | 56 | 57 | 69 | (category=., chunk=0, kind=punctuation, length=1, root=., string=.) |

I lost the 3 digits code on the back of my credit card

Chunking

| Type | Set | Start | End | id | Features |
|---|---|---|---|---|---|
| Digitchunk | | 0 | 1 | 117 | (rule=Nchunk) |
| Digitchunk | | 7 | 25 | 118 | (rule=Nchunk) |
| Digitchunk | | 29 | 37 | 119 | (rule=Nchunk) |
| Digitchunk | | 41 | 55 | 120 | (rule=Nchunk) |

I lost the 3 digits code on the back of my credit card

High Priority Chunks

Fig. 3a

I tried using my card at |the local store| |last week|

| Type | Set | Start | End | Id | Features |
|---|---|---|---|---|---|
| PurchaseLocation | | 25 | 40 | 564 | {rule1=regular, rule2=0} |
| Date | | 41 | 50 | 558 | {kind1=date, rule1=ModifierDate, rule2=DateOnlyFinal} |

I tried talking |two grand| from an ATM in |Spain| and was rejected

| Type | Set | Start | End | Id | Features |
|---|---|---|---|---|---|
| Money | | 16 | 25 | 338 | {kind=number, rule=MoneyCurrencyUnit} |
| Location | | 41 | 46 | 339 | {locType=[null], rule1=InLoc1, rule2=LocFinal} |

1. Instance based learning + K-nearest neighbor

- A: Memory - set of classified sentences

Each sentence is represented as a vector of terms
  - Example: "I lost my credit card at the local store"
  - is mapped to the vector ("lose"=1,"[Credit Card]"=1,"[local store]"=1,..., "PIN"=0,"ATM"=0...)

- B: Given an input sentence – find the closest sentence.

distance measure – Cosine similarity $$\text{similarity} = \cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}}$$

- Calculate the similarity between sentence $i$ and reason $r$:

$Sim_{i,r} = \sum_{k=0}^{5} \alpha^k Sim_{i,r}(k)$ where $0 < \alpha < 1$ and $Sim_{i,r}(k)$ is the $k$th nearest sentence in reason $j$ to sentence $i$.

- Rank all the reasons according to their similarity measure.

Fig. 4a

2. Probabilistic "Generative" Classifier

- Training – compute the maximum likelihood probabilities of terms in each reason: $P(X_i|R_k) = \frac{T_{i,k}}{\sum_j S_{j,k}}$ which is the number of instances that term $X_i$ divided by the number of sentences in reason $R_k$

- Compute the prior probability of each reason $P(R_k) = \frac{\sum_j S_{j,k}}{\sum_{j,k} S_{j,k}}$ which is the normalization according to the reason size

- Feature selection : Choose $k$ terms which best discriminate (give most information about) the reasons – using the mutual information score. The Mutual Information between a term $X_i$ and a reason $R_k$ (class) is:

$$I(X_i, R_k) = \sum_{X_i \in \{0,1\}} \sum_{R_k \in \{0,1\}} P(X_i, R_k) \log \frac{P(X_i | R_k)}{P(X_i)}$$

Fig. 4b

2. Probabilistic "Generative" Classifier (continued)

- For each reason we build a list of $k$ most discriminating terms
  - Use the union of these terms in our classifier
  - All other terms are ignored (regarded as noise)

- Inference : calculate the probability of each reason given the relevant terms that appear in the input sentence:

$$Score(k) = P(X|R_k) * P(R_k) = P(R_k) * \prod_i P(X_i|R_k)$$

| | | | | | |
|---|---|---|---|---|---|
| David Sosna<br>Jan 23, 2011<br>10:51:11 AM | PCase | PCase_2109 | SetStage | String 1.0 | System |
| | PCase | PCase_2109 | AliceMode | Boolean false | System |
| | PCase | PCase_2109 | reasonHints | PBlank_b1 | Logic |
| Kevin Scott<br>Jan 23, 2011<br>10:50:21 AM | DParty | P5001 | PredNonSuccessAttemptTime | PDate 2010/09/21 10:33:00 | Logic |
| | DParty | P5001 | PredNonSuccessAttemptTransaction | DTransaction 805004 | Logic |
| | DParty | P5001 | PredRejectedATMAttemptTime | PDate 2010/09/21 10:33:00 | Logic |
| | DParty | P5001 | PredRejectedATMAttemptTransaction | DTransaction 805004 | Logic |
| David Sosna<br>Jan 23, 2011<br>10:46:22 AM | DParty | P5001 | PredUnableToaccessOnlineBankingTime | PDate2010/08/18 10:36:50 | Logic |
| | DParty | P5001 | PredUnableToaccessOnlineBankingTransaction | DTransaction 618002 | Logic |
| | DParty | | PredUsageOfAny | PDate 2010/09/21 10:36:46 | Logic |
| | SCategory | 1 | PredCaseHistoryCategory | PDate 2010/09/21 10:36:46 | Logic |
| | SCategory | 0 | PredCaseHistoryCategory | PDate 2010/09/20 10:36:45 | Logic |
| | SReason | 100 | PredCaseHistoryReason | PDate 2010/09/21 10:36:46 | Logic |
| | SReason | 20 | PredCaseHistoryReason | PDate 2010/09/20 10:36:45 | Logic |
| | SCategory | 1 | PredCaseHistoryNumCategory | Number 1.0 | Logic |
| | SCategory | 0 | PredCaseHistoryNumCategory | Number 2.0 | Logic |
| | SReason | 20 | PredCaseHistoryNumReason | Number 2.0 | Logic |
| | SReason | 100 | PredCaseHistoryNumReason | Number 1.0 | Logic |
| | DParty | P5001 | CounterCustomerRephrase | Number 0.0 | System |
| | DParty | P5001 | CounterAlicebotDialogs | Number 0.0 | System |
| | DParty | P5001 | CounterCustomerResponse | Number 0.0 | System |
| | PCase | PCase_2109 | SetStage | String 1.1 | System |
| | Interaction | 1000 | DialogCode | String 101 | Dialog |
| | PCase | PCase_2109 | SetStage | String 2.1 | System |
| | Interaction | 1000 | DialogRandomTextId | String 0 | Dialog |
| | IInteraction | 1000 | DialogHandled | Boolean true | System |

Fig. 6c

| | | | |
|---|---|---|---|
| 70 | int: 1002 | type:NLP sub: PCase_250 (PCase) | pred: N1pUpdate obj: 1203 (SReason) |
| 71 | int: 1002 | type: Logic sub:PCase_250 (PCase) | pred: confirmReason obj: 1001 (SReason) |
| 72 | int: 1002 | type: NLP sub: PCase_250 (PCase) | pred: N1pRelevance obj: 1203 (SReason) |
| 73 | int: 1002 | type: NLP sub: PCase_250 (PCase) | pred: N1pRelevance obj: 1201 (SReason) |
| 74 | int: 1002 | type: NLP sub: PCase_250 (PCase) | pred: N1pRelevance obj: 1201 (SReason) |
| 75 | int: 1002 | type: NLP sub: PCase_250 (PCase) | pred: N1pRelevance obj: 1201 (SReason) |
| 76 | int: 1003 | type: Dialog sub: PCase_250 (PCase) | pred: DialogFamily obj: confirmReason (String) |
| 77 | int: 1003 | type: Dialog sub: PCase_250 (PCase) | pred: ResponseConfirmation obj: 1001 (SReason) |
| 78 | int: 1003 | type: Dialog sub: PCase_250 (PCase) | pred: noDialogrequiredFlag obj: true (Boolean) |
| 79 | int: 1003 | type: Dialog sub: PCase_250 (PCase) | pred: ResponseConfirmation obj: 1001 (SReason) |
| 80 | int: 1003 | type: Dialog sub: PCase_250 (PCase) | pred: noDialogrequiredFlag obj: true (Boolean) |
| 81 | int: 1003 | type: System sub: 1003 (Interaction) | pred: DialogHandled obj: true (Boolean) |
| 82 | int: 1003 | type: Dialog sub: PCase_250 (PCase) | pred: noDialogrequiredFlag obj: true (Boolean) |
| 83 | int: 1003 | type: Dialog sub: PCase_250 (PCase) | pred: noDialogrequiredFlag obj: true (Boolean) |
| 84 | int: 1003 | type: Logic sub: PCase_250 (PCase) | pred: RootCauseHints obj: b4 (Blank) |
| 85 | int: 1003 | type: Logic sub: b4 (Blank) | pred: rootCauseInfo obj: b5 (Blank) |
| 86 | int: 1003 | type: Logic sub: b5(Blank) | pred: causeStatus obj:OPEN (String) |
| 87 | int: 1003 | type: Logic sub: PCas_250 (PCase) | pred: RootCauseHints obj: b4 (Blank) |
| 88 | int: 1003 | type: Logic sub: b5 (Blank) | pred: causeCode obj: RCLossT (String) |
| 89 | int: 1003 | type: Logic sub: b4 (Blank) | pred: rootCauseInfo obj: b6 (Blank) |
| 90 | int: 1003 | type: Logic sub: b6 (Blank) | pred: causeStatus obj: OPEN (String) |
| 91 | int: 1003 | type: Logic sub: b6 (Blank) | pred: causeCode obj: RCLossP (String) |
| 92 | int: 1003 | type: Logic sub: b4 (Blank) | pred: rootCauseInfo obj: b7 (Blank) |
| 93 | int: 1003 | type: Logic sub: b7 (Blank) | pred: causeStatus obj: OPEN (String) |
| 94 | int: 1003 | type: Logic sub: b7 (Blank) | pred: causePriority obj: 3 (Number) |
| 95 | int: 1003 | type: Logic sub: b7 (Blank) | pred: causeCose obj: RCIssueCard (String) |
| 96 | int: 1003 | type: Logic sub: b4 (Blank) | pred: rootCauseInfo obj: b8(Blank) |
| 97 | int: 1003 | type: Logic sub: b8 (Blank) | pred: causeStatus obj: OPEN (String) |
| 98 | int: 1003 | type: Logic sub: b8 (Blank) | pred: rootPriority obj: 4 (Number) |
| 99 | int: 1003 | type: Logic sub: b8 (Blank) | pred: causeCode obj: RCChecks1 (String) |
| 100 | int: 1003 | type: Logic sub: b4 (Blank) | pred: rootCauseInfo obj: b9 (Blank) |
| 101 | int: 1003 | type: Logic sub: b9 (Blank) | pred: causeStatus obj: OPEN (String) |
| 102 | int: 1003 | type: Logic sub: b9 (Blank) | pred: causePriority obj: 5 (Number) |
| 103 | int: 1003 | type: Logic sub: b9 (Blank) | pred: causeCode obj: RCCardLMisused (String) |
| 104 | int: 1003 | type: Logic sub: b6 (Blank) | pred: causeStatus obj:OPEN (String) |

Fig. 6d

```
1   _b5 (Blank) dataCollectionContext _b11 (Blank) type: Logic
2    _b11 (Blank) dataItem _b12 (Blank) type: Logic
3     _b12 (Blank) itemID _RCLoss_T-0 (String) type: Logic
4     _b12 (Blank) itemBlock confirmedCard (String) type: Logic
5     _b12 (Blank) itemType DCard (String) type: Logic
6     _b12 (Blank) itemName userCard (String) type: Logic
7     _b12 (Blank) itemValue C-new12345-P6000 (String) type: Logic
8     _b12 (Blank) itemDone close (String) type: Logic
9     _b12 (Blank) itemStep 1 (String) type: Logic
10   _b11(Blank) dataItem _b13 (Blank) type: Logic
11    _b13 (Blank) itemCode 1018 (String) type: Logic
12    _b13 (Blank) itemCode RCLossT-1 (String) type: Logic
13    _b13 (Blank) itemBlock RunDialog (String) type: Logic
14    _b13 (Blank) itemType boolean (String) type: Logic
15    _b13 (Blank) itemName RCLossT-1-DG (String) type: Logic
16    _b13 (Blank) itemDone open (String) type: Logic
17    _b13 (Blank) itemParams _b14 (Blank) type: Logic
18     _b14 (Blank) itemParamId SDataItemParam_1466 (String) type: Logic
19     _b14 (Blank) itemParamName card (String) type: Logic
20     _b14 (Blank) itemParamType Local (String) type: Logic
21     _b14 (Blank) itemParamValue userCard (String) type: Logic
22     _b14 (Blank) itemParamCondition null (String) type: Logic
23   _b11 (Blank) dataItem _b15 (Blank) type: Logic
24    _b15 (Blank) itemCode 901 (String) type: Logic
25    _b15 (Blank) itemId RCLossT-2 (String) type: Logic
26    _b15 (Blank) itemBlock RunDialog (String) type: Logic
27    _b15 (Blank) itemType boolean (String) type: Logic
28    _b15 (Blank) itemName RCLossT-2-DG (String) type: Logic
29    _b15 (Blank) itemDone open (String) type: Logic
30    _b15 (Blank) itemParams _b16 (Blank) type: Logic
31     _b16 (Blank) itemParamId SDataItemParam_1467 (String) type: Logic
32     _b16 (Blank) itemParamName condition (String) type: Logic
33     _b16 (Blank) itemParamType Local (String) type: Logic
34     _b16 (Blank) itemParamValue RCLossT-1-DG (String) type: Logic
35     _b16 (Blank) itemParamCondition null (String) type: Logic
36    _b15 (Blank) itemParams _b17 (Blank) type: Logic
37     _b17 (Blank) itemParamId SDataItemParam_1476 (String) type: Logic
```

Fig. 6e

| Personetics Advisor Dashboard | | | |
|---|---|---|---|
| Dashboard Logs | | | |
| Active Cases | Case Information | | |
| ⊕ David Sosna Jan11 2011 7:04:12PM | David Sosna   End Session   Jan 11, 2011 7:04:12 PM | | |
| ⊕ Lydia Rust Jan11 2011 7:03:15PM | Long Term Indicators | | |
| | Any Success Attempt Time | 2010/09/21 10:33:00 | Edit |
| | Any Non Success Attempt Time Transaction | 805004 | Edit |
| ⊕ Kydia Rust Jan11 2011 6:12:00PM | ATM Rejected Attempt Time | 2010/9/21 10:33:00 | Edit |
| | ATM Rejected Attempt Time Transaction | 605004 | Edit |
| ⊕ David Sosna Jan11 2011 6:12:52PM | Unable to Access Online Banking Time | 2010/08/12 10:36:50 | Edit |
| | Unable to Access Online Banking Transaction | 618002 | Edit |
| | Last Non Personetics Usage | 2010/09/21 10:36:46 | Edit |
| | Number of Accounts | 1 | |
| | Number of Cards | 1 | |
| | User Input | | |
| | I have a $21 transaction that I do not recognize | Text | Edit |
| | Intent Analysis (Reasons) | | |
| | I have a charge on my statement that I do not recognize | 120 | Confirm |
| | I have an ATM withdrawal that I do not recognize | 49 | Confirm |
| | My card's PIN is not working | 66 | Confirm |
| | Trigger Analysis (Trigger) | | |
| | TransactionHints Starbucks 07030 20.0$ 2010/09/04 10:36:50 Card Blue*3461 | 913001 | Edit |
| | TransactionHints Panera Break Broadway 28.0$ 2010/09/18 10:36:50 Card Blue *3461 | 902002 | Edit |
| | TransactionHints Joe Pizza 0739017.67$ 2010/09/16 10:36:50 Card: Blue *3461 | 802002 | Edit |
| | TransactionHints L.F. Hoboken 21.85$ 2010/03/04 10:36:50 Card: Blue *3461 | 723001 | Edit |
| | TransactionHints Joe Pizza 0739017.67$ 2010/09/16 10:36:50 Card Blue *3461 | 802002 | Edit |
| | TransactionHints Consumer Customer reports membership 24.0$ 2010/09/20 10:36:50 Card Blue*3461 | 712002 | Edit |
| | TransactionHints AMAZON.COM 20.0$ 2010/08/18 10:36:50 Card: Blue *3461 | 618002 | Edit |
| | Root Cause Analysis | | |
| | rootCauseHints    Household | 200 | Edit |
| | rootCauseHints    Alternative Name | 100 | Edit |
| | Chat Console | | |
| | | | |
| | Submit  Escalate | | |

Fig. 7d

| Navigate | ≪ | Business rule ass ⊠ | Offer for discussion ⊠ | Policy for no Activity ⊠ |
|---|---|---|---|---|

⊕ Browse

⊞ Knowledge Bases ⊟

Create New ▼
- ⊟ ⋔ Packages
  - ⊞⊞ Credit Cards
  - ⊞⊞ DDAccounts
  - ⊞⊞ defaultPackage
  - ⊞⊞ mortgages
  - ⊟ ⋔ Global Area Showing 7 items out of 7 [refresh list] [open selected] [open selected to single tab]

Name
- ▪◻ For customers that are complaining about a specific fee a....
  For customers that are complaining about a specific fee a....
- ▪◻ If a customer complains about a certain reason more than X ti.....
  If a customer complains about a certain reason more than X ti.....
- ▪◻ If cuctomer amount >500 then escalate issue
  If cuctomer amount >500 then escalate issue
- ▪◻ If customer type of Gold then escalate issue
  If customer type of Gold then escalate issue
- ▪◻ If the merchant involved is part of bad list then escalate
  If the merchant involved is part of bad list then escalate
- ▪◻ Offer for Discussion about unrecognized purchase
- ▪◻ Policy for No Activity Fee

● QA
♦ Package snapshots ⊞
◻ Administration ⊞

[ Close all items ]

| Navigate | ⊠ | Business rule asset | ⊠ | Offer for Discuss ⊠ | | |
|---|---|---|---|---|---|---|
| Browse | | Save changes  Save and close  Select Working Sets  Validate  Verify  View source  Actions...  Status [Draft] | | | | |

Knowledge Bases

Create New ▼
- Packages
  - Credit Cards
  - DDAccounts
  - defaultPackage
  - mortgages
- Global Area

WHEN
1. Customer type is equal to [gold] and Case amount is greater than [100]  □ +

Title: [Offer for Discussion about unrecognized purchase] [show more info...]
[show more info...]

THEN
1. [escalate()]  □ +

(show options....)

Description:

Discussion:

QA

Package snapshots

Administration

Add a discussion comment      Erase all comments

Close all items

Fig. 7h

| Navigate ⊠ | Business rule asset ⊠ | Policy for No Act ⊠ | | |
|---|---|---|---|---|
| ⊞ Browse | Save changes Save and close  Select Working Sets  Validate Verify  View source  Actions...▼Status [Draft] | | | |
| ⊞ Knowledge Bases ⊟ | WHEN | | | Title: [Policy for No Activity fee] [show more info....] |
| Create New ▼ | 1. Number of previous complaints is less than [2] | | | |
| ⊟ Packages | and Account Age is More than [6] months □ + | | | |
| ⊞ Credit Cards | | | | |
| ⊞ DDAccounts | | | | |
| ⊞ defaultPackage | □ + | | | |
| ⊞ mortgages | THEN | | | |
| ⊟ ♣ Global Area | 1. [reversal ()] | | | |
| | (show options....) | | | |
| | Description: | | | |
| ⊞ | | | | |
| ♦QA | Discussion: | | | |
| ♦ Package snapshots ⊞ | | | Add a discussion comment | Erase all comments |
| ◯ Administration ⊞ | | | | Close all items |

Fig. 7i

| Reason | Id: 1601 | Name: ATM supplied less amount then requested | Root Cause | Id RCATMNoRct | Name: I do NOT have a receipt for this withdrawal | |
|---|---|---|---|---|---|---|
| Card | Id: *7002 | Type: Visa | | Activation Date: 0010/12/06 00:00 | Expiration Date: 0011/08/14 00:00 | Limit: 1000.0 |
| | | | Issue Date: 0010/12/06 00:00 | | Card Id: *7002 | Card Type: Visa |
| Transaction | Id: P6002D060 | Amount: 103.5 | Description: ATM 217 Sutter Street | Date: 2011/01/30 10:36 | | |

Chat Trascript

Personetics: Hello again Sharon Stone. Would you like to continue our last discussion from 21 minutes ago?

User: No

Personetics: OK, Can you please describe your subject in a short sentence

User: The ATM provided less cash than requested

Personetics: I think you meant: "The ATM provided less cash than requested

User: That's right. Go

Personetics: Ok. Let's identify the card involved

User: Debit Card Number: *7002

Personetics: OK, let's identify the transactions involved

User:

| amount | 103.5 |
|---|---|
| id | P6002D060 |
| description | ATM 217 Sutter Street |
| date | 2011/01/30 10:36 |
| card | id *7002 |

Fig. 7j

| |
|---|
| My card has been lost |
| My card has been stolen |
| I have an issue with my card's CVV |
| I don't remember my PIN or password |
| My card's PIN is not working |
| My card is not working |
| I have an issue with my card's magnetic stripe |
| My purchase was declined |
| My cash withdrawal was declined |
| My card was swallowed by an ATM |
| The ATM provided less cash than requested |
| The amount on the ATM cash receipt is bigger than actual |
| I am unable to access online banking |
| I purchased an item but did not receive it |
| I would like to cancel a purchase |
| I would like to increase my credit line |
| I would like to change my payment due date |
| I would like to decrease my credit line |
| I would like to make a change to my account |
| I would like to change my address |
| I would like to change my phone number |
| I would like to change my email address |
| I would like to cancel my card |
| I would like to change my debit card daily limits |
| I would like to order a new card |
| I would like to activate my card |
| I would like to use my rewards miles or points |
| I would like to unblock my card |

Fig. 7k

| |
|---|
| I would like to ensure my card would work overseas |
| I would like to make a payment |
| I would like to make a balance transfer |
| I have an ATM withdrawal that I do not recognize |
| I have a purchase on my statement that I do not recognize |
| I have an issue with a fee |
| I have an issue with a late fee |
| I have an issue with an annual fee |
| I have an issue with a foreign transaction fee |
| I have an issue with an ATM fee |
| I have an issue with an overdraft fee |
| Please explain why did you cancel my card |
| I have duplicate charges on my statement for an ATM withdrawal |
| I have duplicate charges on my statement for a purchase |
| I have an ATM withdrawal with a wrong amount |
| I have a charge on my statement with a wrong amount |
| I have an issue with my rewards program |
| I see unusual activity on my statement |
| I am missing a refund credit that I was expecting |
| Please explain a change of my credit line |
| My account is missing a payment |
| I have an issue with the interest rate being too high |
| I did not receive my statement |
| I am following up on a letter from the bank |
| I am following up on a call from the bank |
| I have a question about a statement |
| I have a question about a payment |
| I have a question about the bank's policy |

Fig. 71

| 1001 | | Card Lost | | | | |
|---|---|---|---|---|---|---|
| RCCard Misused | | Lost and Misused | | | | |

| blockName | name | block Type | type | dialog Code | function Code | description |
|---|---|---|---|---|---|---|
| confirmedCard | userCard | O | DCard | | | |
| RunDialog | dialogNtfCheck | D | boolean | 902 | | select transaction misused |
| confirmedTrigger | activeTransactions | O | DTransaction | | | |
| RunDialog | dialogInf1 | D | boolean | 902 | | Notify on precautions taken |
| setCompleteReason | closeTheReason | D | boolean | | | inform user of stolen card |
| RunDialog | dialogInfStolen | D | boolean | 902 | | transfer to fraud specialist |
| setPrefromTransfer | PrefromTransfer | O | | | | |
| * | | | | | | |

Record: 1 of 7    No Filter | Search

| Type | parameterName | valueName | Id | valueConstant | valueNameField | condition |
|---|---|---|---|---|---|---|
| * | | | | | | |

Fig. 8a

| Personetics Advisor Dashboard | | | |
|---|---|---|---|
| Dashboard \| Logs | | | |
| Active Cases | Case Information | Jan 11, 2011 7:04:12 PM | |
| David Sosna Jan11 2011 7:04:12 PM | David Sosna End Session | | |
| Lydia Rust Jan11 2011 7:03:15 PM | Long Term Indicators | | |
| Lydia Rust Jan11 2011 6:12:00 PM | Any Success Attempt Time | 2010/09/21 10:33:00 | Edit |
| David Sosna Jan11 2011 6:12:52 PM | Any Non Success Attempt Time | 805004 | Edit |
| | ATM Rejected Attempt Time | 2010/9/21 10:33:00 | Edit |
| | ATM Rejected Attempt Time Transaction | 605004 | Edit |
| | Unable to Access Online Banking Time | 2010/08/12 10:36:50 | Edit |
| | Unable to Access Online Banking Transaction | 618002 | Edit |
| | Last Non Personetics Usage | 2010/09/21 10:36:46 | Edit |
| | Number of Accounts | 1 | Edit |
| | Number of Cards | 1 | Edit |
| | User Input | | |
| | I have a $21 transaction that I do not recognize | Text | Edit |
| | Intent Analysis (Reasons) | | |
| | I have a charge on my statement that I do not recognize | 120 | Confirm |
| | I have an ATM withdrawal that I do not recognize | 49 | Confirm |
| | My card's PIN is not working | 56 | Confirm |
| | Trigger Analysis (Trigger) | | |
| | TransactionHints Starbucks 07030 20.0$ 2010/09/04 10:36:50 Card Blue *3461 | 913001 | Edit |
| | TransactionHints Panera Break Broadway28.0$ 2010/09/18 10:36:50 Card Blue *3461 | 902002 | Edit |
| | TransactionHints Joe Pizza 07390 17.67$ 2010/09/16 10:36:50 Card Blue *3461 | 802002 | Edit |
| | TransactionHints L.F. Hoboken 21.85$ 2010/03/04 10:36:50 Card: Blue *3461 | 723001 | Edit |
| | TransactionHints Consumer Customer reports membership 24.0$ 2010/09/20 10:36:50Card Blue *3461 | 712002 | Edit |
| | TransactionHints AMAZON.COM 20.0$ 2010/08/18 10:36:50 Card: Blue *3461 | 618002 | Edit |
| | Root Cause Analysis | | |
| | rootCauseHints Household | 200 | Edit |
| | rootCauseHints Alternative Name | 100 | Edit |
| | Chat Console | | |
| | [Submit] [Escalate] | | |

Fig. 8c

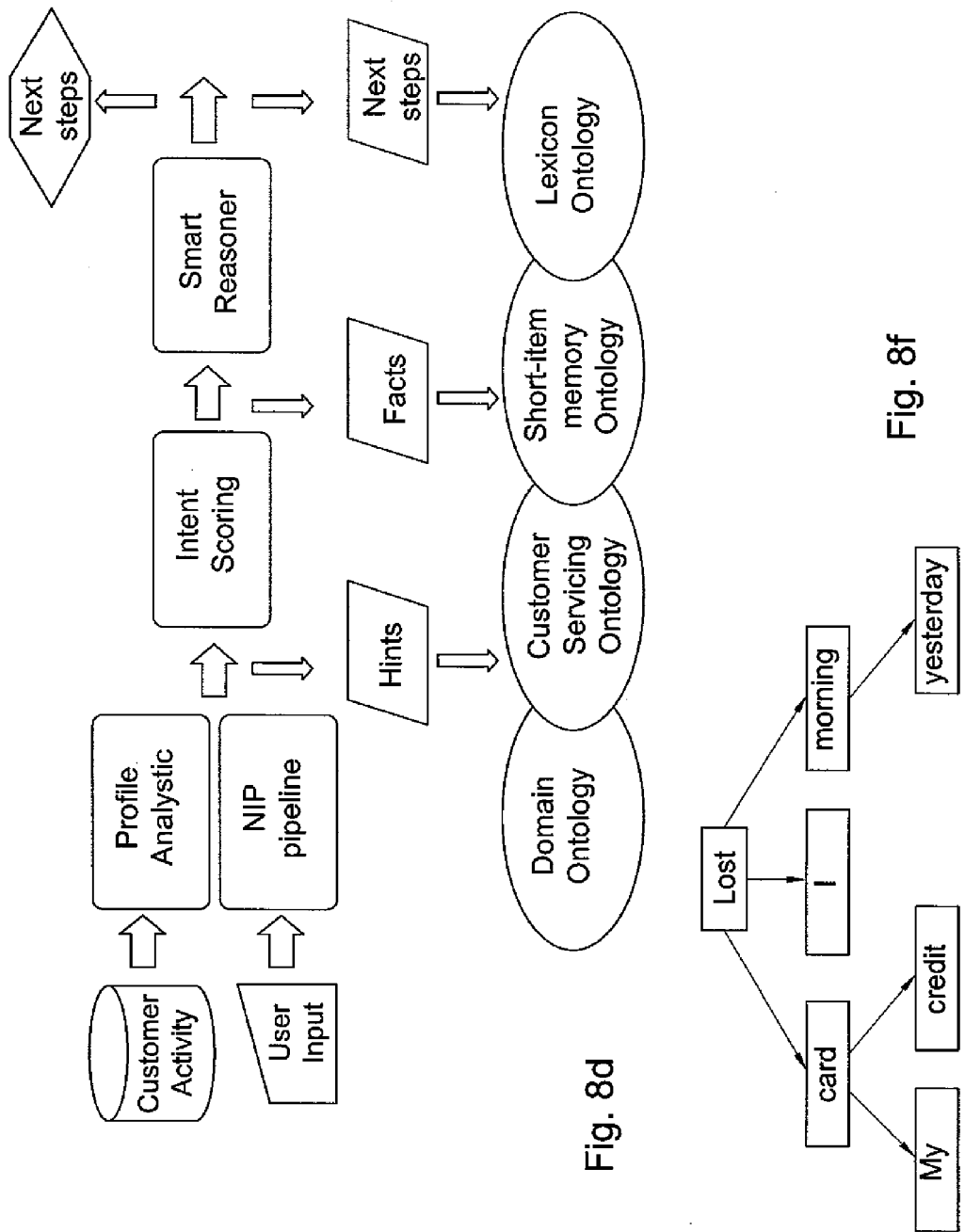

| Dialog Type | Class Name | # of values selected | Echoing message text |
|---|---|---|---|
| selectPredefinedOne | | 1/2/3/.../ 0=none of above | |
| selectPredefinedOne | Request | | I select %text% The issues is %requestname% |
| selectPredefinedMultiple | | 3 | I select %value1%, %value2%, and %value3%. |
| selectParameterOne | | | My answer is "%value%". |
| selectTF | | | %value%. |
| selectTFParameter | | | My answer is %value%. |
| selectParameterMultiple | | | |
| enterText | | | %text% |
| selectTransactionOne | | 1 | The TX from %TXdate% for %TXamount% at %TXdesc%. |
| selectTransactionMultiple | | 2 | The TX from %TXdate% for %TXamount% at %TXdesc%, and the TX from %TXdate% for %TXamount% at %TXdesc%. |
| enterSignature | | | Here is my signature / I am not ready to provide signature |
| enterPicture | | | Here is the picture your requested |

Fig. 8g account-type: card    credit-card    my-account where detected: statement    bill    card-card-bill    monthly-bill    monthly-statement
　　　　　　　　　　　　　　　(date)
　　　　　　　　　　　　　　　　　last    previous
　　　　　　　　　　　　　　　　　current    recent
　　　　　　　　　　　　　　　　　(date)    most-recent topic: never-see    too-much    too-high    not-recognize    not-understand    why-are-there    is-charged    charge-me    got-charged

Fig. 9a

Customer service

1. What is an Overdraft Item fee?
1. What is an Extended Overdrawn Balance Charge (EOBC)?
1. What is an Overdraft Protection Transfer fee?
1. What is a Non-Sufficient Funds fee also known as NSF: Returned Item Fee?
1. What is a Out-of-Network or Foreign ATM fee?
1. What is a Check Enclosure fee?
1. What is a Stop Payment fee?
1. I noticed an $8 service fee charge at the end of the month that I had never seen before
1. I was charged too much for service fees
1. The service fees are too high, it's ridiculous
1. I would like to know why I got charged service fees
1. Can you please explain why I was charged with this service fee
1. I was charged a fee recently to use my card in an ATM machine. I thought my bank had a no fee benefit.

| Topic to Topic Table | | |
|---|---|---|
| Source Topic | Related Topic | Score |
| Account Analyzer | Account Benefits | 130 |
| Unrecognized Transaction | Transactions Near By | 80 |
| Unrecognized Transaction | Merchant Details | 110 |
| Suspected Fraud | Cancel Card Policy | 110 |
| Suspected Fraud | Stolen Card Insurance | 90 |

| Entity to Topic Table | | |
|---|---|---|
| Entity Classifier | Related Topic | Score |
| type = "GoldAccount" | The Gold Advantage | 130 |
| numInstallments >1 | Reschedule Installments | 80 |
| Online Transaction | Merchant Details | 110 |

Fig. 21

ADVANCED SYSTEM AND METHOD FOR AUTOMATED-CONTEXT-AWARE-DIALOG WITH HUMAN USERS

REFERENCE TO CO-PENDING APPLICATIONS

Priority is claimed from U.S. Provisional Patent Application No. 61/536,142, entitled "Method and system for automated-context-aware-dialog with human users" and filed Sep. 19, 2011.

FIELD OF THIS DISCLOSURE

The present invention relates generally to computerized systems and more particularly to computerized systems conducting dialog with a human user.

BACKGROUND FOR THIS DISCLOSURE

In computer science and information science, an ontology formally represents knowledge as a set of concepts within a domain, and the relationships among those concepts . . . . The creation of domain ontologies is . . . fundamental to the definition and use of an enterprise architecture framework . . . . Most ontologies describe individuals (instances), classes (concepts), attributes, and relations. . . . Common components of ontologies include:
Individuals: instances or objects (the basic or "ground level" objects)
  Classes: sets, collections, concepts, classes in programming, types of objects, or kinds of things
  Attributes: aspects, properties, features, characteristics, or parameters that objects (and classes) may have
  Relations: ways in which classes and individuals may be related to one another
  Function terms: complex structures formed from certain relations that may be used in place of an individual term in a statement
  Restrictions: formally stated descriptions of what must be true in order for some assertion to be accepted as input
  Rules: statements in the form of an if-then (antecedent-consequent) sentence that describe the logical inferences that may be drawn from an assertion in a particular form Events: the changing of attributes or relations
Ontologies are commonly encoded using ontology languages . . . . OWL is a language for making ontological statements, developed as a follow-on from RDF and RDFS, as well as earlier ontology language projects including OIL, DAML, and DAML+OIL. OWL is intended to be used over the World Wide Web, and all its elements (classes, properties and individuals) are defined as RDF resources and identified by URIs.

Backward chaining works backward from the goal(s). Backward chaining systems usually employ a depth-first search strategy, e.g. Prolog.[1]
Backward chaining starts with a list of goals and works backwards from the consequent to the antecedent by searching inference rules until it finds one which has a consequent ("then" clause) that matches a desired goal.

According to Wikipedia, "Predictive analytics encompasses a variety of statistical techniques from modeling, machine learning, data mining and game theory that analyze current and historical facts to make predictions about future events. . . .

Predictive analytics is an area of statistical analysis that deals with extracting information from data and using it to predict future trends and behavior patterns. The core of predictive analytics relies on capturing relationships between explanatory variables and the predicted variables from past occurrences, and exploiting it to predict future outcomes . . . . Generally, the term predictive analytics is used to mean predictive modeling, "scoring" data with predictive models, and forecasting. However, people are increasingly using the term to describe . . . descriptive modeling and decision modeling or optimization . . . . Predictive models analyze past performance to assess how likely a customer is to exhibit a specific behavior in the future . . .

Descriptive models quantify relationships in data in a way that is often used to classify customers or prospects into groups . . . .

Decision models describe the relationship between all the elements of a decision—the known data (including results of predictive models), the decision, and the forecast results of the decision—in order to predict the results of decisions involving many variables . . . . Analytical Customer Relationship Management is a frequent commercial application of predictive analysis . . . . The approaches and techniques used to conduct predictive analytics may broadly be grouped into regression techniques and machine learning techniques, regression models such as the linear regression model, discrete choice models, multivariate regression, logistic regression, multinomial logistic regression, probit regression, logit versus probit, time series models, survival or duration analysis, classification and regression trees, and multivariate adaptive regression splines; and machine learning techniques such as neural networks, radial basis functions, support vector machines, Naïve Bayes, k-nearest neighbours, and geospatial predictive modeling."

Wikipedia describes that in computer science, "a closure (also lexical closure or function closure) is a function together with a referencing environment for the non-local variables of that function. A closure allows a function to access variables outside its immediate lexical scope. An upvalue is a free variable that has been bound (closed over) with a closure. The closure is said to 'close over' its upvalues. The referencing environment binds the nonlocal names to the corresponding variables in scope at the time the closure is created, additionally extending their lifetime to at least as long as the lifetime of the closure itself. When the closure is entered at a later time, possibly from a different scope, the function is executed with its non-local variables referring to the ones captured by the closure."

US Patent Application 20120016678, assigned to Apple, is entitled Intelligent Automated Assistant, published Jan. 19, 2012, and filed Jan. 10, 2011. This published application describes an intelligent automated assistant system which "engages with the user in an integrated, conversational manner using natural language dialog, and invokes external services when appropriate to obtain information or perform various actions. The system may be implemented using any of a number of different platforms, such as the web, email, smartphone, and the like, or any combination thereof. In one embodiment, the system is based on sets of interrelated domains and tasks".

The disclosures of all publications and patent documents mentioned in the specification and of the publications and patent documents cited therein directly or indirectly are hereby incorporated by reference. Materiality of such publications and patent documents to patentability is not conceded.

SUMMARY OF CERTAIN EMBODIMENTS

The present invention typically includes at least the following embodiments:

Embodiment 1. An Intent Scoring Method, for predicting priority events and topics when a user is approaching a virtual agent/robot.

Embodiment 2. A method according to embodiment 1, which deploys a prediction model which uses key indicators derived from historical customer transactional activity for example credit card transaction or billing information.

Embodiment 3. A method according to embodiment 2 wherein the model generates a list of topics or events which the customer is likely to raise.

Embodiment 4. A method according to any of embodiments 2 or 3 wherein the system generates priority topics for prompting the customer before he inputs his request.

Embodiment 5. A method according to any of embodiments 2-4 wherein the system generates a combined score which includes the input of the customer for improving the accuracy of a text retrieval system.

Embodiment 6. A method for providing data aware agents having a data retrieval approach which connects a virtual robot/agent to enterprise systems being served.

Embodiment 7. A method according to embodiment 6 which imitates human agent activity by accessing the systems only when needed using a knowledge representation of data and reasoning process.

Embodiment 8. A method according to embodiment 7 wherein said system computes the necessity and/or cost for retrieving certain data element.

Embodiment 9. A method according to any of embodiments 7 or 8 wherein the method is able to playback human generated queries which are executed in real-time to capture additional information necessary to the continuation of the process.

Embodiment 10. A Smart Reasoning method which prioritizes asserted and inferred relations and deploys reinforced learning when selections set/s are empty.

Embodiment 11. A method according to embodiment 10 in conjunction with an Intent Scoring Method according to any of embodiments 2-5.

Embodiment 12. A method according to any of embodiments 10 or 11 in conjunction with a method for providing data aware agents according to any of embodiments 6-9.

Embodiment 11. A method according to any of the preceding embodiments wherein an automated chat system is provided which is operative to understand the user intent and to decide what should be the best response (dialog) to the user.

Embodiment 12. A method according to any of the preceding embodiments which requires the designer of the system to define less than all of the paths in the process (example: a→b→c, a→c→b).

Embodiment 13. A method according to embodiment 12 which requires the designer of the system to define none of the paths in the process.

Embodiment 14. A method according to any of the preceding embodiments which requires the designer of the system to define less than all of all options in all steps.

Embodiment 15. A method according to embodiment 14 which does not require the designer of the system to define any of said options.

Embodiment 16. A method according to any of the preceding embodiments which takes into consideration what the user did in the past.

Embodiment 17. A method according to any of the preceding embodiments which takes into consideration recent events which happened to the user and may have impacted his request.

Embodiment 18. A method according to any of the preceding embodiments which allows the user to take the conversation to different directions.

Embodiment 19. A method according to embodiment 18 which starts with a process to replace a card, asks about the balance of this card, and continues the replacement process.

Embodiment 20. A method according to any of the preceding embodiments which recommends to the user what should be the next logical step based on experience from other users.

Embodiment 21. A method according to any of the preceding embodiments which handles at least one undefined situation without escalation to a human agent.

Embodiment 22. A method according to any of the preceding embodiments which uses user historical behavior to decide which dialog to present to the user.

Embodiment 23. A method according to any of the preceding embodiments which uses at least one recent transactional event to predict the topic of the conversation.

Embodiment 24. A method according to embodiment 23 in which said prediction occurs sometimes without even asking the user.

Embodiment 25. A method according to any of the preceding embodiments 23 or 24 wherein said recent transactional event comprises a recent declined transaction.

Embodiment 26. A method according to any of the preceding embodiments which can start from any point with different type of inputs and decide based on current information what will or may be the next step.

Embodiment 27. A method according to any of the preceding embodiments including defining related dialogs to be injected into the conversation based on context.

Embodiment 28. A method according to embodiment 27 wherein said defining relates to a conversation related to a lost card or an issue of a card and the method then allows the user to look at delivery options.

Embodiment 29. A method according to any of the preceding embodiments which prioritizes for the user the most probable options on the top and other related options which were used by other users.

Embodiment 30. A method according to any of the preceding embodiments which suggests alternative steps based on "similar" and not only exact situations.

Certain embodiments of the present invention seek to provide an Advanced System and Method For Automated-Context-Aware-Dialog With Human Users.

In accordance with an aspect of the presently disclosed subject matter, there is provided apparatus for conducting a dialog with a user of at least one computerized enterprise system, the apparatus comprising:

an ontological topic definer including a processor using at least one ontological entity to define user dialog topics, each topic including:
  at least one reasoning item, each item intem including:
    a block identifying executable computer code operative to resolve the item; and
    a number of input parameters passed to the block; and
  a computerized dialog server operative for conducting a dialog with a user of at least one computerized enterprise system about an individual topic from among the user dialog topics.

In accordance with an aspect of the presently disclosed subject matter, there is provided a computer program product, comprising a non-transitory tangible computer-readable medium having computer-readable program code embodied therein, the computer-readable program code adapted to be executed to implement a method for conducting a dialog with a user of at least one computerized enterprise system, the method comprising:

using at least one ontological entity to define user dialog topics, each topic including:
 an item,
 a block identifying executable computer code operative to resolve the item; and
 a number of input parameters passed to the block; and
conducting a dialog with a user of at least one computerized enterprise system about an individual topic from among the user dialog topics.

In accordance with an embodiment of the presently disclosed subject matter, there is provided an apparatus wherein the dialog server interacts with an Intent Scoring functionality for scoring various intents on the part of a user approaching a virtual agent, the functionality's operation comprising:

predicting priority topics, including gathering first data and employing the first data to discern and seek user confirmation of at least one possible intent on the part of the user; and subsequent to receipt of the confirmation, gathering second data and employing the second data to provide service to the user to suit the user's confirmed intent.

In accordance with an embodiment of the presently disclosed subject matter, there is further provided apparatus wherein the dialog server interacts with a data-gathering system comprising:

a data-aware knowledge base storing knowledge on relative costs of obtaining various data items; and a data retrieval decision making processor operative, when an individual data element is sought to be retrieved, to determine whether or not to retrieve the data element by comparing at least one parameter representing need for the data element with at least one parameter, retrieved from the data-aware knowledge base, which represents relative cost of obtaining the data element.

In accordance with an aspect of the presently disclosed subject matter, there is provided a method for conducting a dialog with a user of at least one computerized enterprise system, the method comprising:

using at least one ontological entity to define user dialog topics, each topic including:
 an item,
 a block identifying executable computer code operative to resolve the item; and
 a number of input parameters passed to the block; and
conducting a dialog with a user of at least one computerized enterprise system about an individual topic from among the user dialog topics.

In accordance with an embodiment of the presently disclosed subject matter, there is provided a method wherein at least one logic code segment is used for a plurality of different discussion entry points.

In accordance with an embodiment of the presently disclosed subject matter, there is further provided a method wherein the conducting comprises conducting at least first and second dialogs with at least first and second users respectively, of at least first and second corresponding computerized enterprise systems respectively, including using a single logic code segment for at least first and second dialog portions, of the first and second dialogs respectively, which pertain to first and second products respectively, of the first and second corresponding computerized enterprise systems respectively.

In accordance with an embodiment of the presently disclosed subject matter, there is yet further provided a method wherein the data lookup comprises looking up data about the user, which is stored in the enterprise system.

In accordance with an embodiment of the presently disclosed subject matter, there is yet further provided a method wherein the data lookup comprises looking up statistical data about at least one population of users to which the user belongs.

In accordance with an embodiment of the presently disclosed subject matter, there is yet further provided a method wherein the first and second enterprise systems comprise first and second banks respectively and wherein the first and second products comprise first and second financial services offered by the first and second banks respectively.

In accordance with an embodiment of the presently disclosed subject matter, there is yet further provided a method wherein a directed graph is generated from links between items wherein each link has the following form:

Item X→parameter→itemReference→item Y.

In accordance with an embodiment of the presently disclosed subject matter, there is yet further provided a method wherein the item, block and at least one parameter are stored as an ordered list.

In accordance with an embodiment of the presently disclosed subject matter, there is yet further provided a method wherein at least one item includes a segment of interactive dialog to be presented to a user.

In accordance with an embodiment of the presently disclosed subject matter, there is yet further provided a method wherein at least one item includes a computation to be performed.

In accordance with an embodiment of the presently disclosed subject matter, there is yet further provided a method wherein at least one item includes a query to be presented to an external computerized system.

In accordance with an embodiment of the presently disclosed subject matter, there is yet further provided a method wherein at least one item includes at least one action to be executed on an external computerized system.

In accordance with an embodiment of the presently disclosed subject matter, there is yet further provided a method wherein at least one parameter comprises at least one ItemReference including a reference to at least one other item (referenced item) to be used as an input for the block.

In accordance with an embodiment of the presently disclosed subject matter, there is yet further provided a method wherein each item includes an autoResolve flag indicating whether or not the item is to be resolved.

In accordance with an embodiment of the presently disclosed subject matter, there is yet further provided a method wherein each item includes a condition indicating whether or not an item is to be executed based on the item's input parameters.

In accordance with an embodiment of the presently disclosed subject matter, there is yet further provided a method wherein at least one parameter comprises a logical expression (valueExpression) which generates a result value of the parameter by combining an itemReference with at least one of:
 another itemReference; and
 a constant.

In accordance with an embodiment of the presently disclosed subject matter, there is yet further provided a method wherein at least one ItemReference includes an isRequired flag indicating whether the item is an optional input for the block or a required input for the block.

In accordance with an embodiment of the presently disclosed subject matter, there is yet further provided a method wherein at least one ItemReference includes a quantification of the referenced item's business value to the item which includes (owns) the parameter.

In accordance with an embodiment of the presently disclosed subject matter, there is yet further provided a method wherein at least one topic includes an indication of a level of user authentication required to execute the topic.

In accordance with an embodiment of the presently disclosed subject matter, there is yet further provided a method wherein the block comprises a reference to at least one of a procedure, class, and rule base, thereby to identify executable computer code operative to resolve the item.

In accordance with an embodiment of the presently disclosed subject matter, there is yet further provided a method wherein closure-based variable scoping is applied to the directed graph.

In accordance with an embodiment of the presently disclosed subject matter, there is yet further provided a method wherein backward-chaining-based logic is applied to the directed graph.

Also provided, excluding signals, is a computer program comprising computer program code means for performing any of the methods shown and described herein when said program is run on a computer; and a computer program product, comprising a typically non-transitory computer-usable or -readable medium e.g. non-transitory computer-usable or -readable storage medium, typically tangible, having a computer-readable program code embodied therein, said computer-readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer-readable storage medium.

Any suitable processor, display and input means may be used to process, display e.g. on a computer screen or other computer output device, store, and accept information such as information used by or generated by any of the methods and apparatus shown and described herein; the above processor, display and input means include computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine-readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 1a-10b illustrate various embodiments of an example mobile banking system, including a smart reasoning subsystem also termed herein a "smart reasoner", according to certain embodiments.

FIGS. 11-19 illustrate characteristics and modules of an advanced system for automated-context-aware-dialog with human users, some or all of which characteristics and modules may be provided optionally in conjunction with characteristics and modules shown and described with reference to FIGS. 1a-10.

FIGS. 20-22 are a flowchart, table and example diagram respectively useful in understanding methods for mid-dialog fork prediction constructed and operative in accordance with certain embodiments of the present inventions.

Figure 1A:
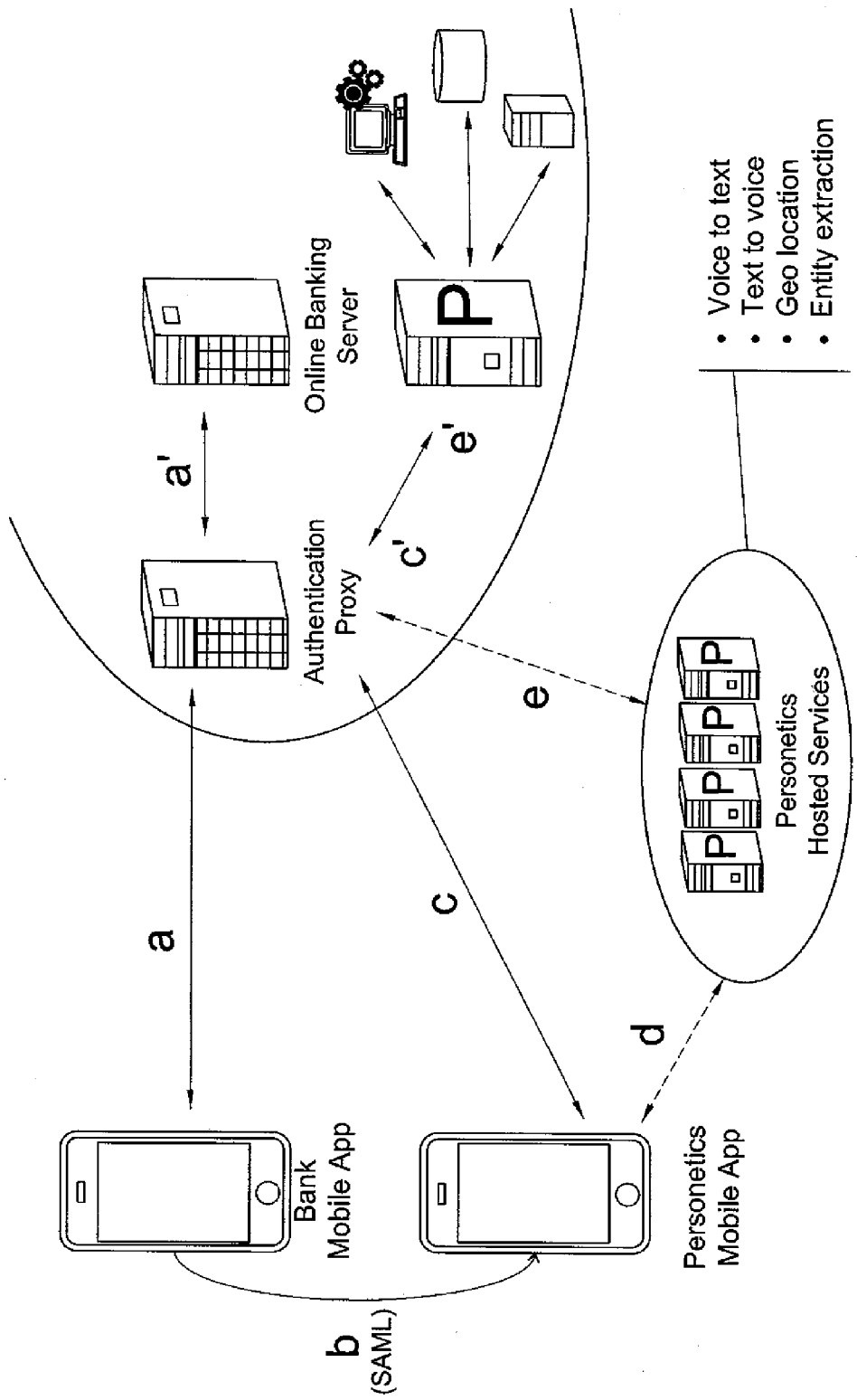

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer-readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more tangible or intangible computer-readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

Tables herein may according to certain embodiments include only some of the fields and/or records shown.

DETAILED DESCRIPTION OF CERTAIN EMBODIMENTS

Various embodiments of an example mobile banking system, including a smart reasoning subsystem also termed herein a "smart reasoner", are first described in detail with reference to FIGS. 1a-10. It is appreciated that some or all of the characteristics and functional units of each embodiment may be provided and others omitted, as desired; and that embodiments or some characteristics and functional units thereof may be combined with one another, as suitable.

An advanced system for automated-context-aware-dialog with human users is next described with reference to FIGS. 11-19. It is appreciated that the system may facilitate dialog pertaining to the user's interactions with any suitable enterprise or computerized complex data system, of which computerized banks are merely one example for simplicity; for enterprises other than banks, suitable modifications may be employed mutatis mutandis as would readily occur to the ordinarily skilled man of the art. It is appreciated that some or all of the characteristics and functional units of the system may be provided and others omitted, as desired. Also, some or all of the characteristics and functional units of the system of FIGS. 1a-8g may be provided in conjunction with, or may be used to implement, functionalities of the system of FIGS. 11-19.

According to one embodiment, an Intent Scoring Method and system are provided, for predicting priority events and topics when a user is approaching a virtual agent/robot. A diagram of an example intent scoring functionality is provided in FIG. 5a. Intent Scoring functionality typically enhances the accuracy of natural language understanding and improves the reasoning process, by creating & factoring key indicators derived from profiling internal bank data and additional external sources.

In intent scoring, typically, each solution contains a set of a few or a few dozen or a few hundred Key Indicators (KIs) that may perform one or more of the following functionalities:

1. Analyze the current activity
2. Compare the current activity to multiple behavioral profiles
3. Try to recognize Statistic Significances for the discussion topic.

KIs groups may include some or all of:

- KIs that run on dialog data such as but not limited to the geo-location of the user at the call may contradict some topics (overseas, etc.).
- KIs that run on internal system data—such as but not limited to complaint history of the user which may contribute to the probability analysis of that topic.
- KIs on short period information—Example: rejected withdrawal attempt in the last hour may greatly increase the probability that the user is contacting the bank regarding this topic.
- KIs on history period—Example: chargeback ratio of a merchant may support the probability of all the merchant issue topics of all the users that purchased there in the last 30 (say) days.
- KIs on reference data—Example: A soon-to-occur expiration date of a card may contribute to the total probability of topics that have relation to card replacement and address update topics.

KIs analysis is typically followed by score adjustment. Score adjustment typically comprises some or all of the following operations:
1. Translate each significant KI outcome to a "local" statistical classifier.
2. Run an "Ensemble Learning" to combine the multiple "local" classifiers into one "global" classifier that may represent the impact of all the Ms.
3. Consolidate the Ms global classifier with the original NLP score.
4. Normalize the consolidated score.

The outcome of this phase typically comprises an adjusted reasoning score that may be used to decide the type and the content of the return dialog to the user.

In addition to the NLP score adjustment, the solution may also utilize Intent Scoring to support the reasoning process. The following are some examples, some or all of which may be provided:

A customer which is about to or already maxed on his cards.

The complaint history of the user may support the action decision at current complaint.

An abnormally high complaints ratio about a specific merchant may lead to a temporary change at the write-off limit for complaints about the same merchant.

Close expiration date of the card may increase the probability if adding an up-sale option to any or all card usage related reasoning.

According to one embodiment, the system deploys a prediction model typically having intent scoring functionality as described herein, which uses key indicators e.g. derived from historical customer transactional activity for example credit card transaction or billing information. The model generates a list of topics or events which the customer is likely to raise. The system generates priority topics for prompting the customer before he inputs his request and a combined score which includes the input of the customer for improving the accuracy of a text retrieval system.

According to one embodiment, data aware agents are provided having a data retrieval functionality which connects a virtual robot/agent to the enterprise systems.

Virtual robots typically require external data from the enterprise systems to answer questions and to generate a dialog with the customer. Virtual agents are conventionally preloaded with vast amounts of data to be able to perform. According to one embodiment, the system includes data aware agent/s which imitate human agent activity by accessing the systems only when needed e.g. by using a knowledge representation of data and reasoning process which computes the necessity, or utility, and cost for retrieving certain data elements. Typically, a mechanism is provided which is able to playback human generated queries which are executed in real-time to capture additional information which may be useful or necessary to the continuation of the process.

According to one embodiment, a Smart Reasoning system is provided which typically uses a domain-specific artificial intelligence computerized process which improves the limitation of current goal-driven expert systems.

Certain traditional goal driven systems use many rules; cannot easily adapt to new/situations; do not learn by experience and are not good at representing spatial knowledge. The system shown and described herein typically implements a conceptual learning capability which organizes knowledge in a generalized and abstract form, while at the same time making the system more useful and robust when coping with environmental changes. For example, actions acquired for one subject may be available for similar, but non-identical subjects. The system typically prioritizes asserted and/or inferred relations and/or deploys reinforced learning when selections set/s are empty.

According to one embodiment, 1 or 2 or 3 of the Intent Scoring data aware agents and Smart Reasoning subsystems are provided, having a synergistic relationship therebetween.

According to one embodiment, an automated chat functionality is provided which is operative to understand the user intent and to decide what should be the best response (dialog) to the user.

Conventional automated chat systems use Natural Language Processing (NLP) to classify the user input and a script or decision tree to define different paths which may decide the next dialog in the process. This approach is often limited in terms of flexibility and does not allow incorporation of artificial intelligence into the process.

Features of the above-described invention which are described in the context of separate embodiments may also be provided in combination in a single embodiment. Conversely, features of the invention, including method steps, which are described for brevity in the context of a single embodiment or in a certain order may be provided separately or in any suitable sub-combination or in a different order. Any or all of computerized sensors, output devices or displays, processors, data storage and networks may be used as appropriate to implement any of the methods and apparatus shown and described herein.

A first embodiment of a mobile banking system is now described with reference to FIGS. 1a-7L.

According to certain embodiments, computerized experts are provided e.g. experts on some or all of the following: bill pay product, credit product, transfer product, fees, lost & stolen, transaction dispute, sign-in, card usage. Example screenshots for a transaction dispute expert are provided in FIGS. 1d-1e. An example screenshot for a marketing product expert is provided in FIG. 1f.

According to certain embodiments, there is an advance from a generic technology to a domain-specific solution, by formalizing an ontology of customer service in the financial industry, and by providing banking-specific high level building blocks. The system may employ data analysis of bank records and real-time profiles to improve the system understanding and reasoning capabilities and to achieve a meaningful and personalized customer experience.

Reasoning capabilities may continuously evolve in two parallel threads:
Reduce the number of business rules by utilizing higher level terms to express more generalized logic; and using reinforced learning to acquire new knowledge from customers and bank "advisors".

Figure 1B:
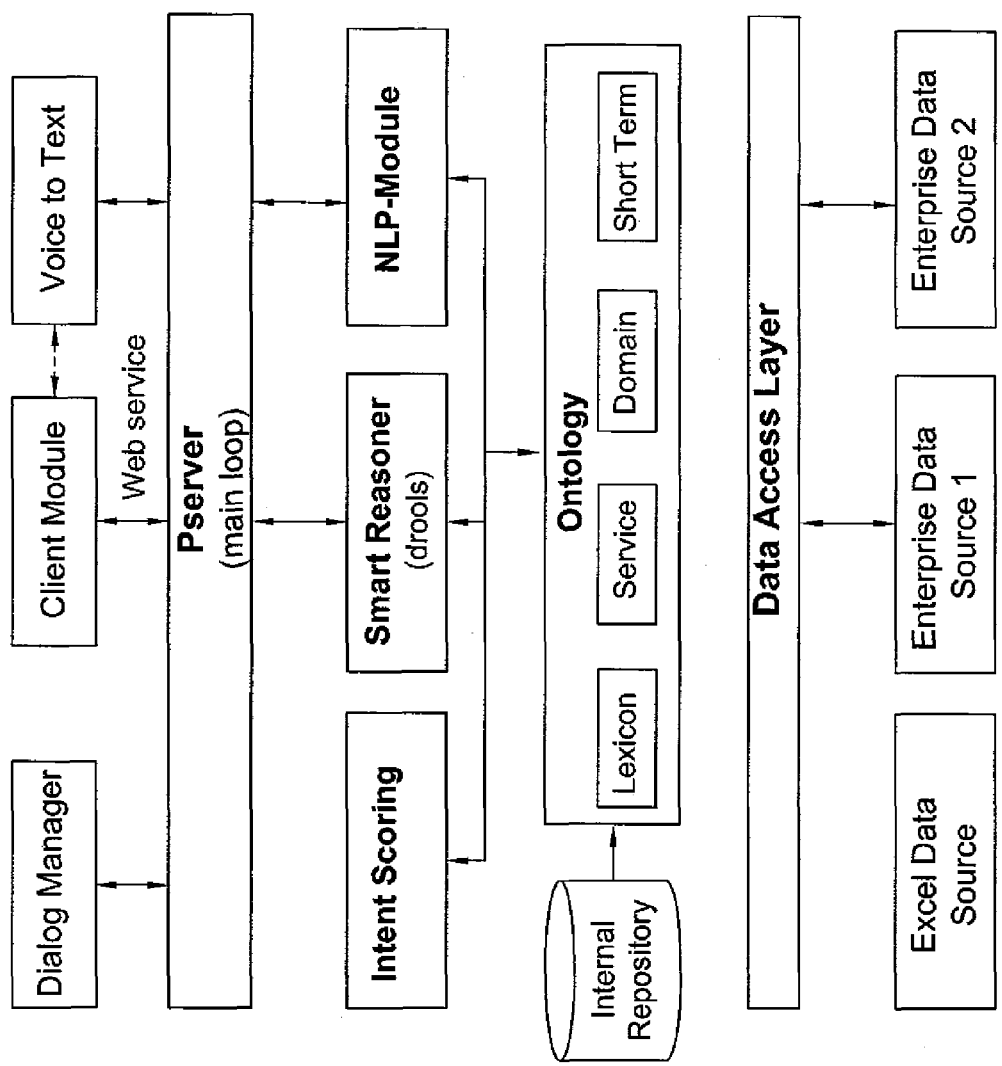
Figure 1C:
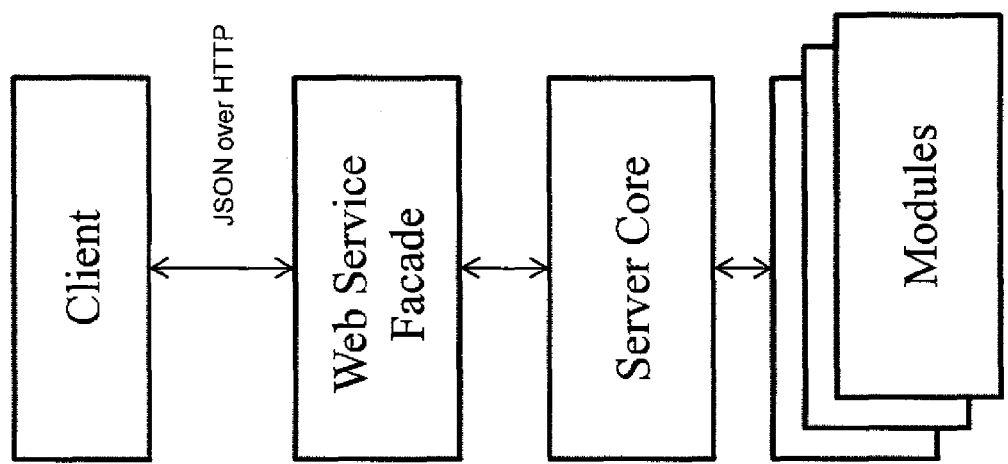

The system may:
Employ industry standard frameworks e.g. for voice recognition, Natural Language Processing, rules managements, screen scraping.
Utilize a hybrid cloud/on-site architecture, keeping customer data inside, while hosting shared knowledge, reasoning and domain assets.
Use a thin-client native-app approach combining HTML with minimum native code to leverage device-specific capabilities such as but not limited to iPhone or Android.
FIG. 1a is a top-level illustration of a mobile banking system in which "Personetics" is used to represent a component constructed and operative in accordance with an embodiment of the present invention. FIG. 1b is a functional block diagram of the system of FIG. 1a. FIG. 1c is a breakdown of the P-server of FIG. 1b. The server core may comprise a robust multi-module, multi-session core. A main execution loop may provide some or all of: input processing, voice improvement, NLP, Smart Reasoner and dialog manager. Web service implementation for protocol support and isolation may be provided. Multi-threading may be employed for concurrency, isolation & locking. Data access synchronization may provide delayed access to external data sources.

Client modules may be characterized by some or all of:
Multi-client support
  iOS, Web, Android, WP7, etc.
Native implementations
  Direct access to device capabilities
Smart server architecture
  Simple client main loop, commands, events and UI actions
Web service protocol
  REST implementation: XML (JSON) over HTTPS
Advanced dialogs
  Transaction selection, map view, voice capture, signature capture, evidence photography Voice to text may be characterized by:
Initial speech to text
  For example, the system's hosted web service may use technology from Nuance for basic voice-to-text functionality
Integration
  Voice is channeled directly from client device to a system-hosted service, reducing loads on bank networks
Data improvement logic
  The system may employ statistical models based on sampling and analysis to improve recognition for banking text
  Domain specific recognizers e.g. syllable level recognizer functionality for the banking domain A training algorithm may be used for voice improvement, e.g. using:
Input text: a multiplicity e.g. ~10,000 voice records from several e.g. a few or 5 or 10 or 15 or 50 different speakers
Output text: ~120,000 (say) text alternatives from Nuance The training algorithm may include some or all of the following functionalities, performed in a suitable order e.g. as follows:
Run Minimum Edit Distance (MED) algorithm—to locate pairs of words at the input and output text
Compute probability of input word given an output word in order to recognize typical pairs of mistakes and "Must Stay words" P(input word|output word)= P(i|o)=P(o|i)*P(i)/P(o). //using Bayes rule where P(x)=C(x)/C, C is the total number of words in the corpus and P(x|y)=C(x,y)/C(y)
Cross-validation process to handle multiple outputs of Nuance and to check the impact of lower ranking text from Nuance to the overall result. P(o1,o2,o3. .|i)=P_1 (o1|i)*P_2(o2|i)*P_3(o3|i). . where P_1 is the regular probability that we computed, P_2 (x)=P_1(x)^a/P_1^a where 0<a<1 and the same for P_3 etc.
Run Hidden Markov Model (HMM) and Viterbi algorithm on stems and after removing stop words for locating "hidden" pairs of mistakes to be added to the "Replace Pairs" and "Must Stay" lists (words and strings)

Figure 2:
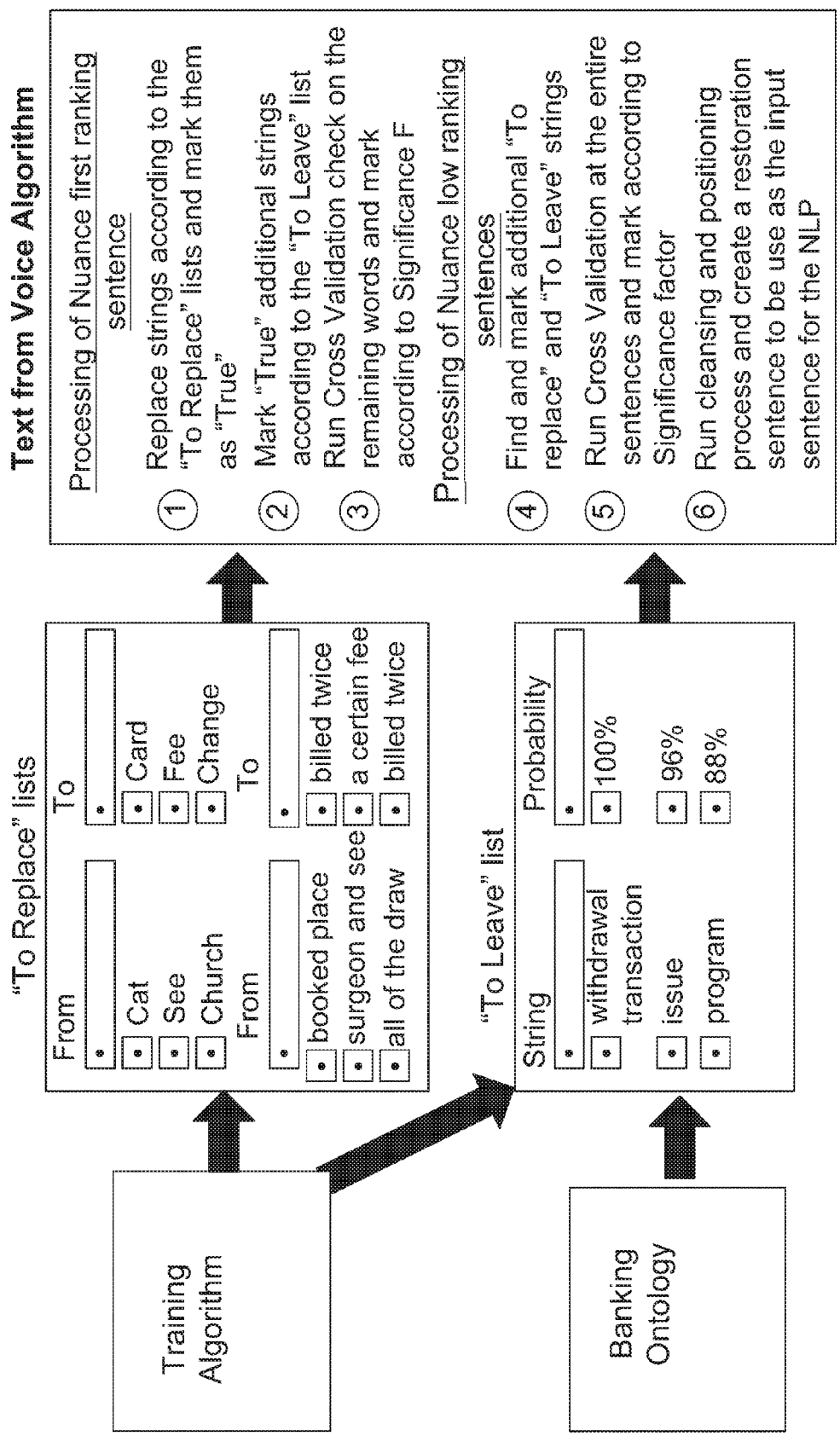

FIG. 2 is a diagram of a voice improvement algorithm including steps as shown, some or all of which may be employed, in any suitable order e.g. as shown.

NLP functionality, e.g. as shown in the screenshot of FIG. 3a or the implementation of FIG. 3b, may be characterized by some or all of:
Goals—Classification of input sentence to a representing topic—rank the topics according to their likelihood reason (class) for an input sentence. Find a list of supportive hints—Entities.
Infrastructure e.g. some or all of:
  NLP pipe based on the GATE framework including some or all of:
    Sentence splitting, tokenization, lemma, gazetteer, part of speech, chunking, semantic parser
    Normalization using general & domain specific entities
    Multi-level classification including some or all of:
      Action type, subject, product, source, negative
    Machine learning-based training Statistical approach may be a consolidation of instance-based learning (e.g. including k-nearest neighbor algorithm and probabilistic "generative" model of the reasons e.g. as shown in FIGS. 3c and 4a-4b.

FIG. 3b may relate to merchants, locations, credit cards, dates, addresses, phone numbers, amount, etc.

Referring again to the statistical consolidation of instance-based learning and a probabilistic "generative" model, also termed herein "classifiers", once scores from both classifiers are available, a consolidation process may be followed to yield one ranked list of reasons. Consolidation may include some or all of the following operations, suitably ordered e.g. as follows:
1. Rank all the reasons according to the MAX score at both methods.
2. Increase score by X % to reason that is the first rank at both of the methods.
3. Increase score by Y % for any reason that is one of the top 3 at both methods.
4. Normalize the scores.

Figure 5A:
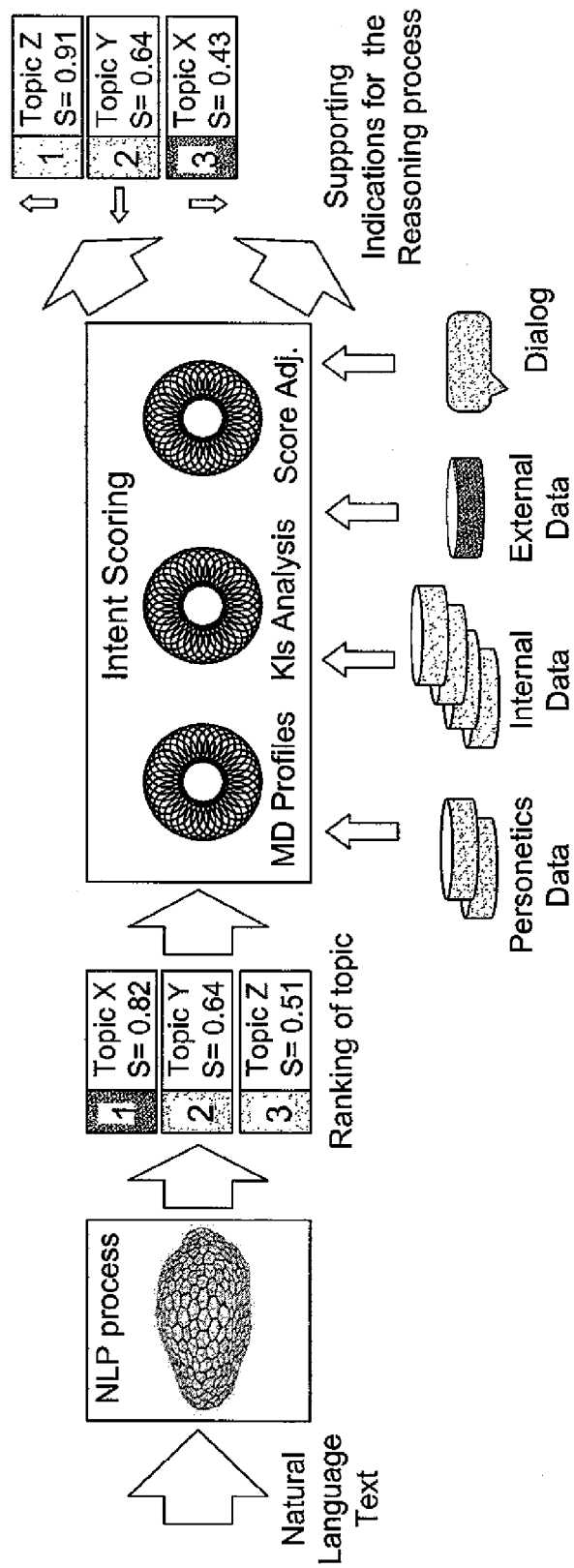
Figure 5B:
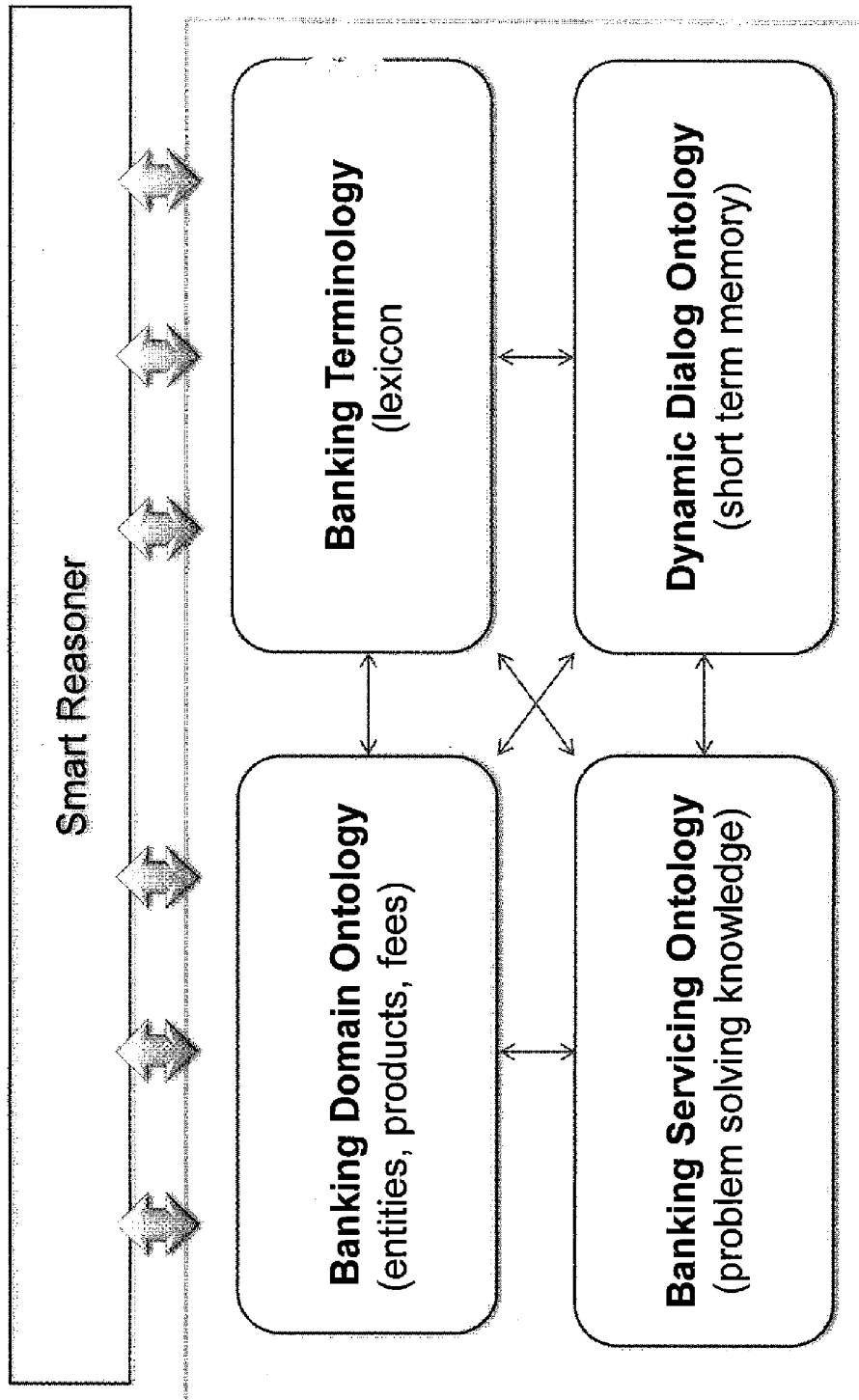
Figure 5C:
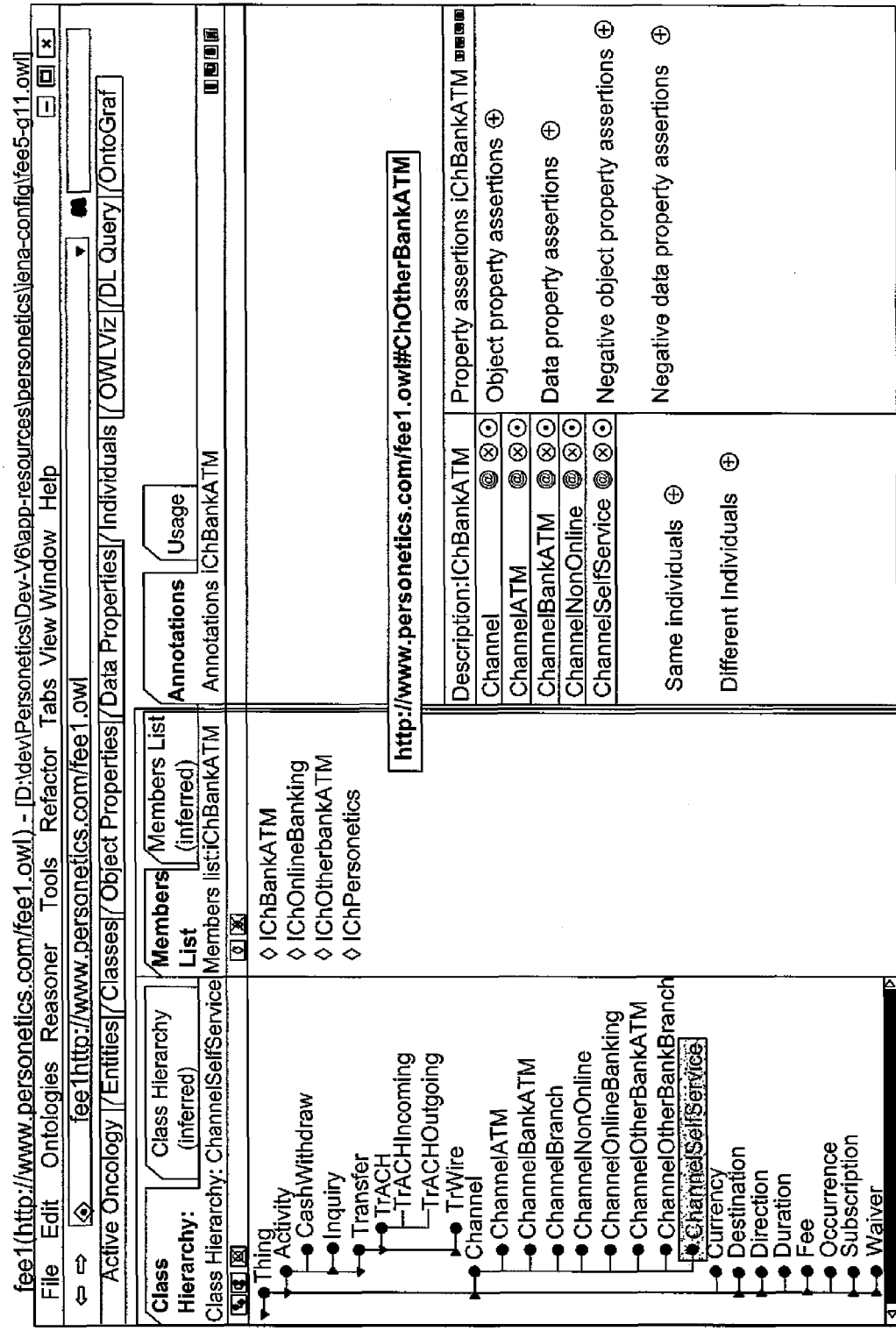
Figure 5D:
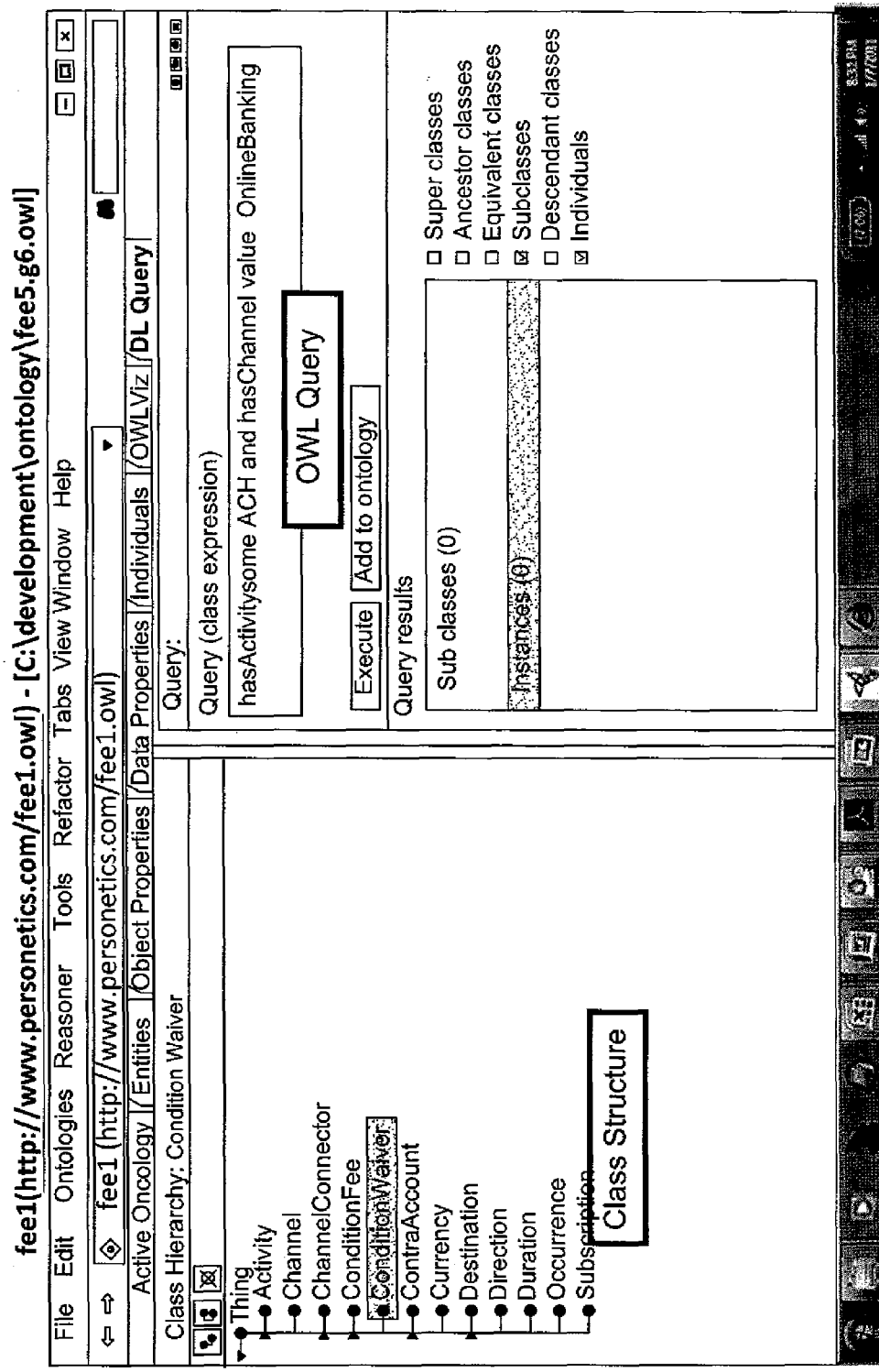
Figure 5E:
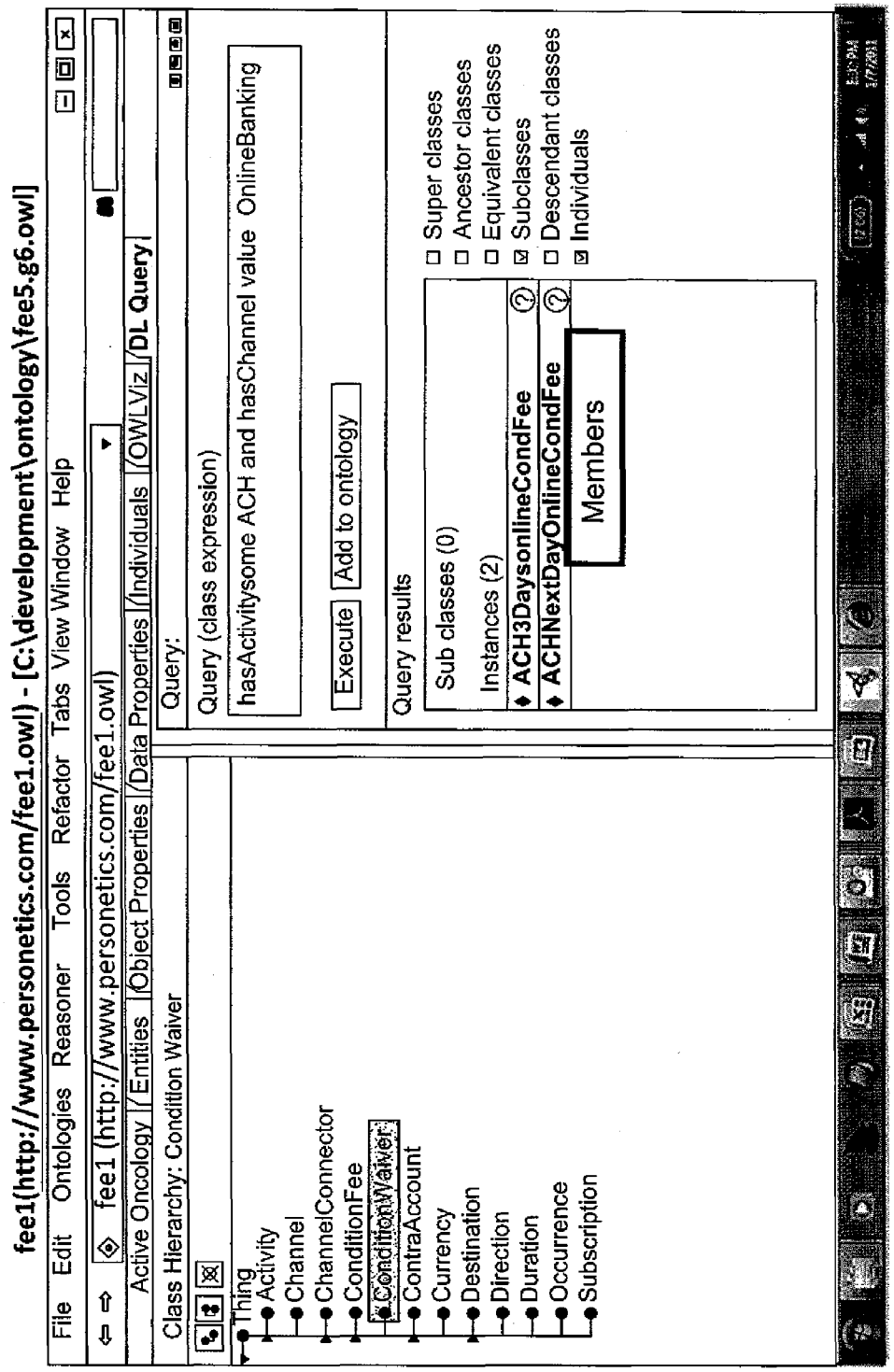
Figure 5F:
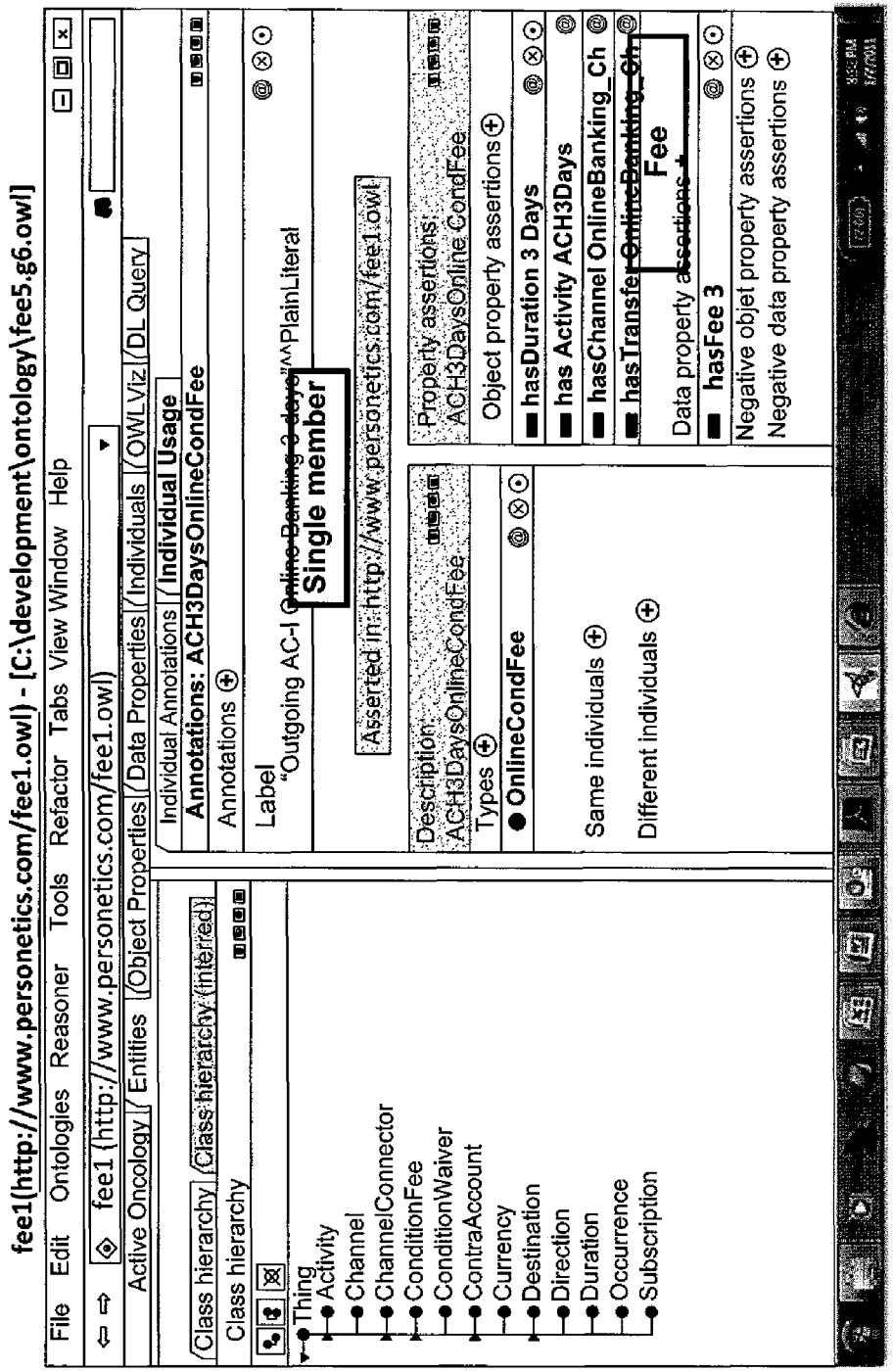
Figure 5G:
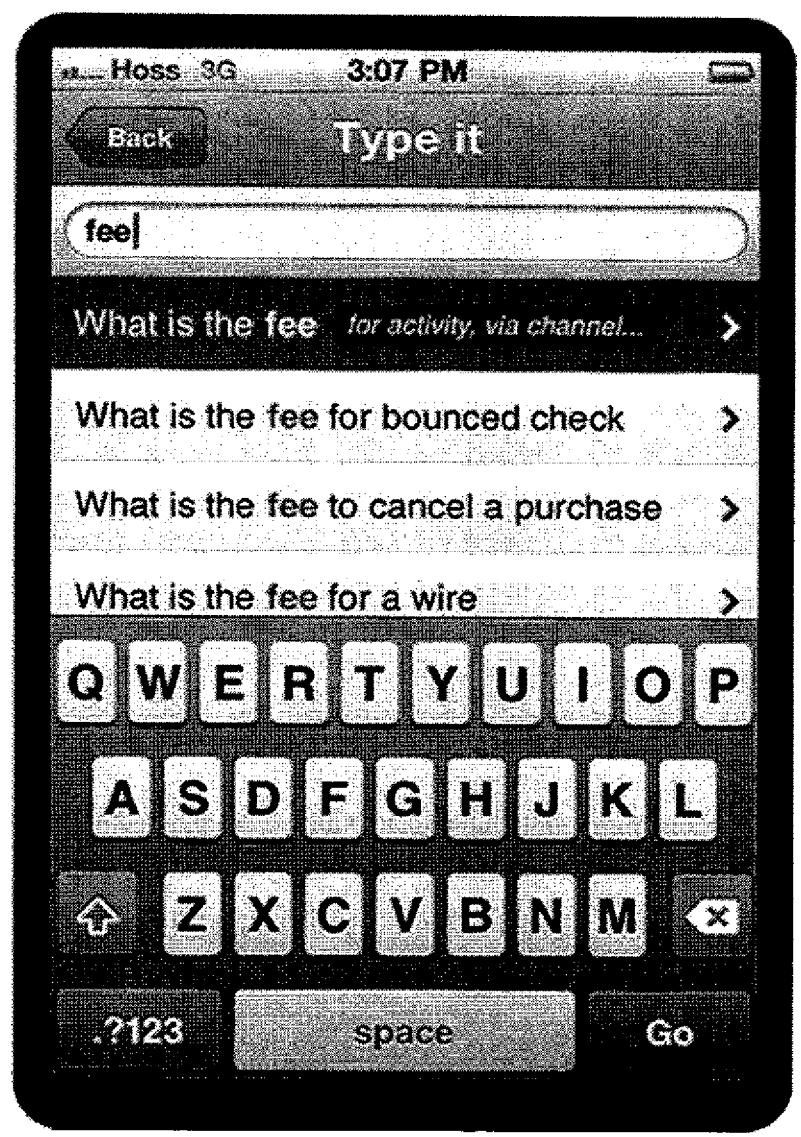
Figure 5H:
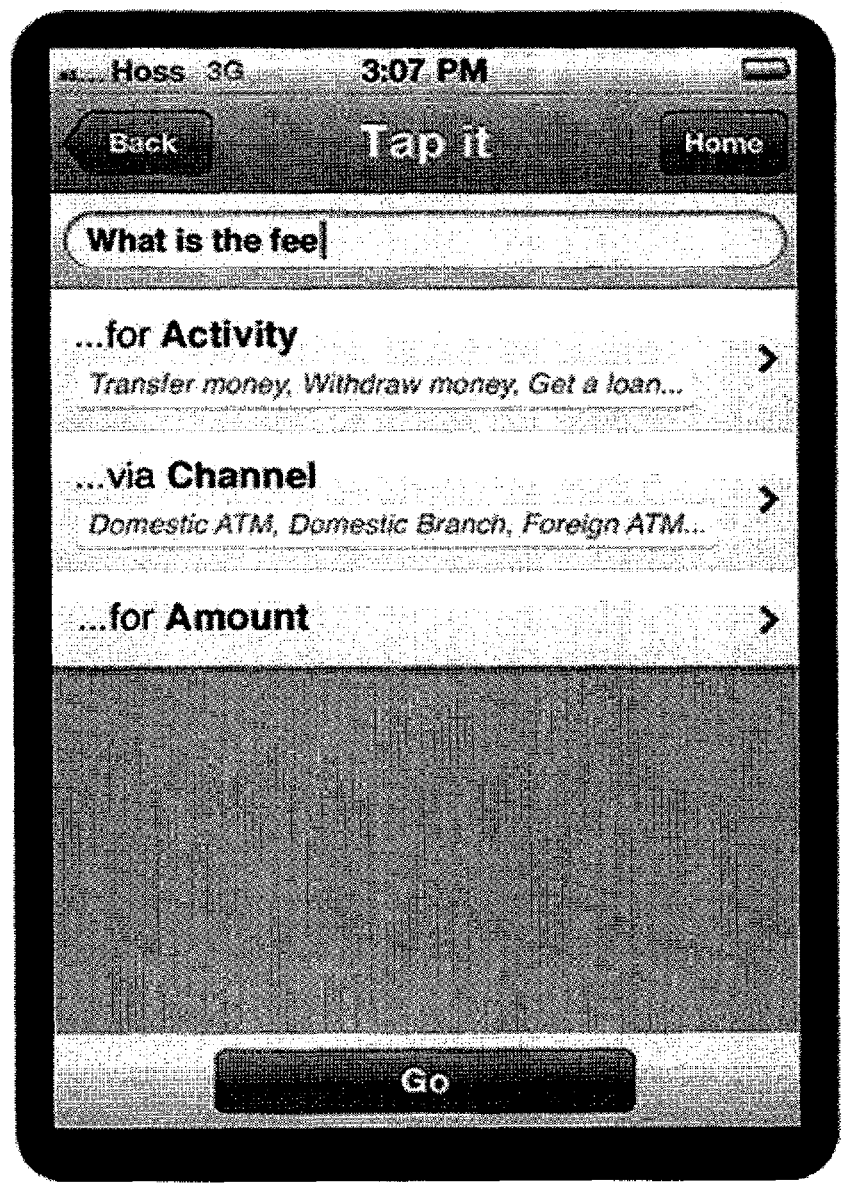
Figure 5I:
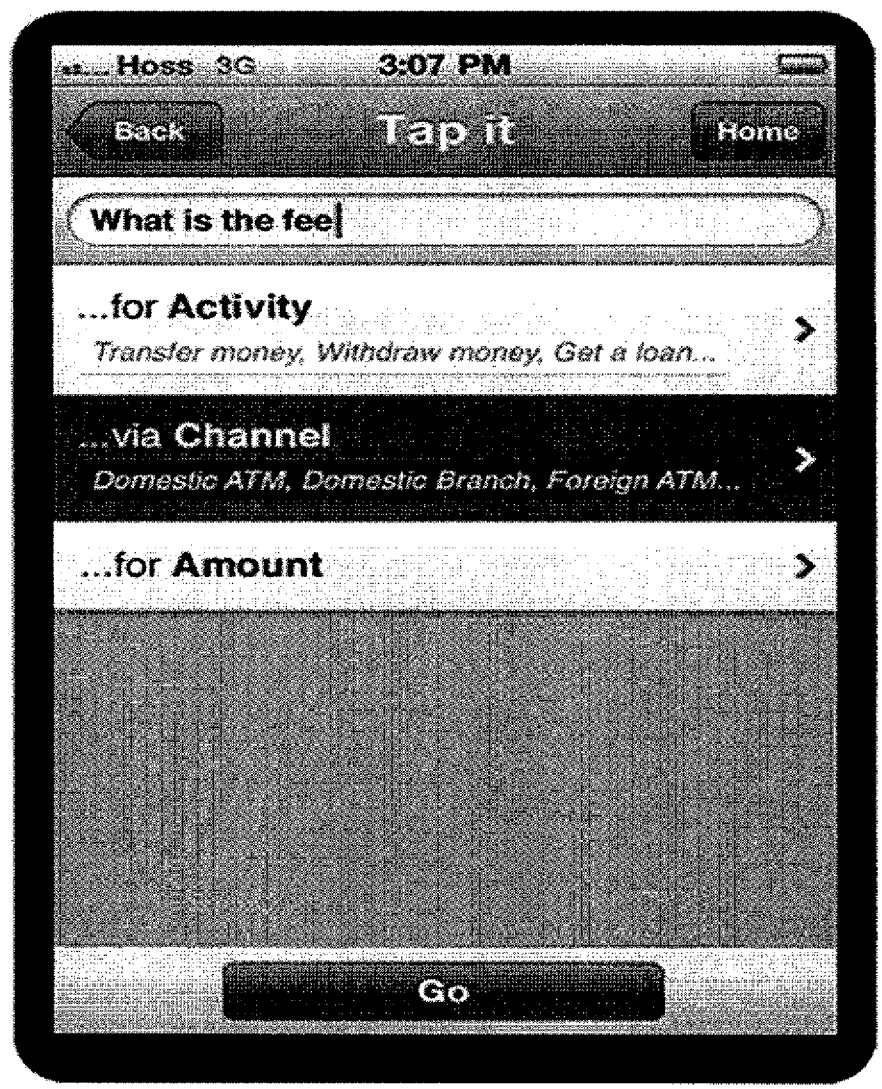
Figure 5J:
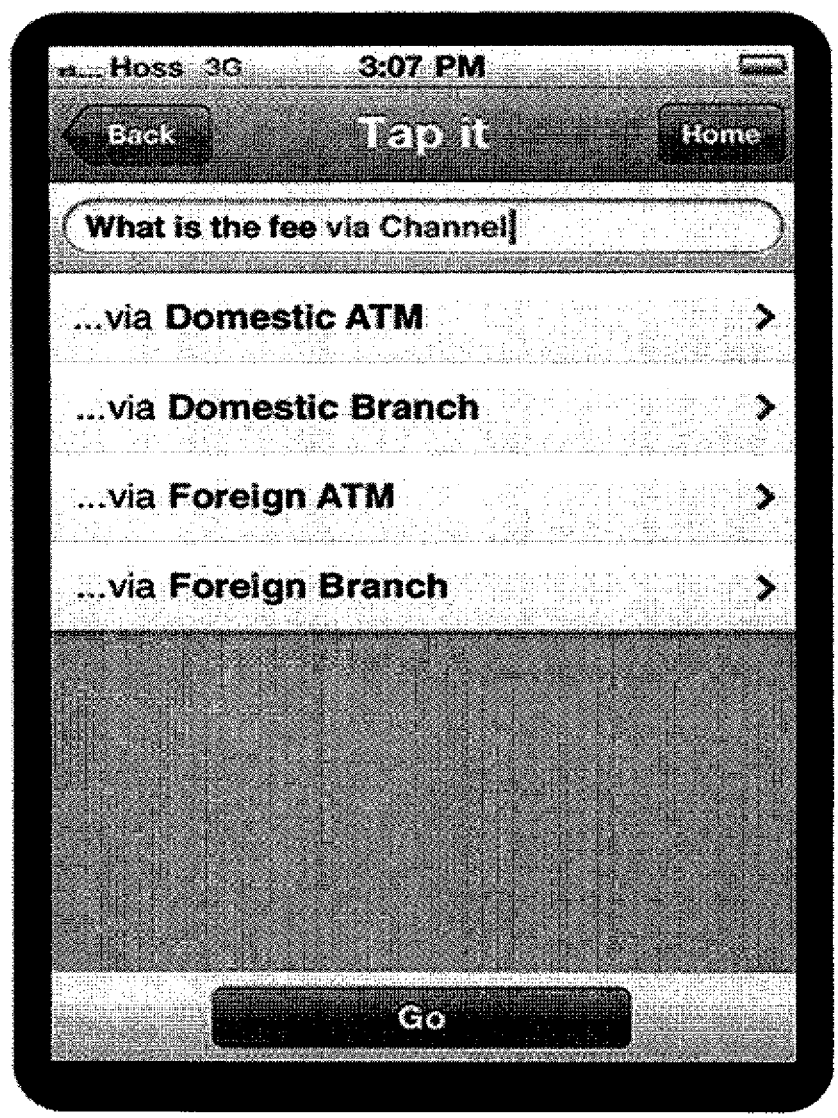
Figure 5K:
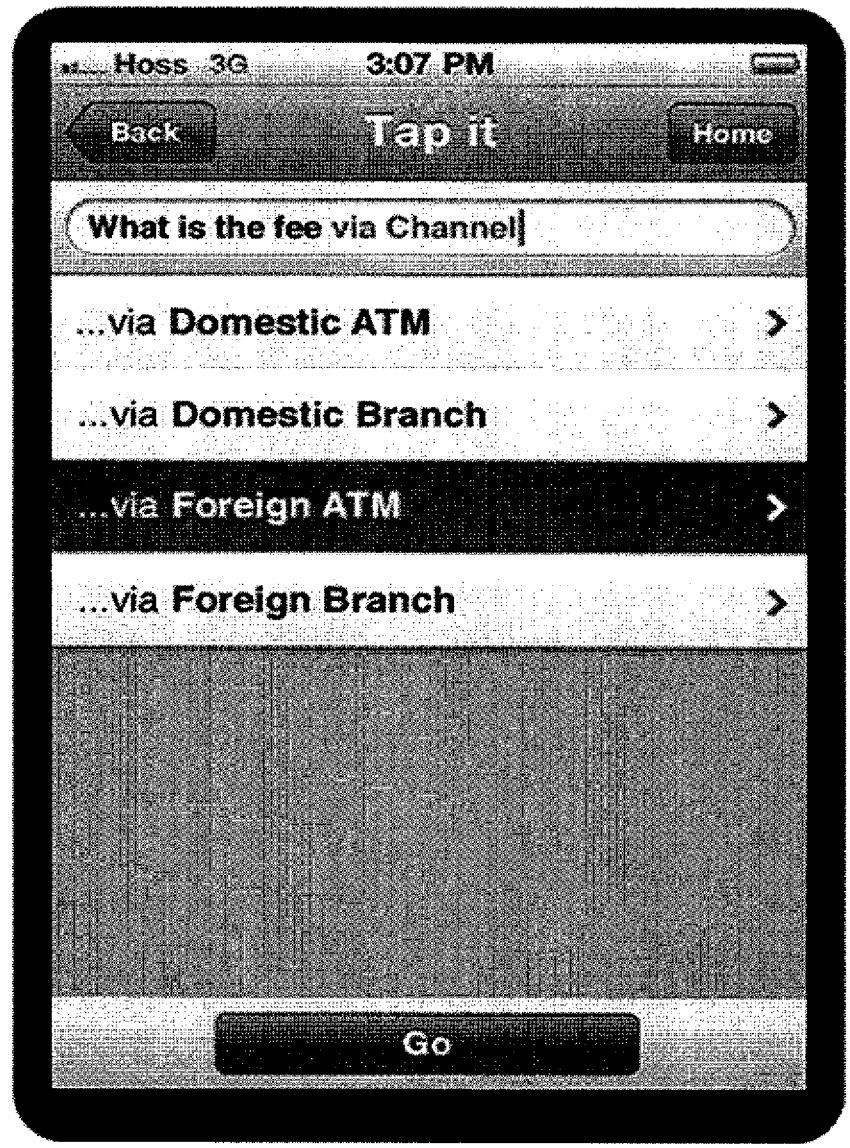
Figure 6A:
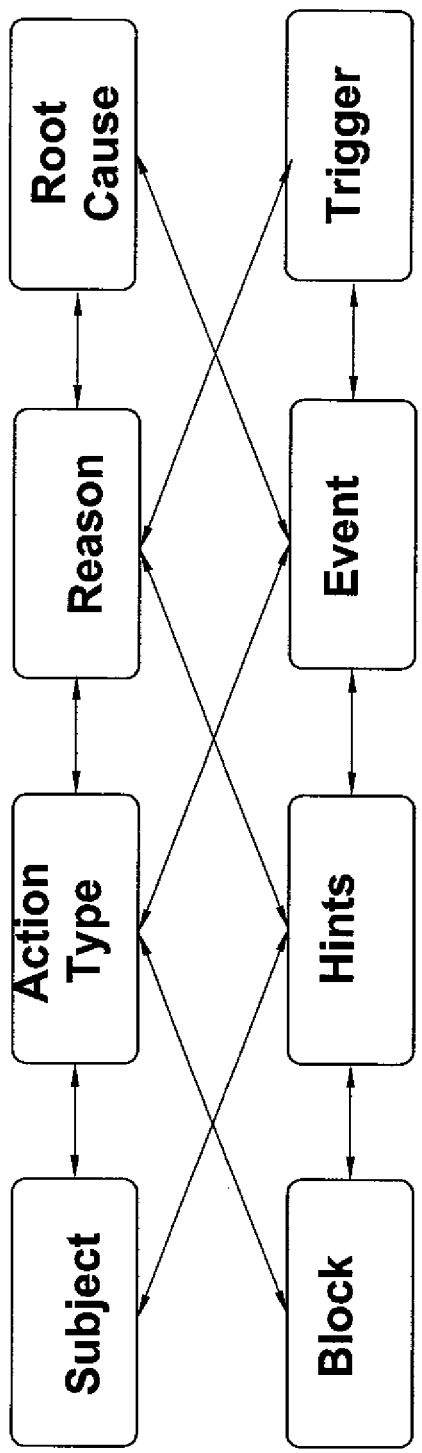
Figure 6B:
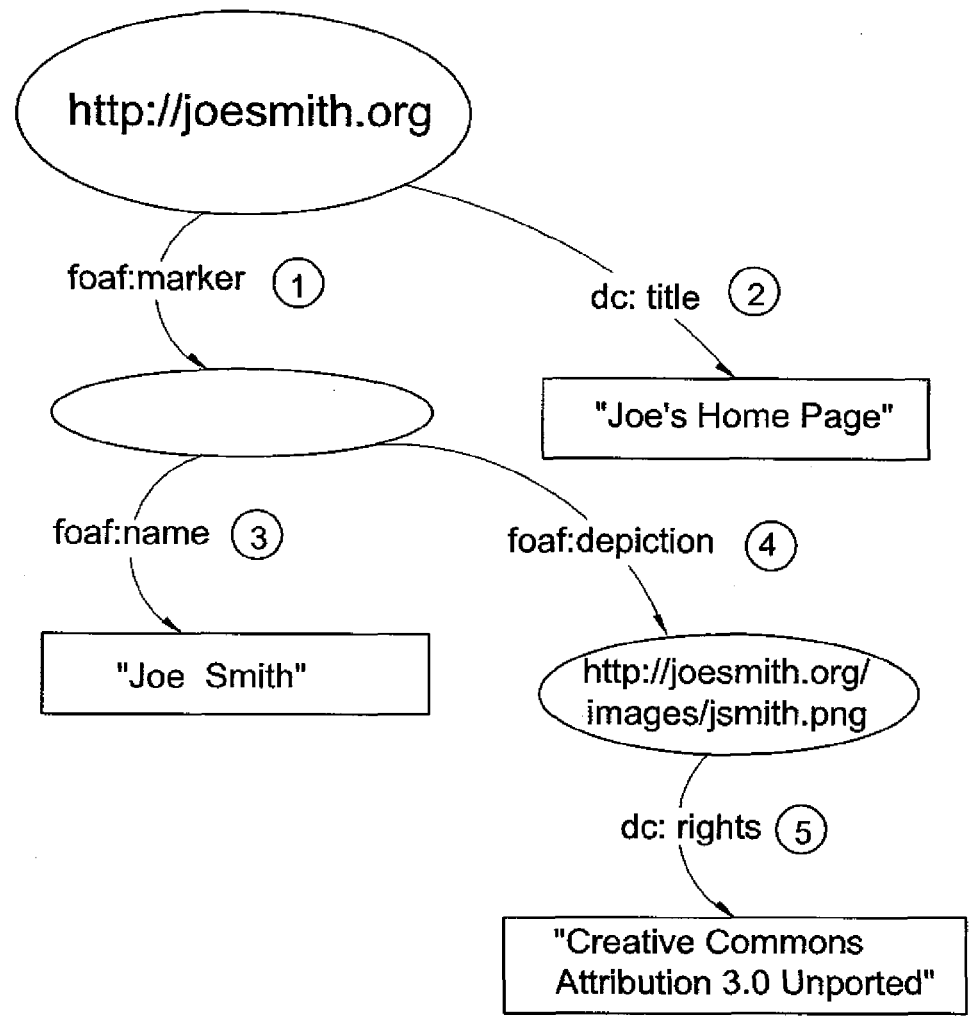

An example knowledge representation including, inter alia, a banking domain ontology, a banking service ontology, a dynamic dialog ontology and a banking terminology subsystem is diagrammed in FIG. 5b. Example screenshots generated by a banking domain ontology are shown in FIGS. 5c-5f. Example screenshots showing a user view of a banking domain ontology are shown in FIGS. 5g-5k. An example diagram of a banking servicing ontology is shown in FIG. 6a. Example diagrams and screenshots showing a dynamic dialog ontology are shown in FIGS. 6b-6e.

Banking domain ontology may be based on Semantic Web standards, e.g. RDF, OWL, Triple store (quads), Jena, and Sparql. Generalization may use OWL reasoners and classifiers. Assertions and queries may use high level classes.

Banking servicing ontology typically comprises formal representation of banking service knowledge as a set of concepts within a domain and the relationships between those concepts. Inferred and asserted relations may be provided e.g.:
Subject "Missing card" may need to have at least one event.
All reasons of type "merchant issues" require a trigger of type purchase.
Action type "Cancel card" requires block "escalation".
Dynamic reasoning is a functionality typically including data structure optimized for dynamic data collection and reasoning which supports rapid queries and ad-hoc sub structures. Typically, dynamic reasoning is based on semantic quads, where:
  Triplets: subject+predicate+object
  Quads: triplets+named graphs.
One or more of the following advanced features may be provided: full dialog audit; support for logic rewind; and support for multiple-issue discussions.

The Smart Reasoner is typically operative to drive dialog to a satisfactory resolution of servicing request, in a minimum number of steps. For example, a customer complains s/he could not complete a purchase. There are many different root causes (Card has expired? An issue with the customer address? Customer did not swipe his card correctly?). Each root cause may require different data elements or questions (Query rejected authorizations for a card/date! Ask customer if he was able to complete other purchases with card!).

Figure 7A:
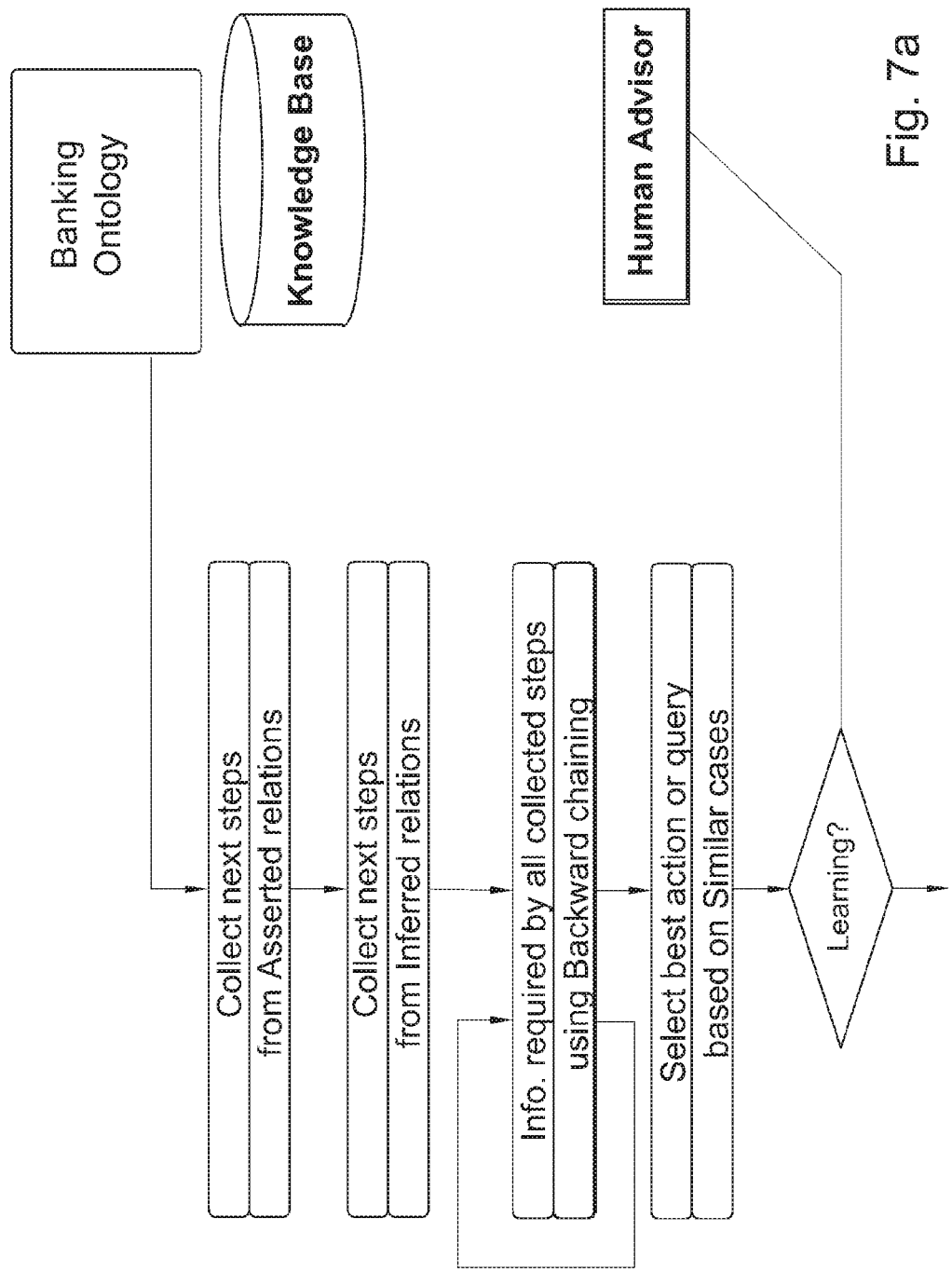

FIG. 7a is a flow diagram of an example Smart Reasoner process; some or all of the operations shown may be provided, suitably ordered e.g. as shown. The Smart Reasoner may employ asserted relations to make explicit relations to possible next steps. Example: User asks about the fees related to a certain account. Reasoner locates a possible step which is based on the specific account type (entity) in the ontology and retrieves the fees using a "hasFee" relation. Smart Reasoner may use Inferred relations, including high-level knowledge assertion using ontological class hierarchies. Example: User requests a refund for a cancelled check fee. Reasoner unable to find any specific rule, but it is able to retrieve an Inferred relation which handles any refund request by gold customers. This capability allows for knowledge to be expressed in terms general enough to be relevant to every individual which is included in the set.

Smart Reasoner may optionally use "Required Information" to satisfy information requirements present in some embodiments, to support the selected solution's next steps. Typically, the Reasoner analyzes the different variables which are included in all selected next steps and tries to retrieve them using a goal-driven approach. Example: Customer complains about unrecognized TX. Solution set includes a process which is dependent on the amount of the complaint. Reasoner may try to identify the amount of the TX, and if it does not have facts identifying the TX, it may define a new goal—identify the TX. It may then attempt to first identify the TX.

The Smart Reasoner is typically operative to select best next step. Typically, Reasoner selects best next step based on one or more of: a score combining a generalized form of similar cases, cost of obtaining information and additional considerations. For example: The system evaluates past history for a subject and discovers that in all cases which had certain similar features, the most successful next step is to identify the TX early in the dialog.

Smart Reasoner is typically operative for reinforced learning. An advisor may be prompted to select a recommended next step. A transcript of the dialog, all the collected variables and applicable general knowledge is presented. If the dialog results in an ability to manually identify a recommended root cause, control is returned to the Reasoner.

Smart Reasoner is typically operative for reinforced learning. Each recommendation represents a connection between a set of variables and relevant next step. A generalization service typically aggregates the relations to detect strong and weak relationships (probability-based). This allows the system to constantly improve its accuracy and also generates actions to new instances based on selections of relevant historical relations.

A dialog manager may be provided which may provide some or all of:
  Dialogs with a human touch e.g. some or all of personalized text, adaptive interaction modes, semantic variations, chit-chat.
  Flexible input processing e.g. some or all of type-it, say-it, menu-based selection, natural language commands.
  Robust configuration e.g. some or all of easy definition of dialog units, multilingual support
  Async events typically including support for out of flow events, rewind option, context switching for multi-issues dialogs.

Referring again to FIG. 1b, a Data Access Layer typically provides delayed access to external systems e.g. some or all of:
  Banking Service Data Model
  Mapping Layer
  Data Access Connectors such as web service connectors, DB/SQL connectors, CSR Desktop Connectors.

The Data Access Layer of FIG. 1b may have a Banking Service Data model which defines the data elements required for servicing customer requests e.g. "Purchase MCC" or "Authorization reject code". There may also be a Mapping Layer which, for each element and access type, defines the connector details where that data is found/action is taken e.g. "Find authorizations for card" or "Cancel a card".

CSR Desktop Connectors may be provided to the system, e.g. a human-less CSR Desktop may be assigned to the system which conducts dialog with customer. As dialog evolves, the system runs scripts on the human-less CSR Desktop to access CSR screens. Screen scraping technology is used to convert the screen into data elements.

Screen scraping technology may include some or all of the following: script reorder which automates data extraction without any programming; scraping compatibility with Win Apps, web pages, terminal emulators; extraction tools e.g. rich text pattern matching capabilities and/or OCR tailored for graphics screens; and embedded toolset by "Automation Anywhere".

Figure 7B:
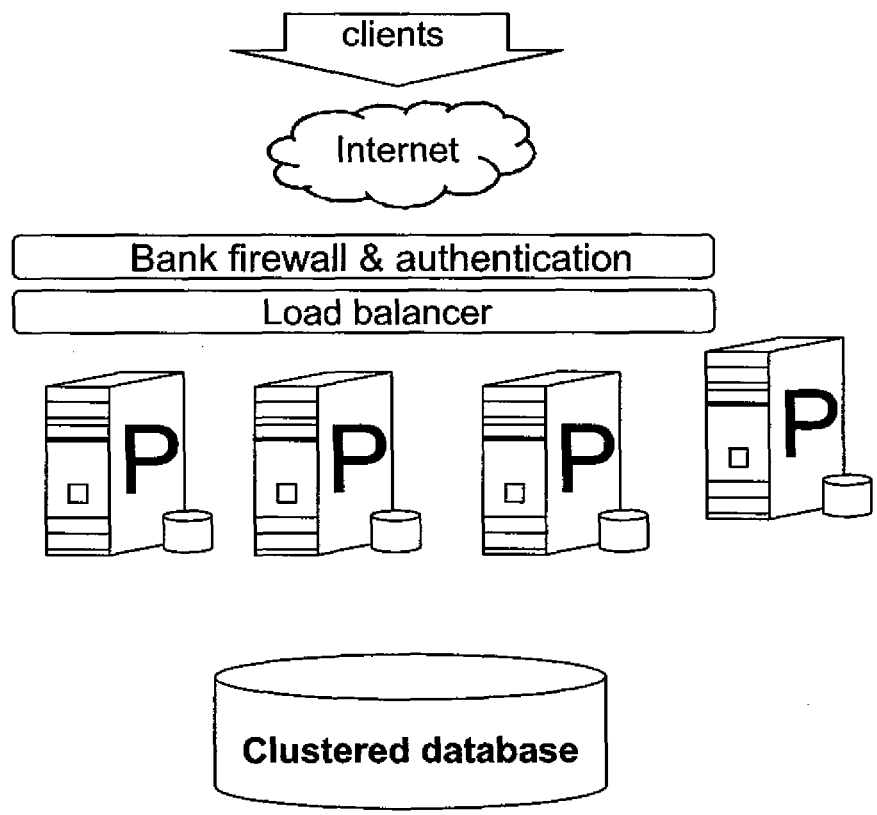

As shown in the example system architecture diagram of FIG. 7b, the system may include clients e.g. mobile (iPhone, Android), web, a network typically behind bank firewall & authentication and load balancer, PServer nodes typically scalable, multi-tiers on same node, with sticky sessions, and a central database typically with high availability and clustered.

The system may be implemented as an app launched by mobile banking supporting iOS (iPHONE, iPOD, iPAD), Android, etc. Native iOS app leverage Smartphone hardware may be provided, using webkit to display HTML content. A first-time launch may prompt to install app. Login may be done by mobile banking app.

Figure 7C:
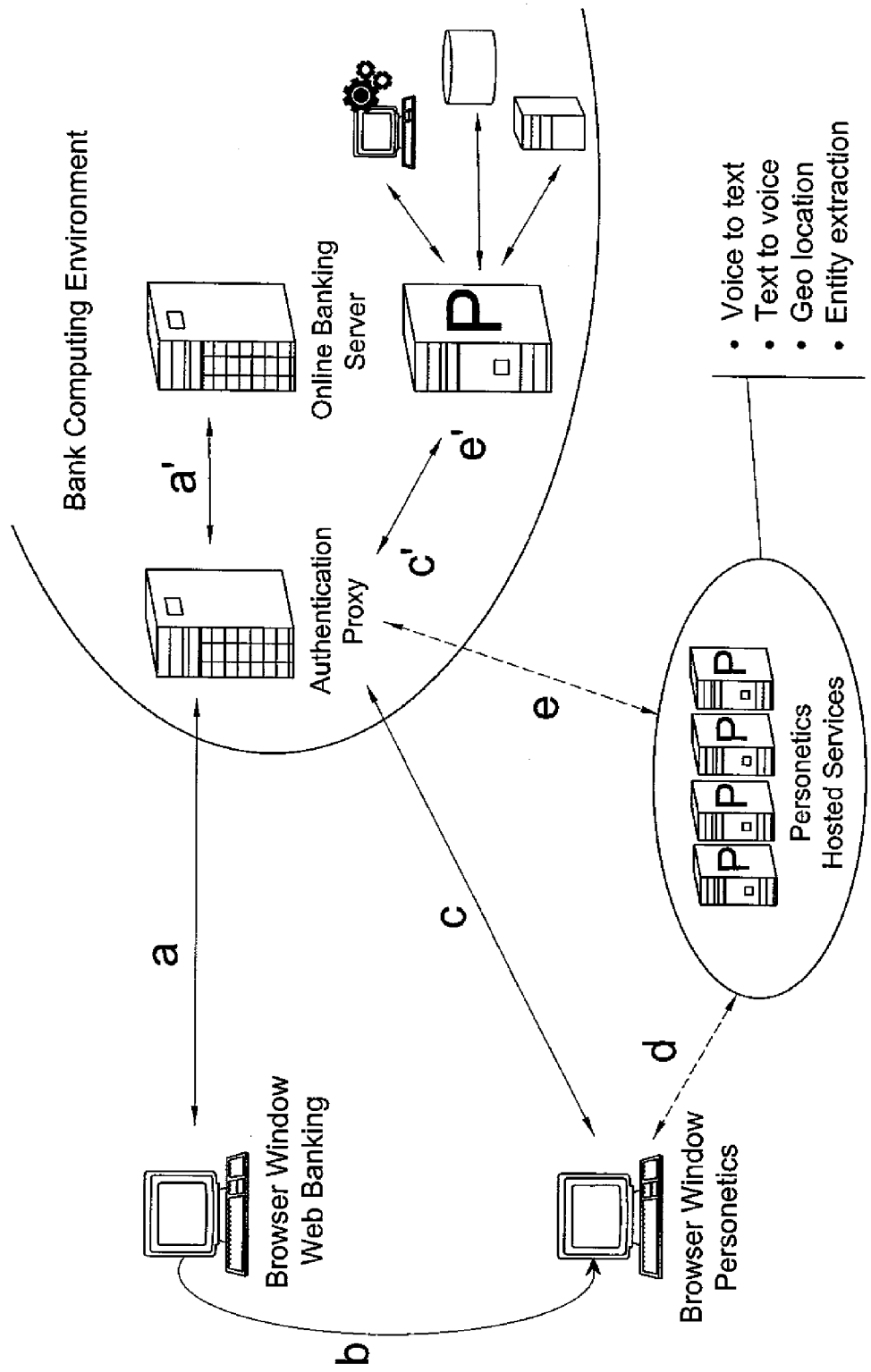
Figure 7F:
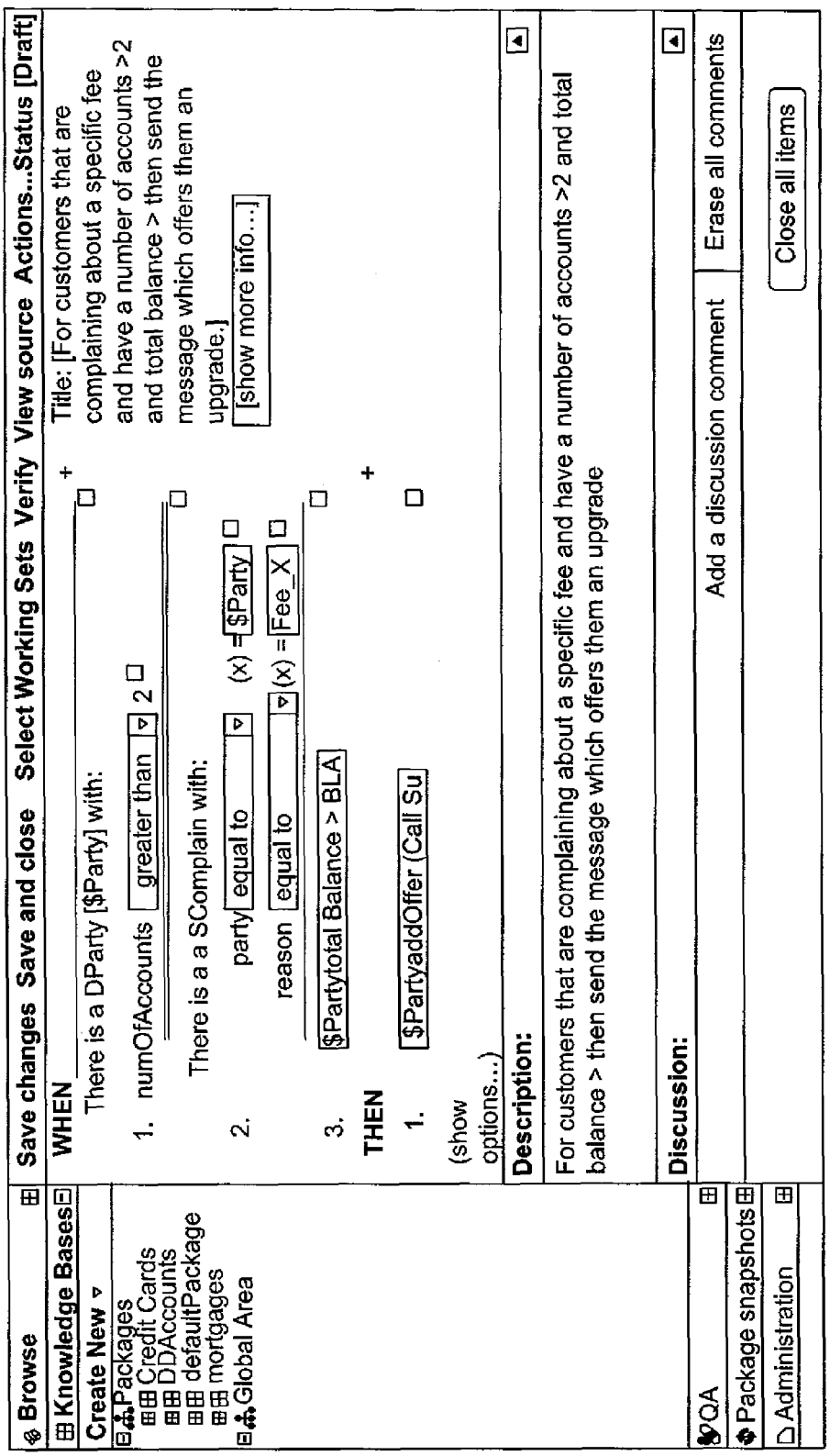
Figure 7G:
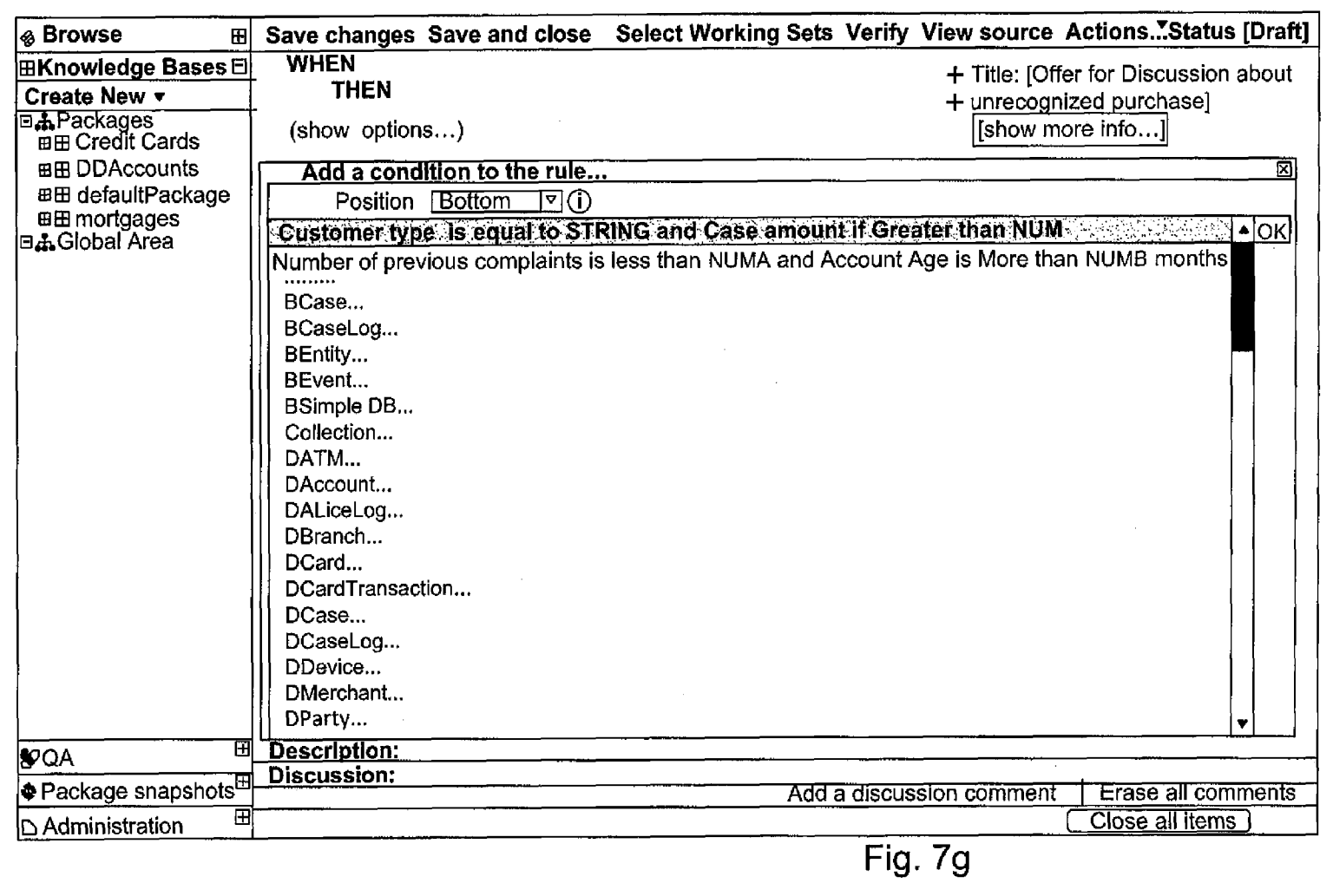

Mobile banking deployment may be as shown in FIG. 1a. In web banking use cases, the system may comprise a browser window launched by web banking (may also use iFrame). FLASH/HTML 5 may be used to access microphone. Typically, no installation is required and login is done by web banking Web banking deployment may be as shown in FIG. 7c. Bank policy function may provide an application to force an action in specific situations, or to limit what the Reasoner is allowed to offer; and a method having business rules using financial terms; and logic which has access to customer data and intent.

When Digital Personal Banker cannot address the customer's request, the case may be transferred to a live agent, e.g. as per some or all of the following considerations:

Contact center work load and queue management.

Eliminate need for customer to re-authenticate, when relevant/possible.

Resume case from where it ended with customer satisfaction.

Flexible transfer module allows tailoring to each bank's mechanism and support both transfer to a phone agent and a chat agent Prior to transfer the conversation may be saved to banks CRM/case management system, allowing agents full access to the dialog with the system of the present invention.

An example output is shown in the screenshot of FIG. 7d.

General, rule, selection and template views of an example bank policy function are shown in the screenshots of FIGS. 7e, 7f, 7g, and 7h-7j respectively. It is appreciated that some service issues may be defined as requiring manual e.g. human assistance, such as some or all of those listed in the tables of FIGS. 7k-7L.

Figure 8B:
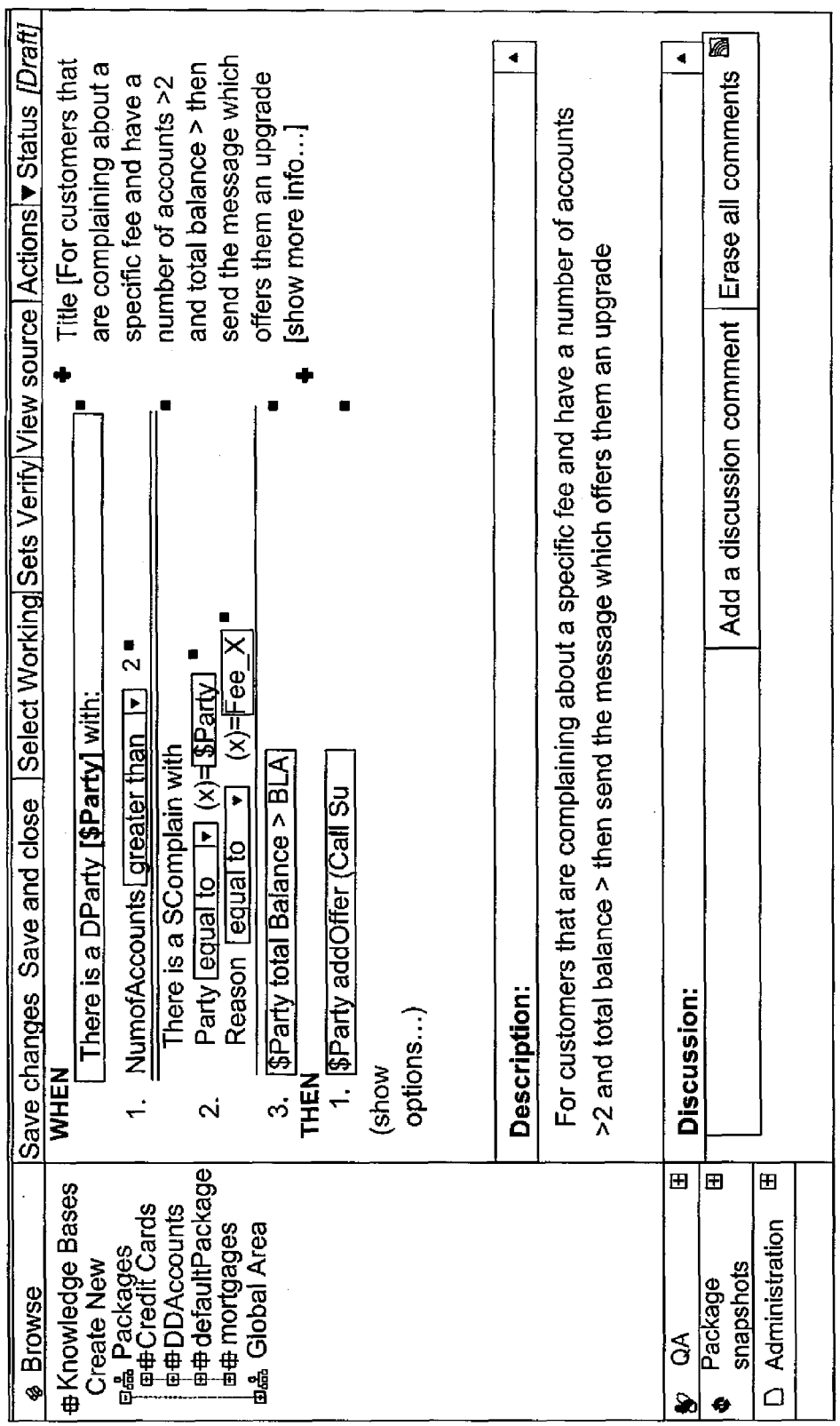

An offline process for capturing user input, useful in conjunction with the mobile banking system or other dialog-conducting systems shown and described herein is now described with reference to FIGS. 8a-8c.

The system of the present invention may operate an offline process supported by tools which capture user input and incorporate the captured input into the system, e.g. some or all of the following:

To manage and edit the ontology knowledge, an existing ontology editor may be used which may be customized to support specific requirements. Add-ins may be incorporated which express process knowledge including priorities, data requirements and other elements, some or all of which may be included in a customer service ontology.

FIG. 8a is an example screen display which expresses data variable requirements for lost & misused bank card issues (topics).

Knowledge import: Banks maintain and publish detailed documents regarding the fees and the products that they are offering. The system may employ an easy import process which allows collecting data from documents and sheets which are controlled by the bank into an ontology structure. This process may conserve much implementation time and may use and/or reuse general available knowledge sources which are already maintained and updated by the banks e.g. Excel based documents.

Most financial institutions implement a very similar service process to support their customers. Still there are differences which may need to be implemented by the bank. To support this, a user interface may be provided to allow a bank to add their own logic and rules into the system. The logic may be a simple rule for escalation or a complete new step based on a unique business requirement, e.g. as shown in FIG. 8b which is an example in which the bank wants to offer an account upgrade for wealthy customers.

Human advisor: it is desired to be able to transfer the process to a human agent. Such a requirement may be derived from a failure of the system to retrieve any next step or from a business policy which "escalates" a discussion or dialog, for example for cases related to a large amount or which require an expert agent review. The transfer process may collect all relevant information e.g. some or all of the history of the dialog, collected variables and knowledge to a view. The agent may use the view screen and may be able to alter the progress of the process or to take over completely, e.g. as shown in FIG. 8c, which is an example of an advisor screen which supports both view and manual intervention by the agent.

A Data Access Layer may provide an interface between a server serving a system according to an embodiment of the present invention and external data sources such as but not limited to existing banking core systems, banking web services and databases. The module may use conventional "screen scraping" techniques to access banking information through a graphical user interface used by human service agents. This capability may give the system access to the virtual agent desktop which exists today in most banks and contains relevant information which may be required for the agent and the system of the present invention to execute decisions.

To support the "screen scraping" which may comprise data mapping, a GUI interface may be provided which facilitates mapping a set of screens used by call center agents and graphically describes an automation task to retrieve data.

A second embodiment of a mobile banking system is now described with reference to FIGS. 8d-8f. Intent Scoring, according to this embodiment, is operative for achieving accurate level of understanding in the specific context of customer requests, overcoming limitations of Natural Language Understanding using predictive analytics.

Conventional predictive analytics in "data rich" environments, such as banks, has reached a level where it is possible to accurately predict the probability of each customer activity. Such probability scores are already used in critical business decisions such as credit scoring (customer will/will-not pay their balance), and fraud scoring (the customer is/is-not the person making the request). It is possible to enhance the accuracy of the understanding, in "data rich" environments, by factoring in key indicators, described herein, which are derived from profiling data. The key indicators are derived from transactional data, house-holding data, click stream, peer groups, bank-wide events, and more.

Smart Reasoner according to certain embodiments operates a hybrid reasoning algorithm which adds continuance learning capability to the classic goal-driven approach. Conventional goal-driven systems often cannot easily adapt to new/unusual situations; do not learn by experience and are not good at representing spatial knowledge. Typically, the Smart Reasoner has conceptual learning capability operative to review knowledge in a generalized and abstract form e.g. actions acquired for one subject are available for similar, but non-identical subjects, while at the same time making the system more useful and robust when coping with environmental changes. Typically, the Smart Reasoner utilizes relevant context information represented in an ontology to appropriately tailor its responses to each specific situation. Smart Reasoner may take into account recent actions and events, current goals and priorities.

Two processes for collecting hints may be employed:
1. NLP process, which is operative to collect hints from the user input.
2. Profile analytics, which is operative to collect key indicators based on the user transactions.

An intent scoring module is typically operative to accurately classify the customer request to the different classifiers (subject, action type, source, relations) together representing the user intent. An ontology is typically operative to collect and represent knowledge about the domain (e.g. products and rates, problem-solving [issues and potential resolutions], track the progress of the conversation).

The Smart Reasoner may use a hybrid of goal-driven reasoning, continuance learning capability and context-based information to drive the next set of sequence of actions.

FIG. 8d illustrates possible interactions between the modules and data described herein. Modules in FIG. 8d may include some or all of the following:

The customer service banking ontology module is typically used to capture knowledge about customer service in retail banking and may comprise some or all of: knowledge about financial products, knowledge about customer service issues and potential solutions, short-term memory of the current conversation and lexicon ontology. The ontology is typically used as the foundation to perform different types of reasoning. Typically, the ontology describes some or all of: the concepts in the domain, the relationships between them and constraints. Ontology languages e.g. OWL 2 from the World Wide Web Consortium (W3C) may be employed. OWL 2 makes it possible to describe concepts using such operators as intersection, union, negation; and facilitates derivation of complex concepts from definitions of simpler concepts. Furthermore, the formal ontology (constraints) allows the use of a Reasoner, which may check whether or not all of the statements and definitions in the ontology are mutually consistent and may also recognize which concepts fit under which definitions. This is particularly useful when dealing with cases where classes may have more than one parent.

Domain ontology may include knowledge about financial products e.g. definitions, business terms, fees, product features, etc.

Customer servicing ontology typically stores knowledge about typical customer service issues and potential solutions: main categories, input sources, information required according to certain embodiments, suggested explanations, bank policy.

Short-term memory ontology typically captures information about a party which is currently engaged with the system. When the session starts, the ontology is loaded with knowledge from the historical database including customer profile, activity and service history, so typically, the ontology contains some LTM knowledge. During the conversation more facts and hints are added, supported by a probability score.

Lexicon ontology typically is a combination of domain-dependent lexicon, e.g. obtained through the use of a learning process, and generic lexical resources such as but not limited to WordNet.

Different portions of the ontology may be used for different tasks and may be merged into a full ontology e.g. for the use of the Smart Reasoner. In order to coordinate between the different ontology portions, cross ontology classes and relations may be employed for connecting the different portions of the ontology and to facilitate performing advanced reasoning. Example: During a conversation or dialog, hints & facts may be collected as instances of the short-term memory; each hint is assigned into classes which are included in the service ontology. If reasonhasFact (short-term memory) and also type merchant (service) then the Reasoner may filter available transactions which contain relevant merchant instances and confirm these transactions with the user.

Ontology maintenance: The system typically employs support for information and knowledge which is bank-specific while creating a methodology and tools for separation between the system's knowledge and that of its banking clients. Typically, a generic ontology is maintained and individual banks update to specific needs e.g. in the following areas: specific bank-related constraints e.g. "This bank does not support wires from the ATM"; new subclasses e.g. "premium ACH Product" and bank instances—fees and waivers for transferring funds.

Some of the bank-specific knowledge may be generated automatically by mining text resources and representing the information held in departmental databases, in terms of the ontology. For example, US banks are required to publish a standard fee schedule which contains information on all fee types and waiver rules.

Figure 8E:
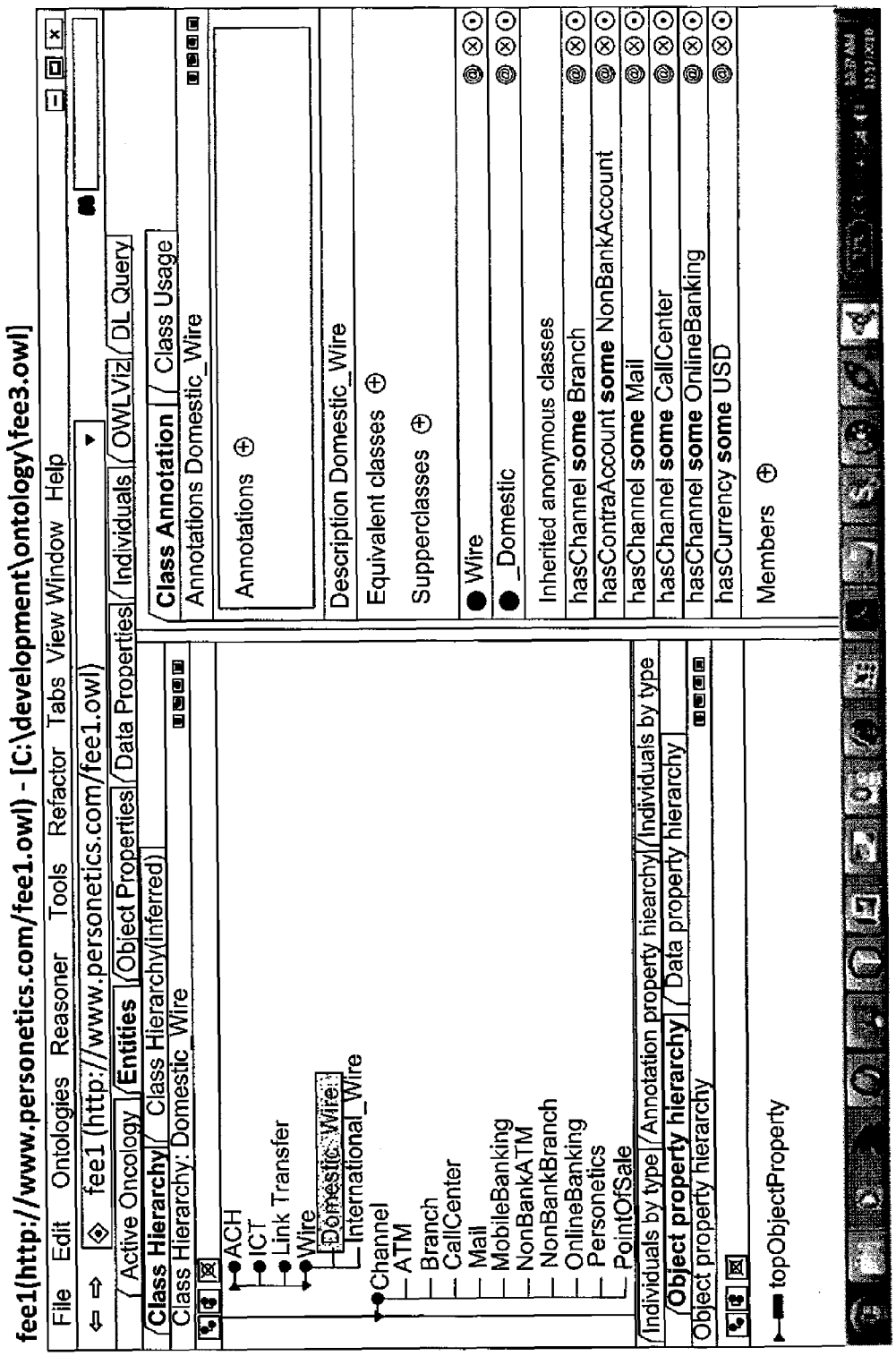
Figure 9B:
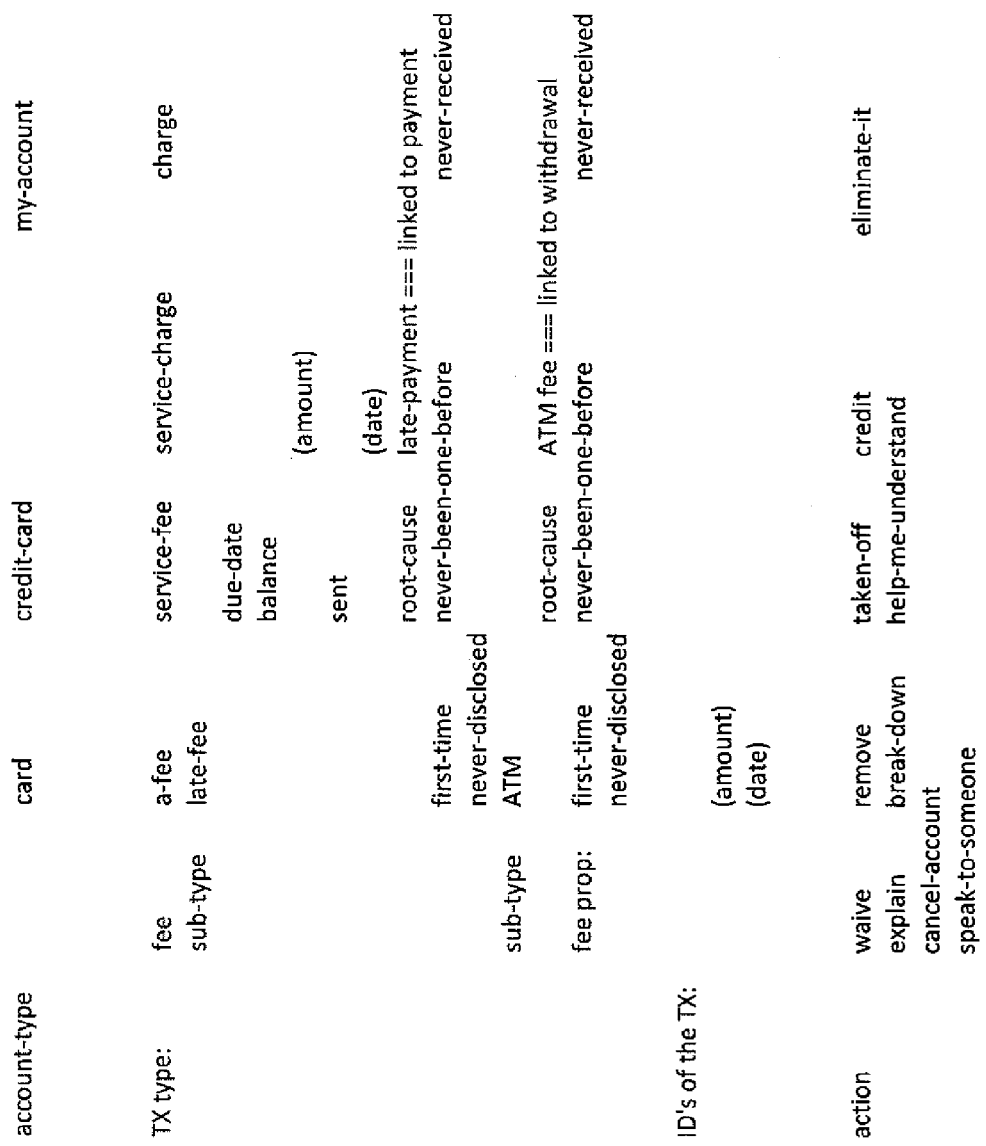
Figure 9D:
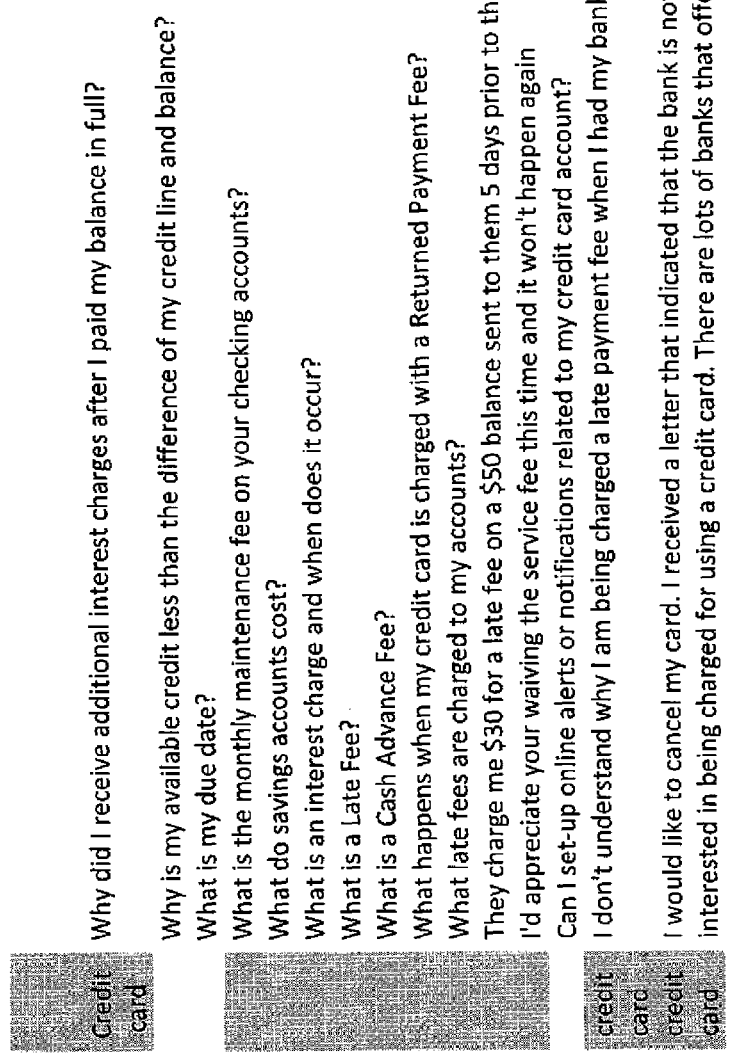

In the example of the screen-shot of FIG. 8e, domestic wire is defined as a subclass part of the transfers hierarchy. Also defined are alternatives and constraints for currency, destinations and available channel types.

An example NLP module is now described. GATE Version 5.2 may be employed as a framework for language processing. Within Gates an embedded GATE ANNIE system may be utilized for basic information extraction, and GATE plug-ins may be leveraged as a framework for integrating multiple advanced language processing algorithms such as but not limited to Stanford Parser and Open NLP. Using GATE, an NLP pipeline may be created, incorporating key functions such as but not limited to some or all of: tokenization, root, gazetteer, name and entity extraction, part of speech identification, and sentence splitters.

The existing system may be extended with bank-specific entities such as but not limited to financial products, merchants, ATM locations. A probabilistic parser may be used for chunking (e.g. nouns and verbs) and/or to identify grammatical relationships and/or to provide a representation of grammatical relations between words and chunks in a sentence.

Example of NLP module capabilities:
Sentence input "I lost my card yesterday morning"
Detected entities: [credit card], [period]
Parser output may be as shown in FIG. 8f Suitable conventional means such as WEKA may be employed to develop a classification module which attempts to classify the customer request by different dimensions e.g. some or all of:
Action type
Subject
Source
Negative.

The outcome of the process may be a list of classifiers with confidence scores, as well as entities and specific attributes. Example of key entities extracted may include some or all of:
Merchant class/specific merchant name
Time/date references (exact, relative)
Currency/amount
Geographical location
Card/Account number
Email
Phone
Relations The NLP outputs may be treated as hints which are stored in a short-term memory ontology.

The profile analytics of FIG. 8d may be operative to profile multiple dimensions at varying time spans, and to compute key indicators. In certain cases profiling is performed at multi-dimensional levels, e.g. device-and-time set or customer-and-geolocation profiles. Profiling is typically performed at three different time-spans: real-time, recent history, and real history. Typically, profiling occurs at some or all of the following key dimensions:

Customer
Household
Customer peer group
Device
Merchant
Geo-location
Time-spot (weekday, evening, etc)
Bank wide Next, key indicators may be computed from above profiles. Further enhancement of the key indicators may be achieved by computerized analysis of recent user activity e.g. web-clicks and/or screen content, and providing insight into the customer's current frame of mind, e.g. what bank information the customer is looking at. Key indicators may be created in some or all of the following groups:

Data anomalies
  Example: Same amount same date same vendor—TX
    Reason/Category
    TX
Online/mobile context
CRM parameters
  Examples: Topic of last case; entity of last case
Velocity
Account profile
Recent customer events
Bank wide events Still referring to FIG. 8d, typically, intent analytics enhances the accuracy of natural language understanding, by factoring in specially generated key indicators derived from profiling bank data. The key indicators may then be used to adjust the NLP score and then, typically subsequently, to rank results and convert hints into facts. For example: Customer calls the system regarding a certain issue ("I have a problem using my bank card . . ."). The system finds a declined transaction from the last two hours and hence adds more weight to the decline issues dimension.

Typically, one or both of the following methods are employed for combining the raw NLP features with key indicators, in order to produce the most accurate understanding:

1. Score adjustment: Perform probabilistic classification using NLP features, independent of the key indicators, and as a secondary step adjust the confidence scores using heuristics.
2. Single model method: Both NLP features as well as key indicators are provided as input into a single scoring model that takes into account both NLP features as well key indicators.
   A score adjustment method is operative even with limited data and is appropriate for incorporating subject matter experts. A single model method produces a single function. However, it may require synchronized data (NLP and key indicators), and it may raise a risk of overweighting the NLP features over the key indicators.

Example: Customer language refers to an unexpected fee. Using profiling customer history reveals two fees in the customer statement: one of the charges is a "first-time for this customer" whereas the other has been occurring regularly.

Model self trailing: Typically, the system records every classification attempt (conversion of hints to facts) including successful and unsuccessful results. Each attempt is maintained including all hints information and the outcome. The system typically uses the information to constantly adjust its selection and improve its understanding capability.

FIGS. 9a-9d provide example fees knowledge sentences which may be used e.g. for customer service or credit card-type dialogs.

The Smart Reasoner is typically operative to evaluate all facts collected and using combined ontology knowledge to derive a decision regarding next steps. The Smart Reasoner typically uses a hybrid of goal-driven reasoning, continuance learning capability and context-based information to drive the next set of sequence of actions. In each step of dialog the Reasoner may evaluate its short-term memory which may include some or all of facts, hints and customer profile all of which typically include a probability score.

Suitable conventional means e.g. Drools may be used as a foundation, and its capabilities may be enhanced with a set of functions to allow execution of more sophisticated strategies. Drools provides not only rules management but other capabilities like a strong workflow layer, extendibility and integration with Java Objects.

The Smart Reasoner may be extended to include some or all of the following capabilities:

a. Decision using reasoning over the ontology of the present invention.
Example: If the short-term memory contains a confirmed subject, then the Reasoner may retrieve a set of available actions which are connected using the relevantAction property. It is assumed that the specific instance actually has a relation which connects potential actions. To execute, a functionality to invoke SPARQL queries may be employed.

b. Decision using generalization: If the Smart Reasoner does not find a direct relation to actions, then the Smart Reasoner may use its capability to ask more generalized questions to retrieve potential solutions. Example: The Reasoner attempts to retrieve a set of available actions which are connected using the relevantAction property but gets nothing. The Reasoner then looks at subject hierarchy (which classes contain this subject) and tries to retrieve available actions. This means that the knowledge may be expressed in general terms and would be relevant to every individual which is included. For example: All issues which are related (part of class statement) may require identification of the trigger.

Decision using unsupervised learning: In cases where no actions are identified either using a direct relation or generalization, the Reasoner may attempt to retrieve the set of actions by examining confidence of relations which are captured using past experience. Each relation represents a connection between a set of variables and relevant action. Using the generalization service, the relations may be aggregated to represent strong and weak relationships (e.g. probability-based).

Examining more generalized historical relations typically highlights the "correct" associations, those whose "noise" has faded beyond some detection threshold.

This allows the system to constantly improve its accuracy but also generate actions to new instances based on selections of relevant historical relations, assuming it is possible to find enough relations when applying generalization.

Manual escalation: The Reasoner typically has a failsafe mechanism which escalates to a human advisor as per predefined criteria of need for human intervention.

When none of the automated functions produce any meaningful actions, the system may perform an escalation e.g. to the human advisor.

FIG. 8g is a table useful in understanding the dialog manager shown and described herein.

Any suitable dialog with client, to implement some or all of the embodiments shown and described herein, may be provided. An example dialog manager design is now described. Any or all of the characteristics shown and described herein may be provided.

Typically, the dialog manager comprises a server-side module that manages the communications with the client module. Based on high level dialog instructions, the dialog manager may create a detailed set of messages to send to the client module. In addition to handling generation of messages, the same or another module may be operative for parsing the message received from the client module. The dialog manager may be invoked to parse messages arriving from client module or to generate messages to client module.

The module may generate English or other natural language sentences forming an instruction/question to the end-user and may format them into messages in a format expected by the client module. The messages may be sent/returned back to the calling module.

Typically, a "dialog ID" may be used to specify "what idea to convey". The sentences may be generated using dialog templates. Each dialog template typically corresponds to a dialog code or ID. The dialog templates are typically defined in a configuration table, which defines what to tell the end-user, how to format and what response is expected. Example: Asking the user to select which of his several bank cards is involved in her or his complaint.

For some dialog codes, the module employs parameters that further enhance the message. These parameters may be passed in log records of type DIALOG. In addition to explicit parameters, the module may make use of information in the current state, e.g. the user's name and/or information about the party. Input may include some or all of the following:

Dialog ID—What idea to convey to the end-user
Dialog class—The class of object passed in the value and/or info
Dialog value(s)—Values for selection by end-user. One or more values, if multiple values, yield multiple log duplicate records. Example: Which of the following best describes the reason for your contact: card-is-stolen, card-is-lost, card-is-damaged?
Dialog pass-through info—Information to be appended to response log message so that another module is able to process the response properly. Example: If asking a yes/no question about a certain card, maybe pass-through the card ID.
Dialog parameter(s)—Values for display as part of a dialog sentence. Example: Do you have card*4374 in your possession? <Yes> <No>; Parameters may pass as name-value pairs.

The above input may be extracted from the log records with the current sequence. Output may include some or all of the following:

Message in XML format for sending back to client module.
An action code, specifying what is the next step, e.g. "Send response to client module" or "Run NLP" or "Run logic (analytics)", log record with the "chat-screen" messages sent to the client module (e.g. text on behalf of end-user or text "said" by system). Dialog types may include some or all of:
Open Ended Question (GET-TEXT)
Open Ended Question with Options Predefined (OEQ-OPTP)
Open Ended Question with Options that are Dynamic (OEQ-OPTD)
Confirm Text (CONF-TXT)
Select One Option Predefined (SEL-ONE-P)
Select Many Options Predefined (SEL-MUL-P)
Select One with Options Dynamic (SEL-ONE-D)
Select Multiple with Options Dynamic (SEL-MUL-D)
Select True or False (SEL-YESNO)
Select TX (SEL-TX)
Confirm TX (CONF-TX)
Get Signature (GET-SIG)
Get Picture (GET-PIC)
Transfer to Page (X-PAGE)
Transfer to Phone (X-PHONE)
Talk for Agent (X-AGENT)
Confirm locations on map (Conf-Map)
Progress with artificial wait (Progress)

Example implementations of various of the above are now described in detail. Standard options may be available for some or all dialog types e.g. as described below. If the module supports certain dialog types, each dialog ID is typically defined to use one of the dialog types provided.

Certain of the above dialog types are now described.
Open Ended Question (GET-TEXT):
Generic open ended question typically used for initial conversation steps before focusing on limited choice, or if during dialog, the system determines that it may have gone off course. Instructions to client module may include some or all of:
Change label to configured 'current state'; Present progress message*; In a conversation screen scroll all the way up (leaving empty screen); Insert 'main text' into conversation screen as system-said; Invoke specialized screen for open ended question using 'main text' with 'say-it', and 'type-it' icons presented to user for her or his selection; Present Help message*. On (i.e. responsive to) 'Say-it', client module may invoke speech to text SDK (software development kit) e.g. displaying microphone and when talking is complete and SDK returns possible text, then client module may call the server. Once voice response arrives at server, the dialog manager may send it to NLP and Drools for special analysis as a voice response.

On 'type-it', client module may display a keyboard input screen; when typing is over, the client module may call the server.

Once text response arrives at server, the dialog manager may send back instruction to insert text typed into conversation screen as user-said; and return back to server with echo=yes. Once echo=yes response arrives at server, the dialog manager may send text to NLP for next step.

Configurable elements may be provided such as but not limited to: Allow voice input flag: No=Jump directly to text input screen, Main text.

Standard configuration options may be provided such as but not limited to:
Read aloud flag
Current state text
Progress message configuration
Help message configuration.
Open Ended Question with Options Predefined (OEQ-OPTP)
Generic open ended question along with options to select. Used for initial conversation steps when system has some conjecture regarding what the issue is. Typically, allows user both open ended and some predefined selections. This dialog type may be designated as priority-2. Instructions to client module may be same as OEQ above, with additional options presented to user. The additional options may be displayed as a list of buttons or in a separate area of the screen as icons. Configurable elements may be as for OEQ, with some or all of the following additional elements: Options display method: V-Vertical text buttons, I-Icons. For each option: text or icon identifier.

Open Ended Question with Options that are Dynamic (OEQ-OPTD):

Generic open ended question along with options to select. Used for initial conversation steps when system has some guess what the issue is. Typically, allow user both open ended and some predefined selections. Instructions to client module may be as OEQ-OP, with any additional options being passed as parameters to dialog manager. Configurable elements may be as for OEQ-OP, without the options, if these are passed as parameters.

Confirm Text (CONF-TXT)

Generic dialog to confirm an understanding, in this case the understanding is typically predefined in the dialog configuration. Instructions to client module may include:

Change label to configured 'current state'; Present progress message; Scroll conversation screen all the way up; Insert 'header text'+'main text' into conversation screen as system-said (for example: "Do you mean that you have an unrecognized transaction on your statement, the amount being 20 dollars"?"); Invoke specialized screen for confirm understanding with 'header-text', 'main text' and options 'Yes, 'No' and optionally 'Other'; Apply Help message*;

On 'Yes', 'No' or 'Other', client module may call the server.

Once response arrives at server, the dialog manager may send back instruction to client insert "Username: % answer-text %" message into conversation screen as user-said; and return back to server with echo=yes. Once echo=yes arrives at server, the dialog manager may insert response record to log and, say, instruct a PSERVER to call Drools.

Configurable elements may include some or all of:
Read aloud flag
Current state text
Progress message configuration
Help message configuration
Prep text—Optional text be used when presenting confirmation as on-behalf sentence. Example: "Did you mean to say that:" or "You said:"
Main text—The predefined understanding sentence that needs confirmation. Either as a direct question: "Do you have an unrecognized charge for $25 on your current statement?", or as on-behalf sentence: "I have an unrecognized charge on my current statement."
Other option flag—Display third option in addition to Yes and No
Other option text—Not Sure/Neither/Other/Something else Select One Option Predefined (SEL-ONE-P)

Description: Generic dialog for getting user to select one item from a list, e.g. using radio buttons, with options arranged vertically. The list may be predefined in the metadata. Instructions to client module may be provided such as but not limited to:

If configured to use generic selection screen: Change label to configured 'current state'; Apply progress message*; Scroll all the way up; Insert 'main text' into conversation screen, typically without the options, as system-said; Invoke generic selection screen with 'main text' and options and prompt the user to select one and press submit, optionally 'None of the above'; Apply Help message.

Once response arrives at server, the dialog manager may send back instruction to client module to insert into conversation screen "Username: % option-selected %" message as user-said; and return back to server with echo=yes. Once echo=yes arrives at server, the dialog manager may insert response record to log and instruct the PSERVER to call Drools.

If configured to use conversation screen: Change label to configured 'current state'; Apply progress message*; Scroll all the way up; Insert 'main text' and options into conversation screen as system-said; Display options inside conversation screen (screen 1b) and prompt the user to select one and press submit, optionally 'None of the above'; Apply Help message*.

Once response arrives at server, the dialog manager may send back instruction to client module to remove last system said bubble; Insert 'main text' into conversation screen, without the options, as system-said; Insert into conversation screen "Username: % option-selected %" message as user-said; and return back to server with echo=yes. Once echo=yes arrives at server, the dialog manager may insert response record to log and instruct the PSERVER to call Drools. It is appreciated that all references herein to Drools may alternatively be replaced by any other suitable business rule management system.

Configurable elements may include some or all of:
Conversation screen flag: YES=prompt user for input inside conversation screen
Read aloud flag
Current state text
Progress message configuration
Help message configuration
Main text
Allow None flag.

Select Many Options Predefined (SEL-MUL-P)

Generic dialog for getting user to select multiple items from a list; dialog may use check boxes, with options arranged vertically. The list is typically predefined in the metadata. Same as SEL-ONE-P, however instead of radio buttons, use check boxes and allow any number of options to be selected.

Select One with Options Dynamic (SEL-ONE-D)

Same as SEL-ONE-P, with a dynamic list of options passed (key/value).

Select Multiple with Options Dynamic (SEL-MUL-D)

Same as SEL-MUL-P, with a dynamic list of options passed (key/value).

Select True or False (SEL-YESNO)

Generic dialog for getting user to select YES or NO using generic selection screen.

Instructions to client module may be same as SEL-ONE-P except that options are buttons placed horizontally, with mandatory options YES, NO, and optional OTHER.

Configurable elements may include some or all of:
Conversation screen flag: YES=prompt user for input inside conversation screen
Read aloud flag
Current state display
Progress message configuration
Help message configuration
Main text—Examples: Do you have the card in your possession?
Other option flag—display third option in addition to Yes and No Other option text—Not Sure/Neither/Other/Something else Select TX (SEL-TX)
  Special dialog to select a transaction from a list with filtering capabilities.
  Instructions to client module may include some or all of:
    After sentence the user may be prompted to select a one or many transaction from a large list, using dynamic filtering capabilities. Optionally pass initial filters to pre-filled for saving users some clicks.
  Configurable elements may include some or all of:
    Read aloud flag
    Current state display
    Progress message configuration
    Help message configuration
    One or many flag
    None allowed flag
    Initial filter—may be a passed parameter to dialog manager or a predefined configuration.
  Sample client module wire frames:
    Main text—Examples: Which transaction(s) are you calling about?

Confirm TX (CONF-TX)
  Special dialog to confirm a transaction(s) with a simple YES/NO/OTHER prompt. If there is more than one transaction, present first and allow user to expand and see more. If there is more data available on transactions, allow user to ask for more. If transactions include location information, allow users to see transactions on a map.

Get Signature (GET-SIG)
  After sentence the user may be prompted to sign signature on touch screen with their figure.

Get Picture (GET-PIC)
  After sentence the user may be prompted to take a picture of receipt or ATM. slip, or to select an already taken picture.

Standard options may be provided for several or all dialog types and may include some or all of:
  a. Read aloud flag: Responsively, system reads aloud some of the text.
  b. Current state text: A text to display at top of screen explaining the current state of the dialog.
  c. Progress message: A progress screen that shows before the real screen it presented. It may include some or all of: a conversation text, an in-progress text (not logged), artificial wait time, a completion text (not logged)
  d. Help message: A message explaining to user what a screen is about and what s/he is expected to do. It may be either (1) A ⅓ screen pop-up, or (2) a full screen with a next button. If a pop-up screen than: may disappear by itself after a few seconds (configurable), may have an "extra info" button to replace it with a larger pop-up with a longer text. If a full screen with next button, then: next may have automatic countdown (configuring). If a Help message is provided, then input dialog may have a small "i" button on the actual screen to display Help message again.

Dialog Configuration Table: Typically, a dialog configuration table is provided which defines the many, typically dozens, hundreds or thousands, of possible dialogs the module may generate. Each record in the table may store some or all of the following fields:
  Dialog ID
  Dialog name—2-3 words name for internal documentation purposes
  Dialog description—one full sample sentence without variables or variations
  Dialog type—
  Passed values: None, Single, List
  Passed class name e.g.: Card, Account, Transaction, Category*, Reason*, Determination* (asterisked elements are fake class names, which may be described in a special configuration table).
  Option 1 text
  Option 2 text
  Option 3 text
  Option 4 text
  Option Other flag (Boolean)
  Option Other text (the none of the above option, key=0)
  Allow none flag
  Initial filter text
  Select one or many (1=one, 2=many)
  Option style (1=texts, 2=icons)
  Input screen location (1=conversation screen, 2=input screen)
  Read Aloud Flag
  Current state text
  Main Text: Text with variables to be replaced with values—special variable called % variations % indicates this text has multiple variations in the special variations table.
  Prep Text: Text that appears before main text in some dialogs
  Progress message flag
  Progress message wait time
  Progress message working text
  Progress message complete text
  Help message flag
  Help message style (1=popup ⅓ screen, 2=full screen)
  Help message text
  Help message auto-open flag
  Help message auto-close seconds (0=no auto-close, number=seconds to autoclose)

A dialog variations configuration table may be provided which provides variations for saying the same sentences. Example: Singular vs. plural or male vs. female. Each record in the table may store some or all of the following fields:
  Dialog code—FK to dialog configuration table
  Text name (e.g. main-text, prep-text, etc)
  Variation Text—the text to use with variables same as in main dialog configuration table
  Variation Priority—when multiple variation meets conditions determines which one to select Conditions to determine if this variation applies may include some or all of:
  Client device: Smartphone, iPhone, Android, Blackberry, Browser, Browser IE5, Browser IE6
  partyGender—male/female/unknown
  partyType—private/business
  passedListMinimumSize
  passedListMaximumSize
  Frustration Level—0 to 5, 0 is calm
  partyValue—class, type, value of customer
  Language: English/Spanish Multiple variations selection logic may be provided. For example, if there are multiple variations matching the criteria, the module may pick a variation with highest priority. If multiple variations matching criteria have the same priority, then a variation may be selected randomly. P2: If multiple variations, then toggle though variation within a conversation. For example, if it is desired to ask the user to provide more details, as the user may say utterances slightly differently each time.

Template sentences may include variables, which may be replaced with values. For example, the following variables may be replaced if found inside the template:

% firstname %—insert the user's first name, i.e. David
% formalname %—insert the user's formal name, i.e. Mr. David Sosna
% username %—insert the user's login ID
% listsizenumeric %—insert the number of values to choose from
% listsizetext %—insert the number of values to choose from as a text i.e. THREE
% nowdayofweek %—insert the current day of week
% nowdate %—insert the current date
% nowtime %—insert the current time
% nl %—break sentence into two lines here
% valuep=name %—insert value of param "name"
% ifp=name % conditional text appear here % endif %—insert conditional text if exist param "name"

Priority 2:

% image=name %—embed image in text—Ability to insert an image file into text at any time; Image may be displayed minimized and if user clicks on it may expand to fit.

Log Records:
When generating a message, suitable log records may be provided e.g.:

Log Type=Display
InterfaceText=messages going out to client

Parsing a client module message: The module may receive an XML message that arrived from the client module, and parse the message.

The first time a client response message is received, the dialog manager may generate an immediate response message back to the client-module, echoing back into the display log the end-user input and telling the client module to make an immediate echo back call with the same message.

The second time a client response message is received, the client response message may have an echoed back "YES" flag. The dialog manager may create log records of type "dialog" specifying the end-user response for the NLP and/or logic(analytics) module.

Input: Message from client-module
Output may include some or all of:
  Message in XML format for sending back to client module (in case of immediate response).
  An action code, specifying what is the next step, e.g. "Send response to client module" or "Run NLP" or "Run logic(analytics)".
  Log record(s) with the dialog response that arrived from the client module.
  Log record with the message sent to the client module (see below more details—either echo messages "on behalf of end user" or server messages)

Echoing back what the user said may be based on combination of dialog-type and class name, and is typically not specific to the dialog code that was asked. Alternatively, however, echoing back may be sensitive to specific dialog code which was asked.

A dialog echo configuration table may specify what to say. An example dialog type echo configuration table is provided in the table of FIG. 8g.

Coding the end user responses may be based on the original dialog log records that triggered this dialog. Same type records may be created with the response values.

The dialog manager may optionally be involved to any suitable degree, in other client module commands such as but not limited to:

Start session
Close session (Save Yes/No)
Menu Pressed
Speech2Text
Upload file

Example Dialogs
  State reason code upfront("FORGOT"), then show some justifications—other TX same location, other TX same merchant.
  P: I think you just forgot about this purchase. <Please explain><Ok, Close dialog>
  P: I found other TX at same date in the same geographical location. <Show TX><Ok, Close dialog>
  P: TX#1: $20 XXXX YYYY <More TX><This TX is also not mine><This is my TX, but the other one is not><Ok, Close dialog>
  P: I found historical TX with same merchant by other card*2323 linked to you. <Show TX><Close dialog>
  P: TX#1: $20 XXXX YYYY <More TX><This TX is also not mine><I do not accept this explanation><Ok, Close dialog>
  P: Do you want to see the TX involved?<Yes/No>
  P: Is my explanation sufficient to close the dialog for now?<Yes/No>

Figure 10A:
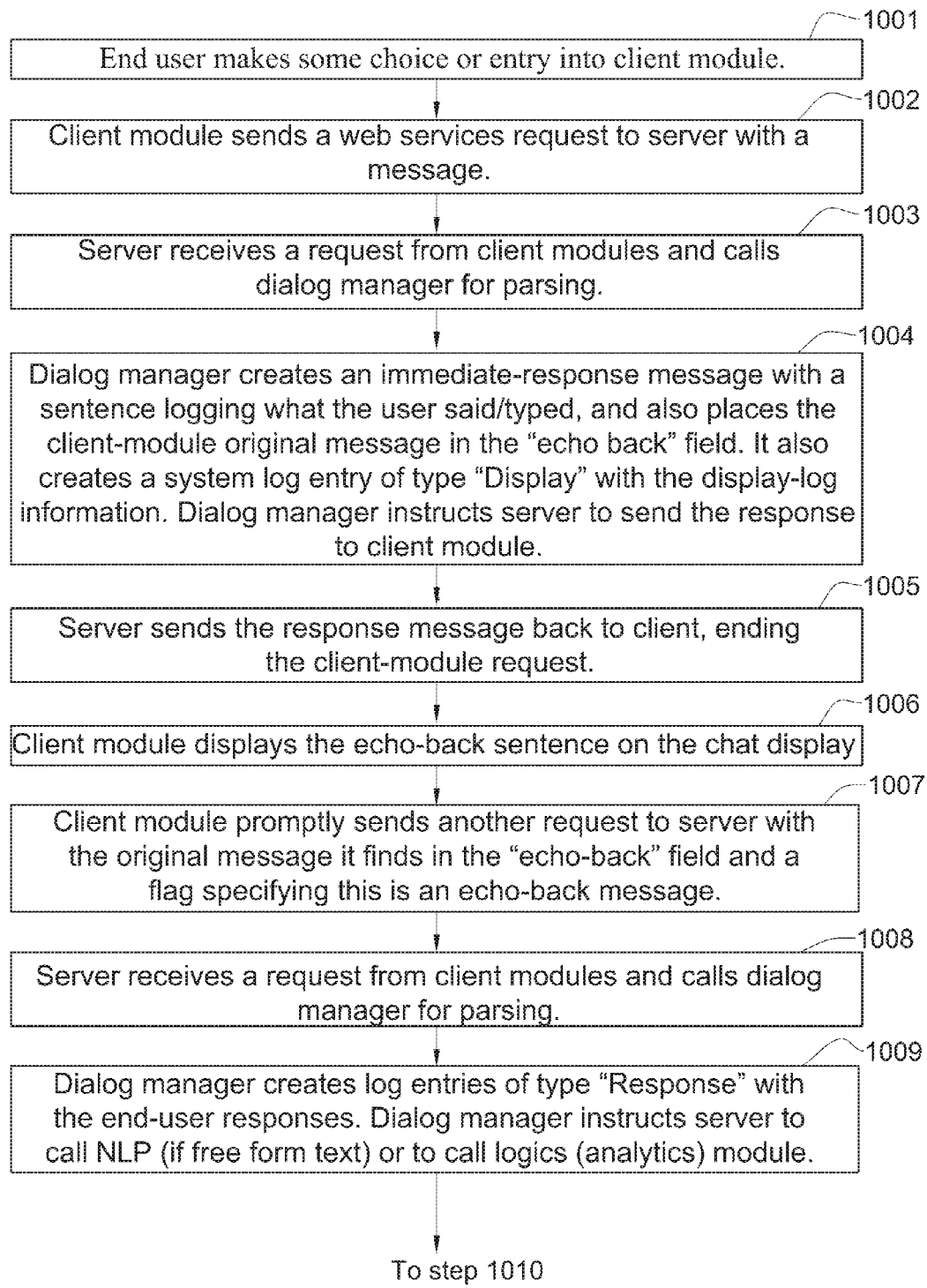
Figure 10B:
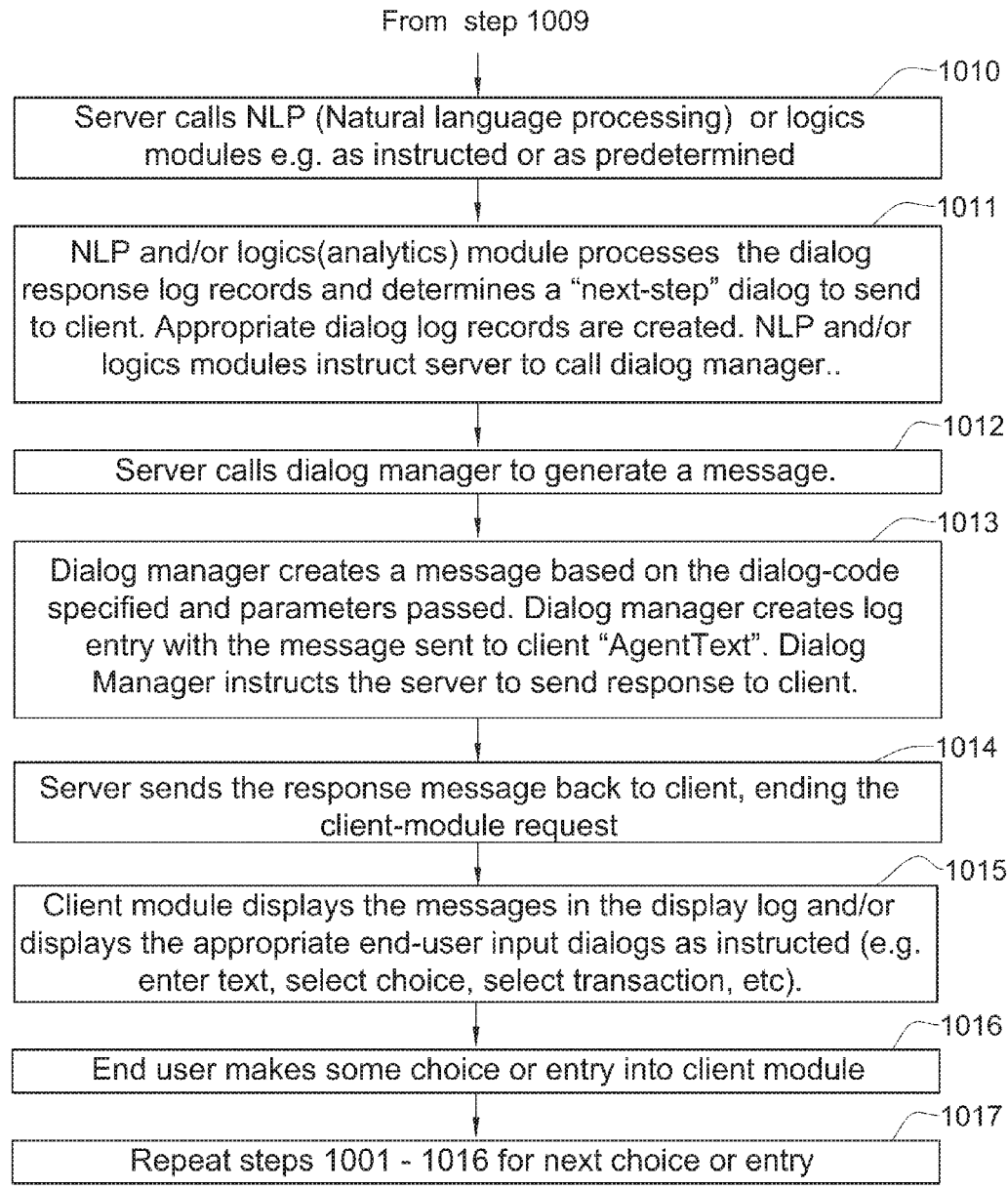

An example dialog manager work flow is shown in FIG. 10a and FIG. 10b. The flow may include some or all of the following operations shown in FIG. 10a and FIG. 10b, suitably ordered e.g. as shown.

1001. End user makes some choice or entry into client module.
1002. Client module sends a web services request to server with a message.
1003. Server receives a request from client modules and calls dialog manager for parsing.
1004. Dialog manager creates an immediate-response message with a sentence logging what the user said/typed, and also places the client-module original message in the "echo back" field. It also creates a system log entry of type "Display" with the display-log information. Dialog manager instructs server to send the response to client module.
1005. Server sends the response message back to client, ending the client-module request.
1016. Client module displays the echo-back sentence on the chat display.
1007. Client module promptly sends another request to server with the original message it finds in the "echo-back" field and a flag specifying this is an echo-back message.
1008. Server receives a request from client modules and calls dialog manager for parsing.
1009. Dialog manager creates log entries of type "Response" with the end-user responses. Dialog manager instructs server to call NLP (if free form text) or to call logics (analytics) module.
1010. Server calls NLP (Natural Language Processing) or logics modules e.g. as instructed or as predetermined
1011. NLP and/or logics (analytics) module processes the dialog response log records and determines a "next-step" dialog to send to client. Appropriate dialog log records are created. NLP and/or logics modules instruct server to call dialog manager.
1012. Server calls dialog manager to generate a message.
1013. Dialog manager creates a message based on the dialog-code specified and parameters passed. Dialog manager creates log entry with the message sent to client "AgentText". Dialog manager instructs the server to send response to client.

1014. Server sends the response message back to client, ending the client-module request.

1015. Client module displays the messages in the display log and/or displays the appropriate end-user input dialogs as instructed (e.g. enter text, select choice, select transaction, etc).

1016. End user makes some choice or entry into client module.

1017. Repeat steps 1001-1016 for next choice or entry

The extent of movement back and forth to/from conversation screen may be controllable. For example, shift back to conversation screen after input may be a server decision e.g. may be a parameter of the input dialog command. When entering a new screen, user may get to see the text inserted into the conversation screen prior to opening new screen.

Help message: A flag may be provided to make Help message a "stand-by", whereby it is not presented until user explicitly presses an info button in the input screen.

According to certain embodiments, context/knowledge collected during dialog, in addition to enterprise data which may already be available, thereby to enhance reasoning functionality.

According to certain embodiments, each root cause may be regarded as a "Step" rather than a solution or resolution.

According to certain embodiments, context is managed at the reason level and each item has a name which is typically assigned by the developer. If a name is repeated in the same context (reason), the system typically assigns the value from context.

According to certain embodiments, items may be added on the reason level.

According to certain embodiments, all dialogs are concentrated in a single location. For example, an "ADD DIALOG" window may be added to an R/C-Block screen so as to create a new dialog manager entry automatically. The user may select TEMPLATE and based on template select values of parameters including text. Should the user confirm, say, that a card is lost, system typically knows later that this fact is related to card "ABC" or card "GHJ" because the dialog answer is typically converted to a fact with context e.g., in the illustrated embodiment, "a specific card is lost". For example, in each dialog an expression may be defined which is a set based on the answer. e.g.,: start with yes/no dialogs and write an expression (confirmedcard.Lost) which means that if the dialog is confirmed, then the confirmed card (a specific instance. property (lost)=true. Next time a dialog is used, check the expression and if it is the same confirmed card, bring back the value from memory and do not execute the dialog. confirmedcard.Lost may then be used as a precondition to another item, instead of the dialog name. This may, for example, be implemented by adding more properties to existing objects such as card, transaction, case.

According to certain embodiments, the number of items & root causes is reduced by allowing greater reusability of steps and/or reasons, e.g. use of the same steps multiple times, e. g. calling various steps like a subroutine and then going back and continuing the process. According to certain embodiments, a step may be called even if it is not previously connected to the reason calling it. For example, some steps may be designated as global and may be called from any reason. To continue when the call ends, the system may run from start and because the item is marked as done may go back to the same point. A reason may be called so as to reuse a combination of multiple steps with all their relationships and connections (e.g. "shipment of card" which may include more than one step).

According to certain embodiments, internal reasons are defined that are never identified by the NLP system and are only used as groups of steps. Examples: The combination of card—trigger—merchant may be deemed a step; confirmed address and/or cancelation of card may also respectively be deemed steps.

According to certain embodiments, a new item which selects to execute a new step or reason first executes the step or reason. Once the execution is complete, the item is marked as done and control is naturally returned to the following item. The step/reason may be called by name or by using a context-based item. For example, global step/s may be defined which perform a confirmed address e.g. call a goSub step confirm address, then call a party.confirmAddress step which implements the appropriate operations.

According to certain embodiments, a Global step—0 is provided. In each reason or across all reasons, a step 0 may be defined which is evaluated every time and is never marked as done. This allows triggers to be added, to invoke logic which overrules the regular flow. Examples:

a. If at any point of the reason, the system suspects fraud, the conversation is sent immediately to a fraud specialist.

b. If the amount of the issue is >$200, then escalate.

c. If the user wants to cancel the card, then escalate.

In each of the above, put into phase 0.

According to certain embodiments, support is provided for out of flow occurrences e.g. the ability to call different reasons in different places ("I also need to change my address"). Typically, support is provided for a context-based question (e.g. The user is presented with a dialog: "Do you want to cancel the card" and responds with a question "What's my balance?"). Switching from a topic and returning may be enabled e.g. by adding a "GoSub" for reason.

According to certain embodiments, dialogs are aligned with instances and properties (e.g. confirmedcard.Lost) and common context-based questions are connected to a suitable class and/or the property.

According to certain embodiments, when adding a new root cause to a reason, all the root causes that are called by that root cause are also added, recursively for each root cause.

According to certain embodiments, the same root cause may be added twice in the same reason e.g. when the root cause is called from two different branches. Typically, a local ID is assigned to each root cause within the reason.

According to certain embodiments, semantic representation of logic is used to reduce the number and complexity of rules. Preferably, rules use only high level terminology and do not use values or set values. Instead all values to be used by rules are saved in ontology structure or instances.

According to certain embodiments, an exist function is provided which is operative to scan a log and generate true or false based on the existence of the object.

Example

If exist (confirm reason), then phase 3.

If exist (confirm trigger), then go to root cause.

According to certain embodiments, for at least some reasons, a trigger is defined to start and solve the problem. Example: For unrecognized purchase, the trigger may comprise a purchase transaction.

Some or all of the following phases or operations may be performed, in a suitable order e.g. as per below:

1. Understand whether or not to look for a trigger (e.g. using a trigger property from reason).
2. If so, retrieve all the trigger data e.g. using Sreason and STtrigger values to activate a method to retrieve transaction into log.
3. Use the last Case Log as a mechanism to hold transaction ID; for each line hold a transaction ID and a score/Boolean that are manipulated by the rules (e.g. similar to update NLP).
4. Implement a set of rules that looks for a different condition on the transaction level or count aggregation on the trigger and decides:
    a. Which lines to eliminate (make score=0); and/or
    b. What type of dialog to generate to the user.
5. The rules may use prior information collected from the user (if the user specified a date, then filter the trigger; if we generate dialog 202, then this confirms not only reason but also event details e.g. using the logic collected in phase 2).
6. Loop until have confirmed the trigger and now have 1-n transactions which are confirmed by the user.

Figure 11:
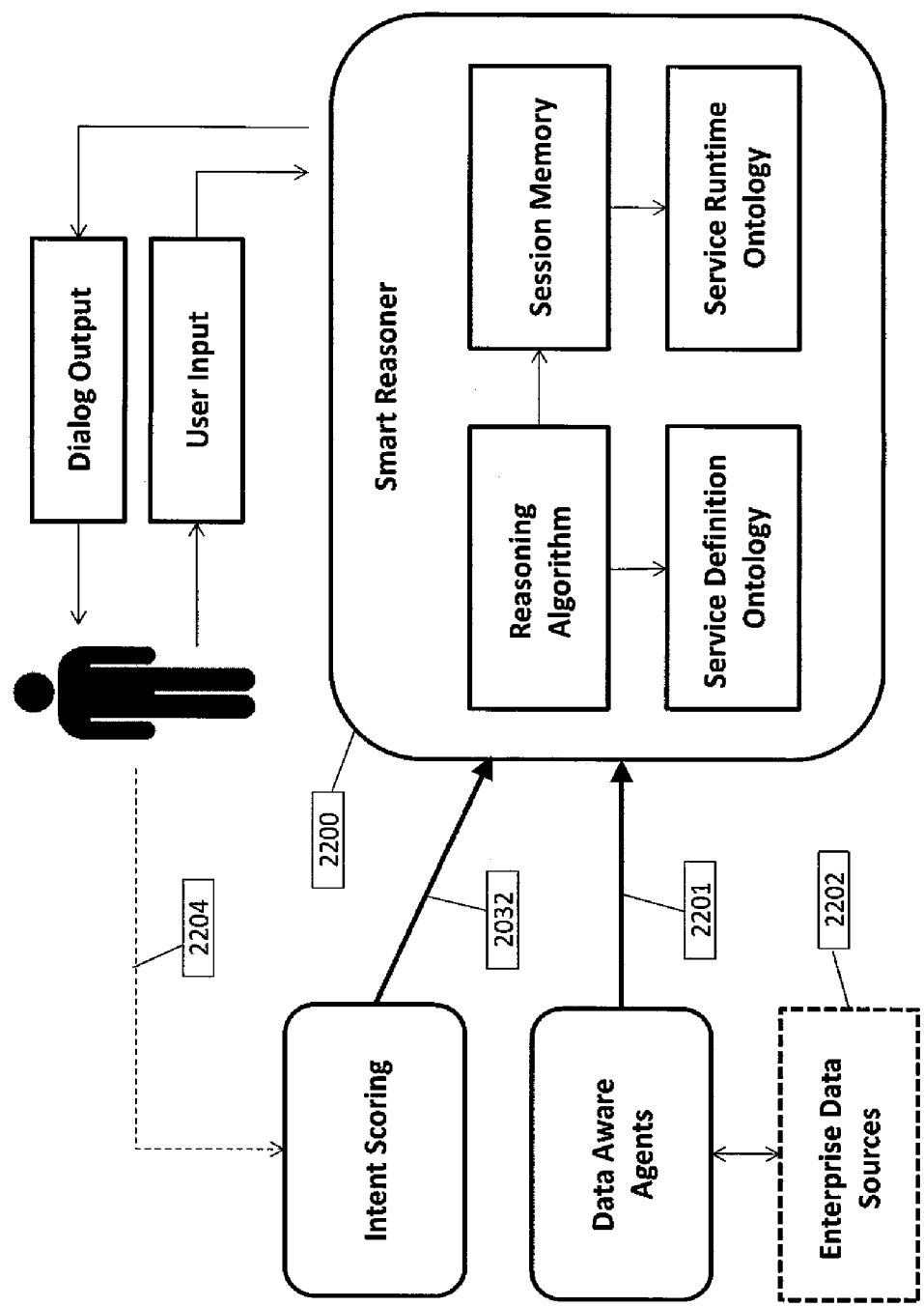

An advanced system for automated-context-aware-dialog with human users is next described with reference to FIGS. 11-19. FIG. 11 is a simplified functional block diagram of an advanced system for automated-context-aware-dialog with human users constructed and operative in accordance with certain embodiments of the present invention. The system of FIG. 11 may include some or all of the following modules which may for example be implemented in software:

Smart Reasoner 2200 operative for efficient definition and execution of professional dialog with customers. Typically operates by generating a runtime topic-context tree as described below in detail, e.g. with reference to FIG. 16.

Intent Scoring 2032, operative for enriching service-dialogs with predictive scoring that conjecture the intent of the customer 2204 throughout the dialog; and Data Aware Agents 2201 operative for optimizing the use of enterprise data 2202 in service-dialogs.

The system of FIG. 11 typically uses a domain specific artificial intelligence computerized process to overcome limitations of conventional goal-driven expert systems which typically use many rules; cannot easily adapt to new situations; do not learn by experience and are not good at representing spatial knowledge. The system of FIG. 11 is typically operative to implement a conceptual learning capability which organizes knowledge such that actions acquired for one subject are available for similar, but non-identical subjects. The system of FIG. 11 is typically robust when coping with environmental changes. The system typically prioritizes asserted and inferred relations and deploys reinforced learning when selections set/s are empty.

Figure 12:
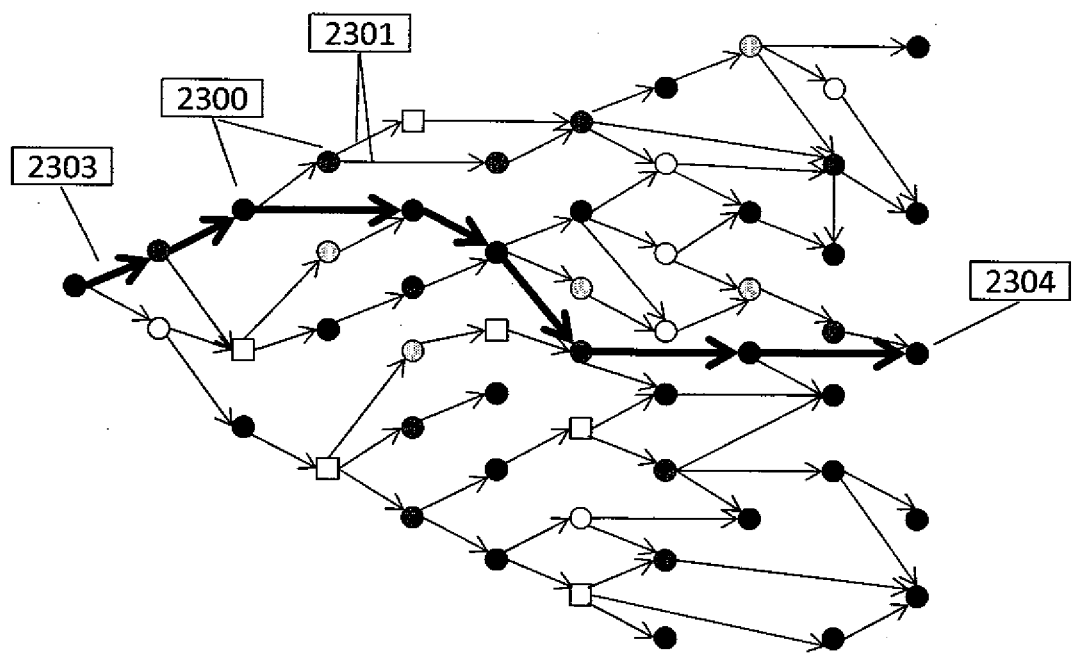

FIG. 12 is a diagram illustrating that conducting a professional service dialog involves a multitude of steps and decisions. Each step may involve user interaction, data lookups, data processing and more 2300 (circles depict different step types). After each step and based on collected information, a decision is made about the next step to execute, say 2301 (where arrows depict potential decision result). This process leads to a huge number of possible dialog flows (total amount of circles). From the user's perspective only one such flow occurs in each dialog 2303 (see bold arrows which depict flow).

The system of FIG. 11 typically is advantageous vis à vis current dialog systems in one or more of the following aspects:

1. Problem Solving Capabilities—Improved ability of the system to actually solve the user's problem and/or reduced number of dialog steps needed to achieve the solution.
2. Natural Flow of Dialog—Improved ability of the system to mimic aspects of human conversation including but not limited to context relevance, natural language understanding, context associations, optional dialog forking and digressions.
3. Cost-Effectiveness of Implementation—Reduced number of rules, samples of natural language sentences and domain specific objects need to be defined to allow the system to conduct conversations and solve problems in a given discussion domain.

Figure 13:
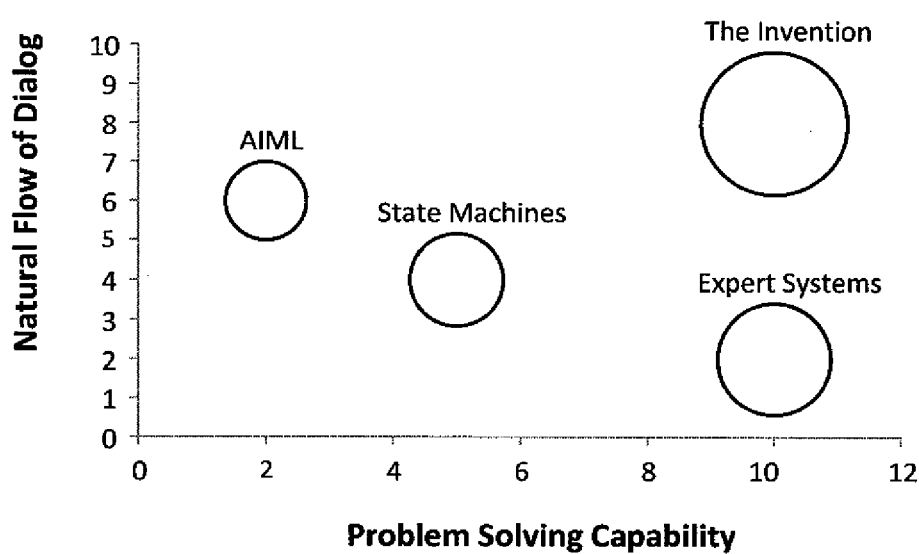

FIG. 13 presents a comparison depicting advantages of an embodiment of the present invention relative to existing solutions. The horizontal axis represents the problem solving capabilities of each system. The vertical axis represents natural flow of the dialog produced by each system. Finally, the bubble size represents the efficiency of dialog definition for each system.

In FIG. 13, the AIML bubble represents systems that use the Artificial Intelligence Markup Language (AIML) dialect for creating natural language software. AIML agents produce a fairly natural dialog experience, but suffer from several drawbacks. First, the use of textual pattern matching rules and blind replication of user inputs limits the problem solving capabilities of such systems. Second, the forward chaining process used to resolve pattern matching rules is prone to cyclic dependency issues and unexpected dialog flows. Finally, limited by simple pattern matching capabilities, these systems require an implementer to define a huge number of rules and reduction to cover new discussion domains.

The State Machines bubble represents systems that use a finite-state-machine-based modeling (such as UML state charts). These provide a solution for predictable problems with narrow scope (e.g. technical help wizards and enterprise workflows). However, the finite-state-machine model fails when dealing with multidimensional issues; requiring implementer to assign states to each combination of possible dimension values. While concepts such as nested states and event help to alleviate this problem, it is often found that the number of states tends to grow exponentially as problem complexity increases. In addition, the dialog flow defined with such system tends to be rigid and pre-defined and does not exhibit the flexibility required by natural conversation.

The Expert Systems bubble represents expert systems which focus on emulating the decision-making ability of human experts. Such systems exhibit robust problem solving capabilities but lack the ability to mimic natural human dialog.

It is appreciated that conventional deduction systems that rely on forward chaining algorithms that process "when-than" rule bases are difficult to maintain and exhibit problems of cyclic dependency and unexpected dialog flows. In contrast, conventional goal-driven systems that use backward chaining algorithms (such as Prolog) provide a closer approximation of human conversational thinking but often rely on formal-logic reductions for processing and fail to produce predictable dialog as the number of rules expands.

Examples and use cases are now described; however, these are not intended to be limiting.

Figure 14:
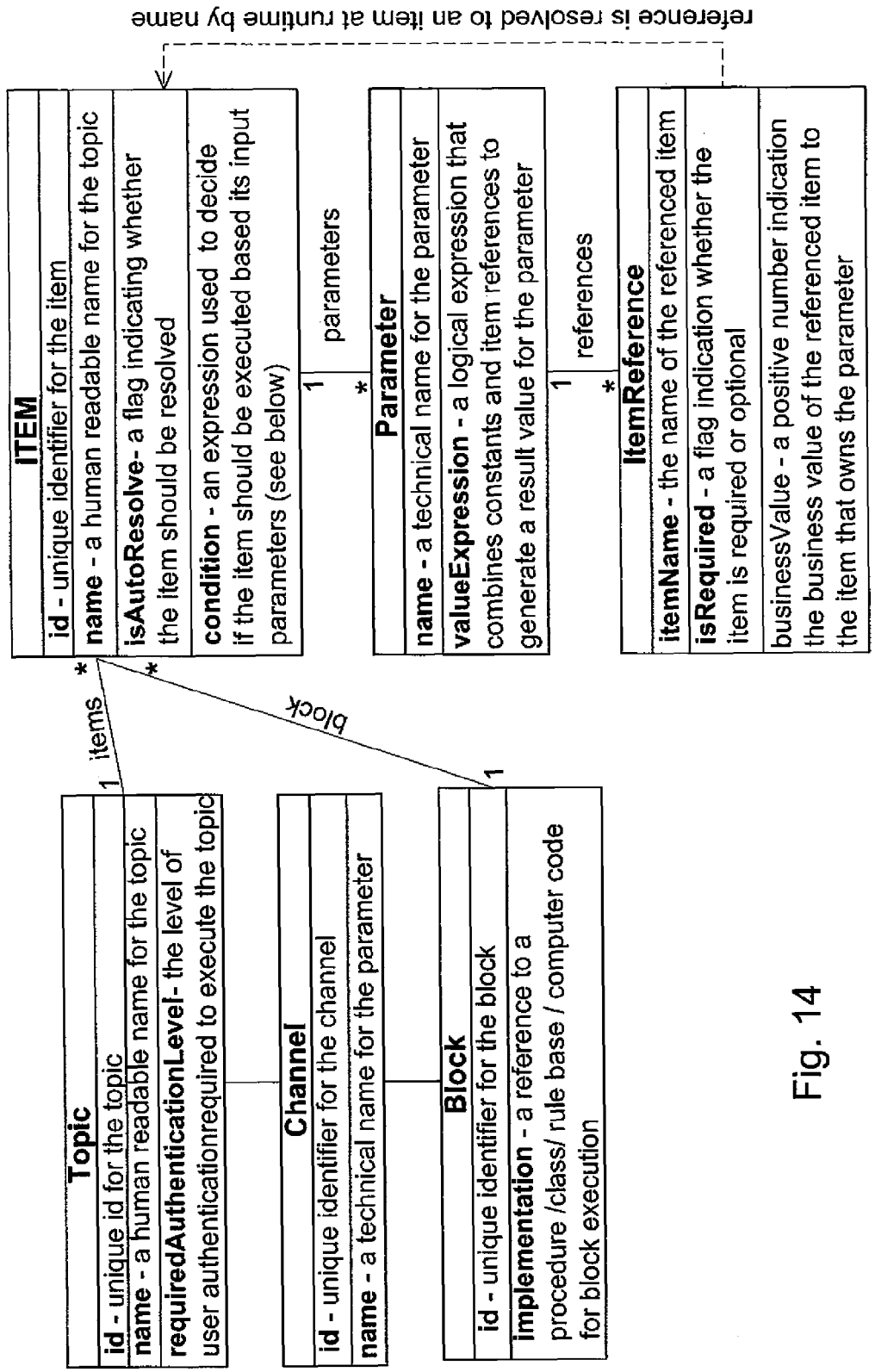

The system of FIG. 11 typically comprises some or all of the following modules:

Topic Definition Ontology, also termed herein "service definition ontology"—an ontology typically comprising topics, data processing items, item execution blocks, item parameters and item-references as illustrated in FIG. 14 and described in detail herein. This ontology enables efficient and natural definition of sophisticated service scenarios. Item-references defined using the ontology reflect a run-time dependency, between data processing items (one item typically serving as input for a subsequent item) and provide the basis for reasoning over topics.

Figure 15:
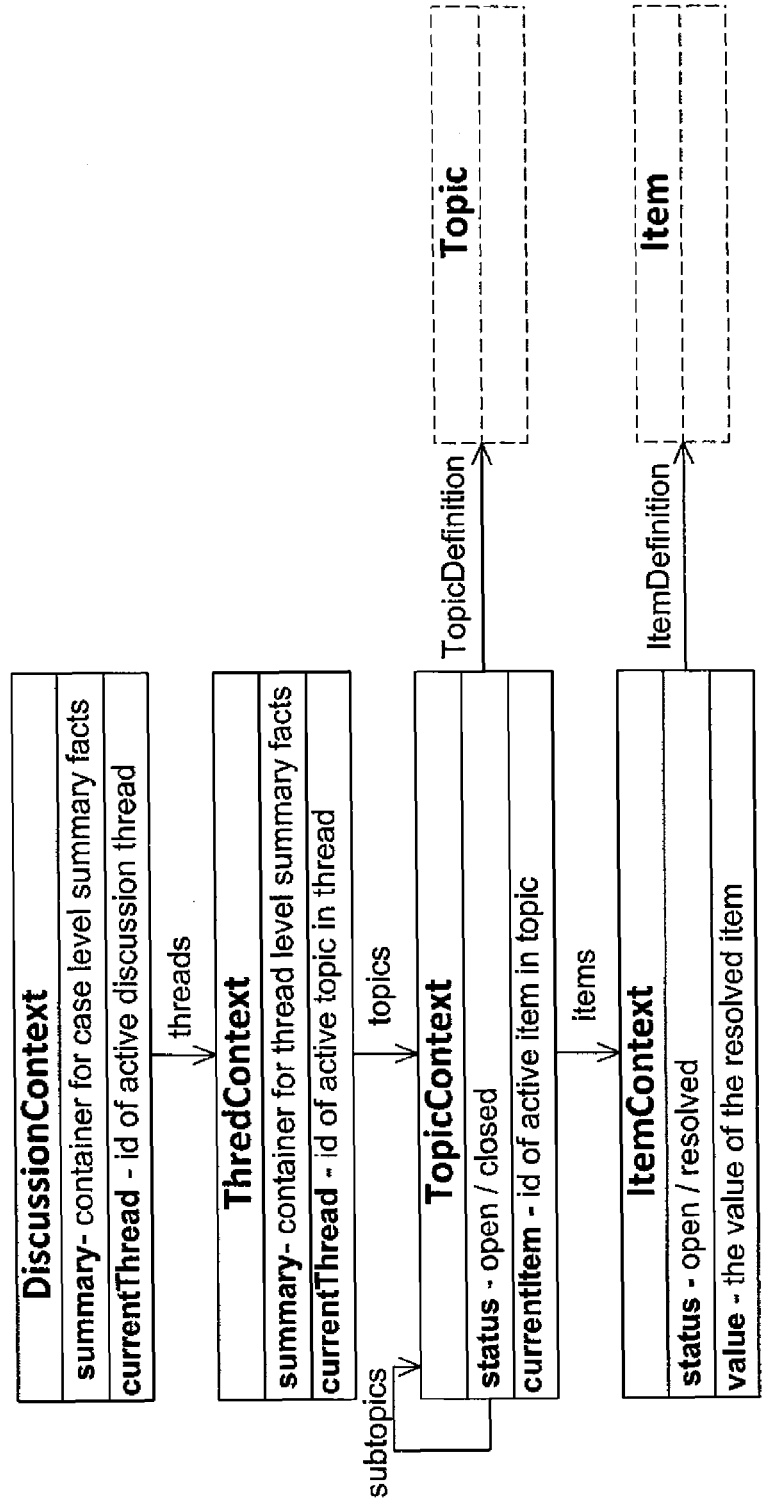

Topic Runtime Ontology, also termed herein "service runtime ontology"—An ontology typically comprising topic-context nodes and item-context nodes e.g. as illustrated in FIG. 15 and described in detail herein. This ontology is used when resolving topics at runtime to store item values and to create a tree structure of topic-context nodes.

Figure 16:
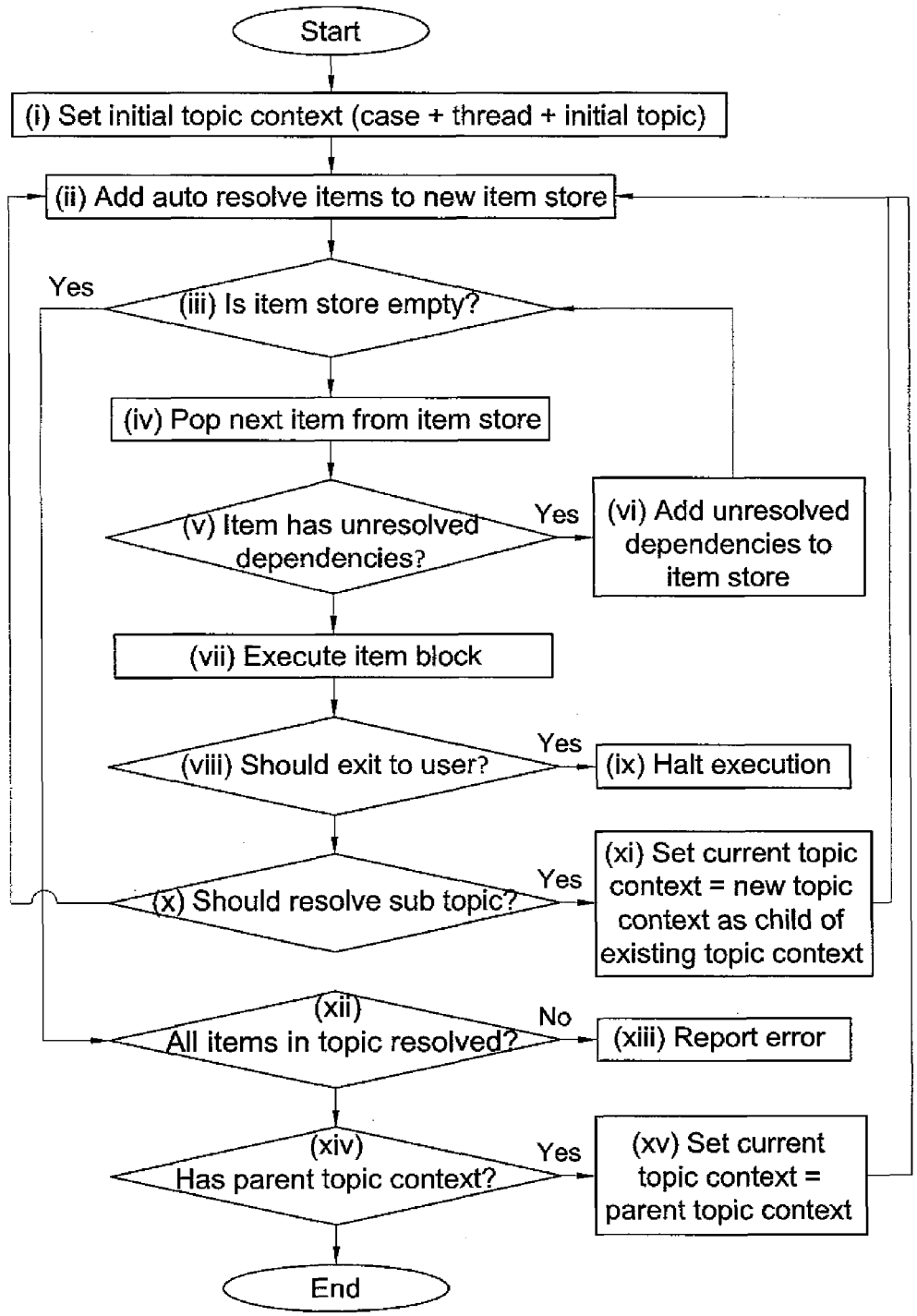

Reasoning Process—A computerized process, modified from conventional backward chaining processes, that aims to resolve a given topic by executing data processing blocks and following item-reference links e. g. as described in detail herein with reference to FIG. 16. The reasoning process gradually builds a runtime representation for a resolved topic.

Resolve-Topic Blocks—Special data processing blocks typically stated by the Topic Definition Ontology which allow the reasoning process to resolve sub-topics for a given base topic. When executing a data processing block, the process typically uses the runtime topic tree structure: the process of FIG. 16 creates a sub-topic-context node and places it as a child of the base-topic-context node e.g. as described in detail herein Item Reference Closure—ItemReferences typically stated by the Topic Definition Ontology link data processing items by name. When trying to resolve items, the process of FIG. 16 may look for another item with the desired name in the runtime topic tree starting from the current topic-context and moving up the tree to ancestor topic-contexts. This lookup allows a topic to be aware of its closure or calling environment and react to its calling environment, e.g. as described in detail herein.

Figure 17:
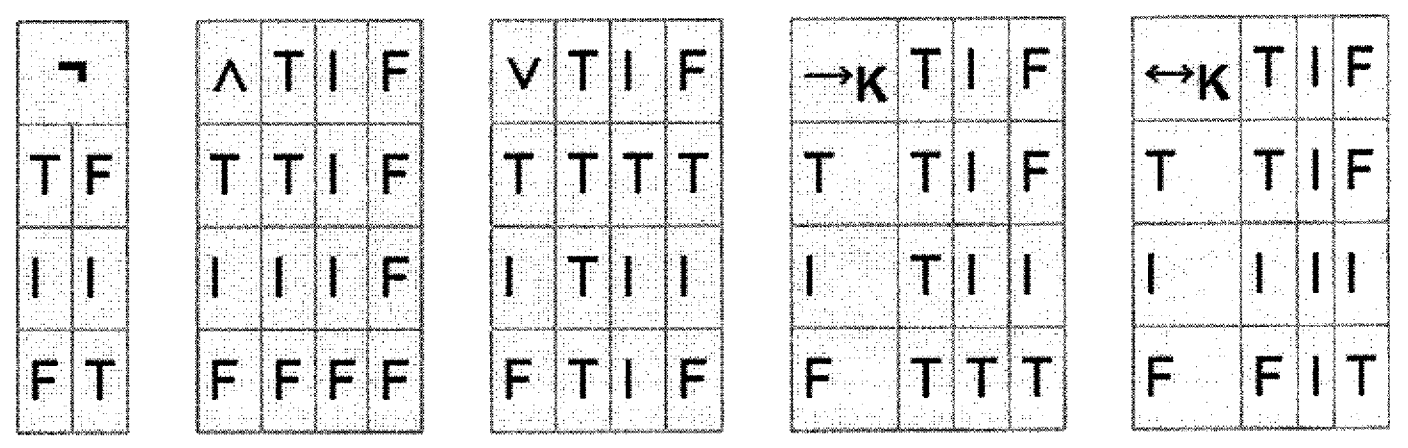

Three-Value Logic—All logic expressions and evaluations about item values typically utilize a variation of Kleene three-value-logic, which adds a third truth value "indeterminate" on top of conventional true/false values e.g. as illustrated in FIG. 17. This provides tolerance for missing or incomplete data.

Natural Modeling of Service Dialogs: The system of FIG. 11 is typically operative for maintaining a one-to-one relationship between discussion topics, as they are perceived by humans, and knowledge expressed using the Topic Definition Ontology. Discourse topics may be deemed a key component of the knowledge definition framework. Dialog implementers may interrogate domain-experts about topics encountered in the domain-experts' daily discourse and directly model these topics using the Topic Definition Ontology. Built-in support for sub-topic invocation at runtime may be provided to help implementers encapsulate and reuse topics and to naturally expand system capabilities as the implementation evolves.

Efficient Context Awareness: The system of FIG. 11 is typically operative to use the same topic definitions to conduct dialogs in different settings. It is appreciated that human dialog is very context dependent. Conversation about a given topic may take on different forms when initiated in different situations. In the case of professional service dialog, the customer may initiate a focused complaint about an exact business context or a general statement that needs to be investigated by the service provider. Typically, the system of FIG. 11 combines goal-driven reasoning with variable closures, to accommodate for dependency on context. In focused settings, contextual closures provide concrete facts that the reasoning process may utilize when solving a topic. In more general settings, the reasoning process may not find readily available facts and may have to obtain information from the user through interactive dialog or using external information systems.

Item closures are important, inter alia, when context is derived from natural language input. In such cases, entity extraction techniques may be used to obtain factual information from analyzed text. Extracted information is often noisy and unpredictable due to the open quality of natural language. Contextual closures provide a strong and flexible mechanism to communicate extracted entities to the reasoning process.

Typically, implementers may define topics that may be used in many settings and allow context closures to provide the factual context for topic resolution, thereby to improve the cost-effectiveness of implementation efforts.

Tolerance for domain ontology variations (e.g. tolerance to variation in domain models): Each enterprise customer tends to model his business domain in a slightly different way. For example, two credit card processors may use slightly different fields in their transaction entity and/or one may place merchant information on the transaction itself and another would place the same information in a separate linked merchant entity. Models also exhibit variations in the multiplicity of links. In addition, each customer may have his own unique knowledge, entities and fields to help differentiate his offering and give his business a competitive edge. Typically, backward chaining functionality is combined with three-value-logic functionality to allow implementers to efficiently define topics that on the one hand utilize each available piece of information but on the other hand are able to resort to default behavior in the absence of such data. Context closures allow implementers to define adapter-topics that deal with structure discrepancies in their input data. To continue the example above, such closers may extract information from the transaction itself and may present it as an independent merchant entity to subsequent sub-topics.

Figure 22:
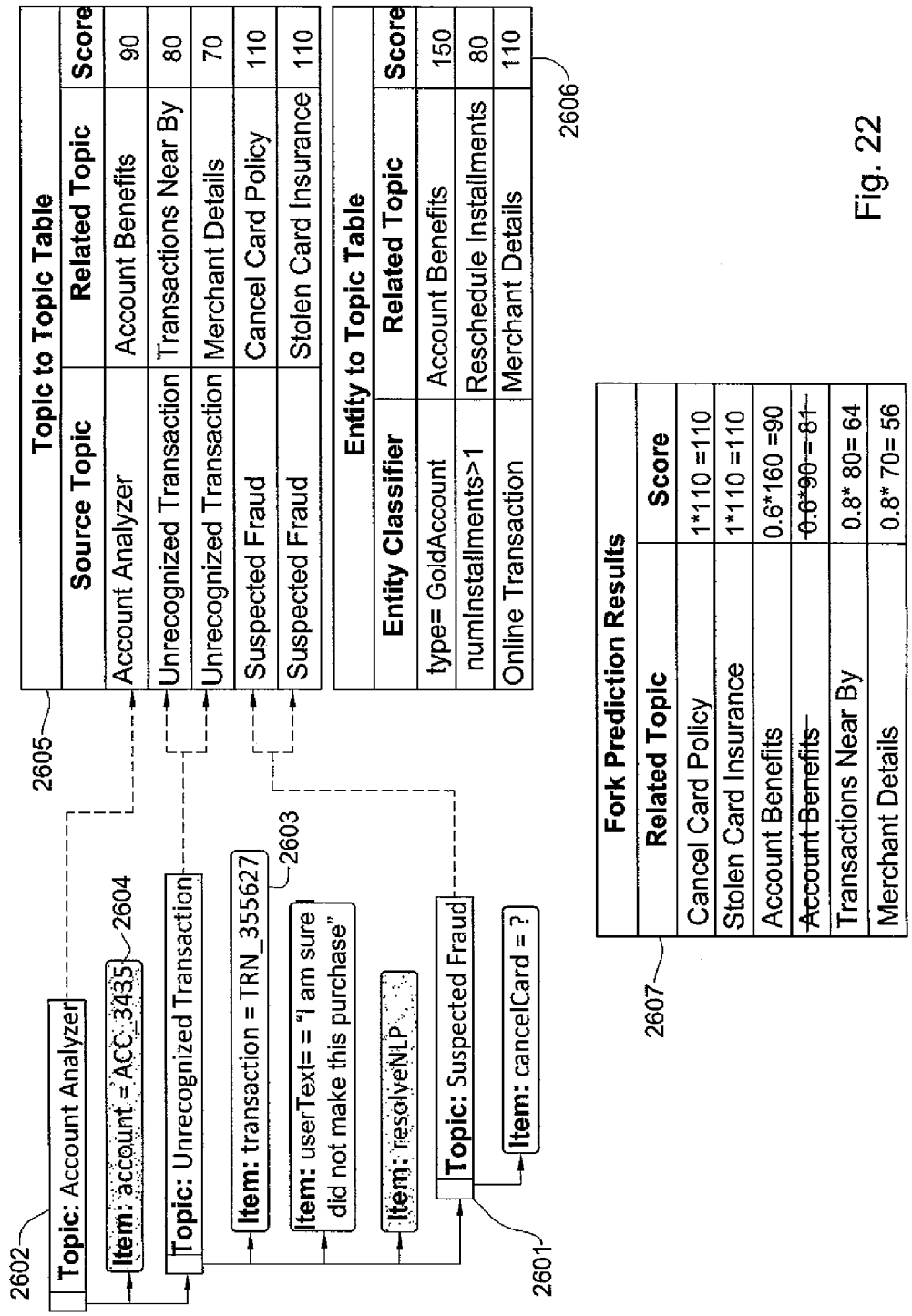

Intelligent mid-dialog fork prediction (e.g. as per FIGS. 20-22): Human dialog is a multi-step process where each step creates a new context for understanding. Throughout a conversation, a customer may often want to steer the discussion to one of several possible forks, such as but not limited to: discussion of the same topic about a different entity, discussion of another topic on the same entity, switching between discussion sub-threads and more. Typically, a runtime topic-context tree created by a reasoning process e.g. as per FIG. 22 is utilized for predicting the possibility and likelihood of such forks and context switches. In particular, a prediction process e.g. as per FIGS. 20-22 herein, typically uses the context tree to identify all the topics that occurred in the discussion up to its current state. The process also sets the relevance of each such topic to the current state (greater distance in the tree leads to lower relevance). Meta-data may be used to find relevant fork-topics for each discussed topic and to assign a probability score to each discussed topic. The prediction value for each fork-topic is computed e.g. as max (context-relevance X fork-probability).

In order to support multiple parallel topics in the same conversation, a system level discussion thread topic may be employed and all implementation topics may be run under the topic-context of a discussion thread. The first thread is created when the conversation begins; subsequent threads are created when the customer digresses to a new context without completing an old one. System-level flow control topics handle the user interface and data pluming involved in switching between these threads.

Data structures and processes, some or all of which may be employed in the system of FIG. 11, and possible inter-relationships therebetween, are now described in detail.

Topic Definition Ontology: The Smart Reasoner uses service ontology entities to define user dialog topics. FIG. 14 is a simplified block diagram illustration of an example data structure for a service ontology e.g. Topic Definition Ontology. Referring now to FIG. 14:

- Topic—represents an issue dealt with in a discourse or conversation. It refers to the interactive dialogs, logic computations, data queries and actions needed to resolve a business issue.
- Each topic typically has an ordered list of items:
  - Item—representing an atomic data processing unit that may present an interactive dialog to the user, perform computations, query information from external systems or execute actions on external data systems. Each item has one block and a list of parameters:
    - Block—a reference to executable computer code used to resolve the item. A block may be Java code, rule base, python script, etc.
    - Parameter—represents an input parameter that is passed to an item's execution block.
    - Each parameter has a list of ItemReferences:
      - ItemReference—a named reference to other items to be used as inputs for the current parameter.

Note that the service ontology allows modelers to create links between items in the following way:

Item X→parameter→ItemReference→Item Y

These links collectively create a directed graph that enables the Smart Reasoner process to employ backward-chaining-based logic and closure-based variable scoping.

The Topic Runtime Ontology of FIG. 15 is typically employed by the Smart Reasoner of FIG. 16 as a central data structure to resolve topics defined using the Topic Definition Ontology. FIG. 15 is a simplified block diagram illustration of an example data structure for a Topic Runtime Ontology.

Three Value Logic: In order to provide extra robustness to defined topics, principles of operation of many-value logic systems such as Kleene (K3) and Priest logic (P3) may be employed. Such logic systems add a third truth value "undefined" or "indeterminate" on top of the standard true/false. Extended truth tables for standard logic operators (e.g. Kleene and Priest logic truth tables, by way of example) are presented in FIG. 17.

Throughout the reasoning process of FIG. 16, concrete facts that emerge as topic items get resolved. Each unresolved item typically receives the "indeterminate" by default. At this point all logic expressions in the definition ontology may be evaluated using the truth tables presented in FIG. 17. This provides much-needed tolerance for missing data which is prevalent in real work enterprise environments.

The runtime topic-context tree created by the reasoning process is typically employed for predicting the possibility and likelihood of context switches, e.g. in mid-dialog fork prediction.

The prediction process typically uses the context tree generated by the method of FIG. 16 to identify all the topics and all the entities that occurred in the discussion up to the current discussion state and their relevance for the current context (greater distance in the tree→less relevance). For each discussed topic and entity, meta-data is used to find relevant fork-topics and assign a probability score to each fork. The system computes the prediction value for each fork-topic as max (context-relevance X fork-probability).

Figure 18:
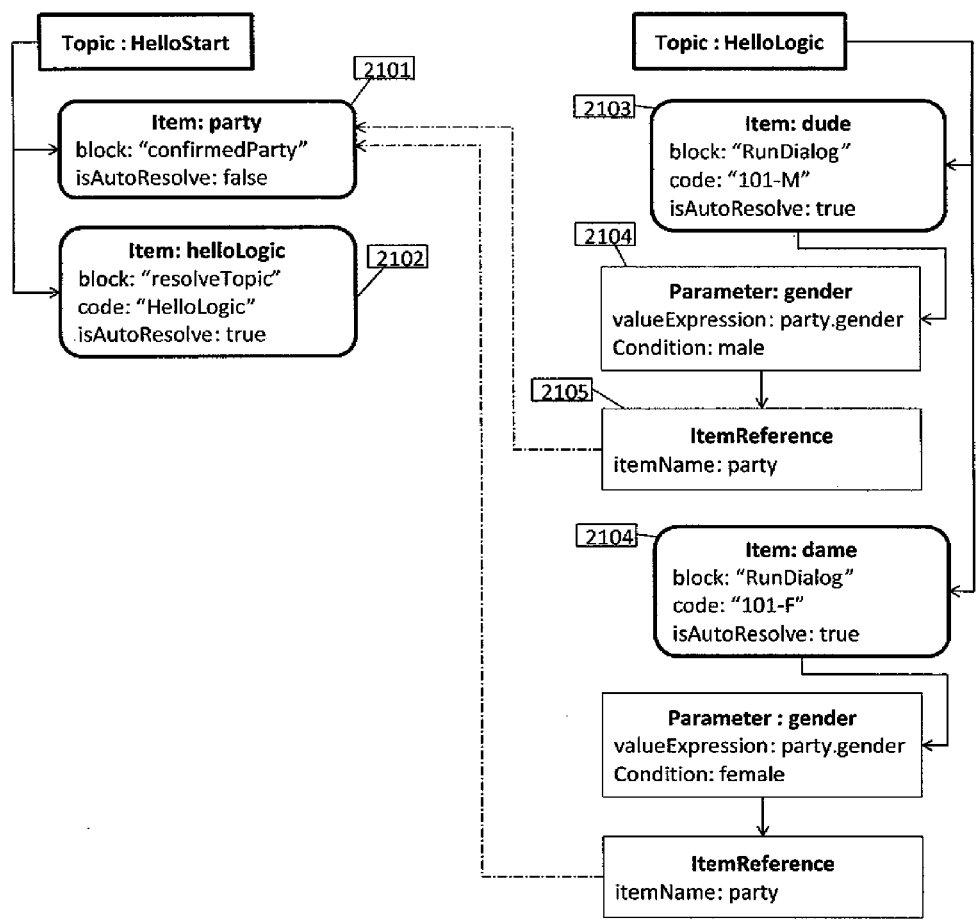
Figure 19:
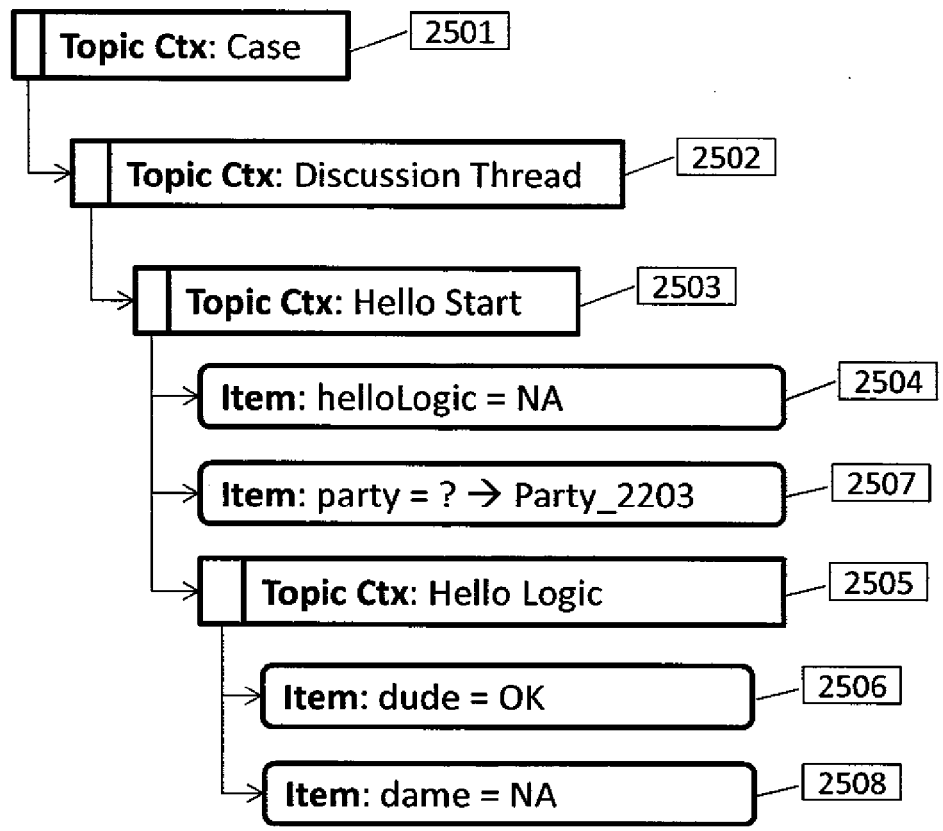

An example flow for the reasoning process of FIG. 16 is now described in detail with reference to a service ontology example comprising two topics "HelloStart" and "HelloLogic" as per FIG. 18. Running the reasoning process on this example service ontology yields a topic context tree structure as described in FIG. 19.

- Reasoning starts at step (i) of FIG. 16 by creating initial runtime topic contexts including Case (2501) Discussion Thread (2502) and a topic context for the initial topic, i.e. "Hello Start" (2503) in the illustrated embodiment.
- In step (ii) of FIG. 16, all auto-resolve items of the "Hello Start" topic are inserted into the item store. In the illustrated embodiment, only the item "helloLogic" is inserted.
- Since the item store is not empty (step iii) the flow proceeds to step (iv), pops the "helloLogic" item from the item store and creates an item context to store the items value and status (2504).
- The item "helloLogic" has no dependencies and thus the process moves through step (v) to step (vii) and executes the item's "resolveTopic" block.
- In stage (viii) the process skips stage (ix) since the current item is not a "RunDialog" item and moves to stage (x) where the process finds that a topic is to be resolved and consequently advances to stage (xi).
- In step (xi) the process create a new context for the topic "Hello Logic" (2505), sets that topic as the current topic and loops back to step (ii).
- In step (ii) all auto-resolve items of the "Hello Logic" topic are inserted into the item store. In the illustrated embodiment this includes both the items "dude" (2103) and "dame" (2104).
- In step (iv) the "dude" item is popped from the item store and an item context is created for this item (2506).
- In step (v) the process checks the parameter "gender" of the "dude" item and identifies a dependency on an item named "party" through the item reference (2105). An item named "party" does not exist in the "Hello Logic" topic context and so the process looks up the tree at the topic's closure and finds the "party" item (2101) defined in the "Hello Start" topic. The process creates the context for the "party" item (2507).
- At this point in time the value of the "party" item (2507) is unknown, so the item "dude" has an unresolved dependency and the process proceeds to step (vi), adds the item "party" to the item store and loops back to step (iii).
- In step (iv) the "dame" item is popped from the item store and an item context is created for it (2508). The dame item also has an unresolved dependency on the "party" item (2507) and so the process proceeds to step (vi).

The item "party" is already in the item store so "party" is not added again and the process loop back to step (iii).

In step (iv) the "party" item is popped from the item store and "party"'s item context (2507) is located. The "party" item has no defined parameters (2101) and thus the process proceeds to step (vii) to execute the "confirmedParty" lock that looks up the Party data object that represents the user initiating the conversation and sets that data object as the value of the item context (2507).

The process proceeds to the "no" branch of the flow at both steps (viii) and (x) because there is no dialog to present to the user nor a sub topic to run. And so, the flow loops back to step (ii).

In step (ii) both items "dude" and "dame" are pushed to the item store.

In step (iv) the item "dude" is investigated and found not to have any unresolved dependencies now and the process moves to step (vii) and executes the "RunDialog" block according the "dude" item definition (2103).

The process takes the "yes" branch in step (viii) and presents the dialog "101-M" to the user.

The process may restart at step (ii) once the system receives the user's reply to the dialog.

Figure 20:
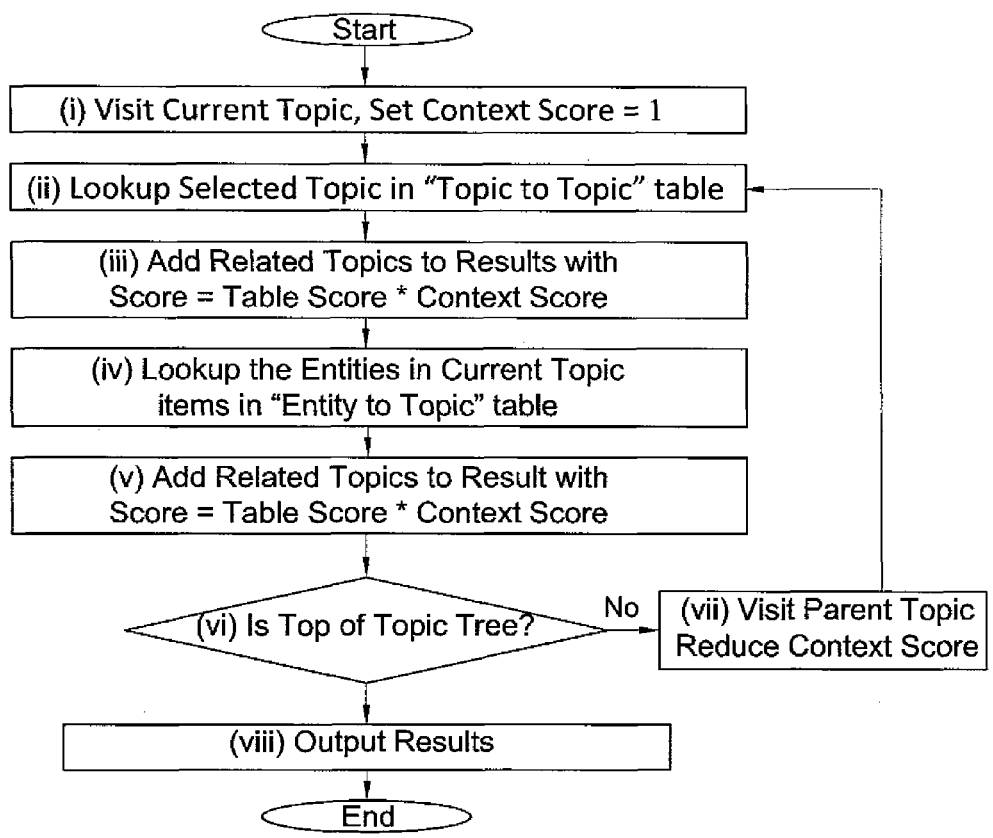

Methods for mid-dialog fork prediction according to certain embodiments are now described in detail with reference to FIGS. 20-22. Generally, human dialog is a multi-step process where each step creates a new context for understanding. Throughout a conversation a customer or user often desires to steer discussion to one of several possible forks, such as but not limited to some or all of:

discussion of the same topic about a different entity
discussion of another topic on the same entity
switching between discussion sub-threads
and more.

A runtime topic-context tree created by the reasoning process shown and described herein is a powerful tool for predicting the possibility and likelihood of such context switches.

A fork prediction process may include some or all of the steps illustrated in FIG. 210, suitably ordered e.g. as shown. Fork prediction typically starts from the currently discussed topic at the bottom of the topic context tree (step i) and climbs to the root of the tree while visiting each nested topic on its way (steps vi, vii). The process assigns the bottom topic a maximum context score of 1, giving each topic a smaller context score as the process moves up the tree.

For each visited topic, the process may employ a "Topic to Topic" table, e.g. as illustrated in FIG. 21 (2501), to map the visited topic to a collection of related topics assigning each one a relevance score (step ii). The process adds the related topics to its results, computing the relevance score for each topic as the multiplication of their relevance score and the current context score (step iii).

For each reasoning item in the visited topic, the process checks if the item refers to a business entity such as a bank account or a financial transaction. If a business entity is identified the process uses the "Entity to Topic" table, e.g. that of FIG. 21 (2502), to map the entity to a collection of relevant topics (step iv). In one embodiment expressions are used to check the relevance of the entity to the topics e.g. is the entity's type equal to "GoldAccount". In another embodiment named classes can be used for relevance checks e.g. is the entity and Online Transaction. In this embodiment the use of the named class is decoupled from the implementation of the class that may use compiled code, expressions, rule based deduction, table based lookups and more.

The process typically adds the identified related topics to its results, computing the relevance score for each topic as the multiplication of their relevance score and the current context score (step v). The process typically terminates when it reaches the top of the topic context tree and returns its results. In a more involved embodiment the process may not limit its search to the currently discussed topic branch (from the current topic to the root), but may instead visit the whole tree representing all previously discussed topics using a suitable tree searching process such as but not limited to DFS or BFS.

FIG. 22 presents an example with three nested topic context nodes and two embedded entities. The process starts from the bottom topic context (2601) and makes its way to the root topic context (2602). The process visits entities (2603) and (2604) en route. The "Topic to Topic" table (2605) and "Entity to Topic" table (2606) are used to map visited topics and entities to related topics and to create a resulting fork prediction vector (2607). It is appreciated that the topic "Account Benefits" is scored twice and thus receives a maximum computed score.

The system of the present invention may for example reside wholly or in part within, and/or conduct dialog with, a mobile communication device such as but not limited to any of the following: mobile telephone, smart phone, playstation, iPad, TV, remote desktop computer, game console, tablet, mobile e.g. laptop or other computer terminal, embedded remote unit.

The system may be implemented as a web-based system including computers, routers and telecommunications equipment.

The methods shown and described herein are particularly useful in processing or analyzing or searching enterprise or generally available bodies of knowledge including hundreds, thousands, tens of thousands, or hundreds of thousands of electronic records. This is because practically speaking, such large bodies of knowledge can only be processed, analyzed, sorted, or searched using computerized technology.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer-useable medium having computer-readable program code, such as executable code, having embodied therein, and/or including computer-readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client-centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. The term "e.g." is used herein in the sense of a specific example which is not intended to be limiting. Devices, apparatuses or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. Apparatus for conducting a dialog with a user of at least one computerized enterprise system, the apparatus comprising:
   an ontological topic definer including a processor using at least one ontological entity to define user dialog topics including items; and
   a computerized dialog server operative for conducting a dialog with a user of at least one computerized enterprise system about an individual topic from among said user dialog topics, including generating a directed graph based on item references, from links between said items, by applying closure-based variable scoping in conjunction with backward-chaining-based logic to said directed graph, and identifying and scoring potential discussion forks based on said directed graph.

2. Apparatus according to claim 1 wherein said dialog server interacts with an Intent Scoring functionality for scoring various intents on the part of a user approaching a virtual agent, the functionality's operation comprising:
   predicting priority topics, including gathering first data and employing the first data to discern and seek user confirmation of at least one possible intent on the part of the user; and
   subsequent to receipt of said confirmation, gathering second data and employing the second data to provide service to the user to suit the user's confirmed intent.

3. Apparatus according to claim 1 wherein said dialog server interacts with a data-gathering system comprising:
   a data-aware knowledge base storing knowledge on relative costs of obtaining various data items; and
   a data retrieval decision making processor operative, when an individual data element is sought to be retrieved, to determine whether or not to retrieve said data element by comparing at least one parameter representing need for said data element with at least one parameter, retrieved from said data-aware knowledge base, which represents relative cost of obtaining said data element.

4. Apparatus according to claim 1 wherein each topic includes:
   an item,
   a block identifying executable computer code operative to resolve the item; and
   at least one input parameter passed to the block.

5. Apparatus according to claim 1 wherein each topic includes items and item references.

6. Apparatus according to claim 5 wherein the item references reference the items by a natural name.

7. A computer program product, comprising a non-transitory tangible computer-readable medium having computer-readable program code embodied therein, said computer-readable program code adapted to be executed to implement a method for conducting a dialog with a user of at least one computerized enterprise system, the method comprising:

using at least one ontological entity to define user dialog topics including items; and conducting a dialog with a user of at least one computerized enterprise system about an individual topic from among said user dialog topics, including generating a directed graph based on item references, from links between said items, by applying closure-based variable scoping in conjunction with backward-chaining-based logic to said directed graph; and identifying and scoring potential discussion forks based on said directed graph.

8. A method for conducting a dialog with a user of at least one computerized enterprise system, the method comprising:

using at least one ontological entity to define user dialog topics including items;

conducting a dialog with a user of at least one computerized enterprise system about an individual topic from among said user dialog topics, including generating a directed graph based on item references, from links between said items, by applying closure-based variable scoping in conjunction with backward-chaining-based logic to said directed graph; and identifying and scoring potential discussion forks based on said directed graph.

9. A method according to claim 8 wherein at least one logic code segment is used for a plurality of different discussion entry points.

10. A method according to claim 8 wherein said conducting comprises conducting at least first and second dialogs with at least first and second users respectively, of at least first and second corresponding computerized enterprise systems respectively, including using a single logic code segment for at least first and second dialog portions, of the first and second dialogs respectively, which pertain to first and second products respectively, of the first and second corresponding computerized enterprise systems respectively.

11. A method according to claim 8, the method also comprising:

generating a topological graph having a multiplicity of nodes each representing a step or a decision, each step including an interaction with a user of at least one computerized enterprise system, a data lookup, or a data processing operation; and conducting a dialogue with a user of at least one computerized enterprise system by proceeding through the graph including making at least one decision, based on collected information, as to which of a plurality of possible next steps in the graph to execute.

12. A method according to claim 11 wherein said data lookup comprises looking up statistical data about at least one population of users to which the user belongs.

13. A method according to claim 11 wherein said data lookup comprises looking up data about the user, which is stored in said enterprise system.

14. A method according to claim 8 wherein said item, a block and at least one parameter are stored as an ordered list.

15. A method according to claim 8 wherein at least one item includes a segment of interactive dialog to be presented to a user.

16. A method according to claim 8 wherein at least one item includes a computation to be performed.

17. A method according to claim 8 wherein at least one item includes a query to be presented to an external computerized system.

18. A method according to claim 8 wherein at least one item includes at least one action to be executed on an external computerized system.

19. A method according to claim 8 wherein at least one parameter comprises at least one ItemReference including a reference to at least one other item (referenced item) to be used as an input for a block.

20. A method according to claim 19 wherein at least one parameter comprises a logical expression (valueExpression) which generates a result value of the parameter by combining an itemReference with at least one of:

another itemReference; and a constant.

21. A method according to claim 19 wherein at least one ItemReference includes an isRequired flag indicating whether the item is an optional input for said block or a required input for said block.

22. A method according to claim 19 wherein at least one ItemReference includes a quantification of said referenced item's business value to the item which includes (owns) the parameter.

23. A method according to claim 19 wherein said block comprises a reference to at least one of a procedure, class, and rule base, thereby to identify executable computer code operative to resolve the item.

24. A method according to claim 8 wherein each item includes an autoResolve flag indicating whether or not the item is to be resolved.

25. A method according to claim 8 wherein each item includes a condition indicating whether or not an item is to be executed based on the item's input parameters.

26. A method according to claim 8 wherein at least one topic includes an indication of a level of user authentication required to execute said topic.

27. A method according to claim 8 wherein said generating said directed graph employs a topic context tree having a root.

28. A method according to claim 27 wherein name references are translated into graph edges by searching for item names starting from bottom topic context and going up said topic context tree until said root is reached.

29. A method according to claim 8 wherein Backward chaining is used over the directed graph to resolve a next item.

30. A method according to claim 8 wherein topic context closures are used to generate said directed graph of item references.

31. A method according to claim 8 wherein each link has the following form:

Item X→parameter→itemReference→item Y.

32. A method according to claim 8 wherein nested topic contexts are created at runtime, thereby to resolve topics.

33. A method according to claim 8 wherein a topic context runtime ontology supports nested topic contexts.

34. A method for conducting a dialog with a user of at least one computerized enterprise system, the method comprising:

using at least one ontological entity to define user dialog topics including items; and conducting a dialog with a user of at least one computerized enterprise system about an individual topic from among said user dialog topics, including generating a directed graph based on item references, from links between said items, by applying closure-based variable scoping in conjunction with backward-chaining-based logic to said directed graph, wherein said conducting comprises conducting at least first and second dialogs with at least first and second users respectively, of at least first and second corresponding computerized enterprise systems respectively, including using a single logic code segment for at least first and second dialog portions, of the first and second dialogs respectively, which pertain to first and second products respectively, of the first and second corresponding computerized enterprise systems respectively, and wherein the first and second enterprise systems comprise first and second banks respectively and wherein said first and second products comprise first and second financial services offered by the first and second banks respectively.

* * * * *